United States Patent
Yamasaki et al.

(12)

(10) Patent No.: US 6,896,800 B2
(45) Date of Patent: May 24, 2005

(54) METAL CONTAINING WASTE WATER TREATMENT METHOD AND METAL CONTAINING WASTE WATER TREATMENT EQUIPMENT

(75) Inventors: Kazuyuki Yamasaki, Hiroshima (JP); Kazumi Chujo, Ayauta-gun (JP); Hiroyuki Ishibashi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 277 days.

(21) Appl. No.: 10/133,641

(22) Filed: Apr. 29, 2002

(65) Prior Publication Data
US 2002/0158014 A1 Oct. 31, 2002

(30) Foreign Application Priority Data
Apr. 27, 2001 (JP) ........................................ 2001-131920

(51) Int. Cl.$^7$ .............................................. B01D 29/00
(52) U.S. Cl. ........................ 210/196; 210/208; 210/220; 210/207
(58) Field of Search .............................. 210/198.1, 205, 210/207, 208, 220, 196

(56) References Cited

U.S. PATENT DOCUMENTS 6,027,649 A 2/2000 Benedek et al.

6,645,385 B2 * 11/2003 Krulik et al. ............... 210/709

FOREIGN PATENT DOCUMENTS

| JP | 59-095991 | 6/1984 |
| JP | B-3-61514 | 9/1991 |
| JP | 09-285786 | 11/1997 |
| JP | 2000-51672 A | 2/2000 |
| JP | 2000-117270 | 4/2000 |

* cited by examiner

*Primary Examiner*—Chester T. Barry
(74) *Attorney, Agent, or Firm*—Nixon & Vanderhye, P.C.

(57) ABSTRACT

This metal containing waste water treatment method introduces a metal containing waste water from above into a submerged membrane separation tank 1 in which a reaction section 2, a submerged membrane section 3 having a submerged membrane 5 and a precipitation section 4 are arranged in order from top to bottom, causes a reaction by adding a pH adjuster to the reaction section 2, subsequently separates water from metal by the submerged membrane 5 of the submerged membrane section 3 and subsequently precipitates and concentrates the metal in the precipitation section 4. As described above, according to this treatment method, the pH adjuster is added to the reaction section 2, and therefore, solid-liquid separation can be effected by the submerged membrane 5 with a hydroxide formed. Moreover, the metal can be precipitated and concentrated by the action of gravity without using energy in the precipitation section 4.

13 Claims, 60 Drawing Sheets

Fig.13A

WHEN CONCENTRATIONS OF GALLIUM AND ARSENIC ARE NORMAL CONCENTRATIONS

| TANK NAME | RESIDENCE TIME | TIMING (RESIDENCE TIME) | | | | | | | | | | | | | | |
|---|---|---|---|---|---|---|---|---|---|---|---|---|---|---|---|---|
| | | 1 HR. | 2 HR. | 3 HR. | 4 HR. | 5 HR. | 6 HR. | 7 HR. | 8 HR. | 9 HR. | 10 HR. | 11 HR. | 12 HR. | 13 HR. | 14 HR. | 15 HR. |
| SUBMERGED MEMBRANE SEPARATION TANK | 1 HR. | | | | | | | | | | | | | | | |
| SECOND SUBMERGED MEMBRANE SEPARATION TANK | 4 HR. | | | | | | | | | | | | | | | |
| THIRD SUBMERGED MEMBRANE SEPARATION TANK | 10 HR. | | | | | | | | | | | | | | | |

Fig.13B

WHEN CONCENTRATIONS OF GALLIUM AND ARSENIC ARE LOW CONCENTRATIONS

| TANK NAME | RESIDENCE TIME | TIMING (RESIDENCE TIME) | | | | | | | | | | | | | | |
|---|---|---|---|---|---|---|---|---|---|---|---|---|---|---|---|---|
| | | 1 HR. | 2 HR. | 3 HR. | 4 HR. | 5 HR. | 6 HR. | 7 HR. | 8 HR. | 9 HR. | 10 HR. | 11 HR. | 12 HR. | 13 HR. | 14 HR. | 15 HR. |
| SUBMERGED MEMBRANE SEPARATION TANK | 1 HR. | | | | | | | | | | | | | | | |
| SECOND SUBMERGED MEMBRANE SEPARATION TANK | 2 HR. | | | | | | | | | | | | | | | |
| THIRD SUBMERGED MEMBRANE SEPARATION TANK | 6 HR. | | | | | | | | | | | | | | | |

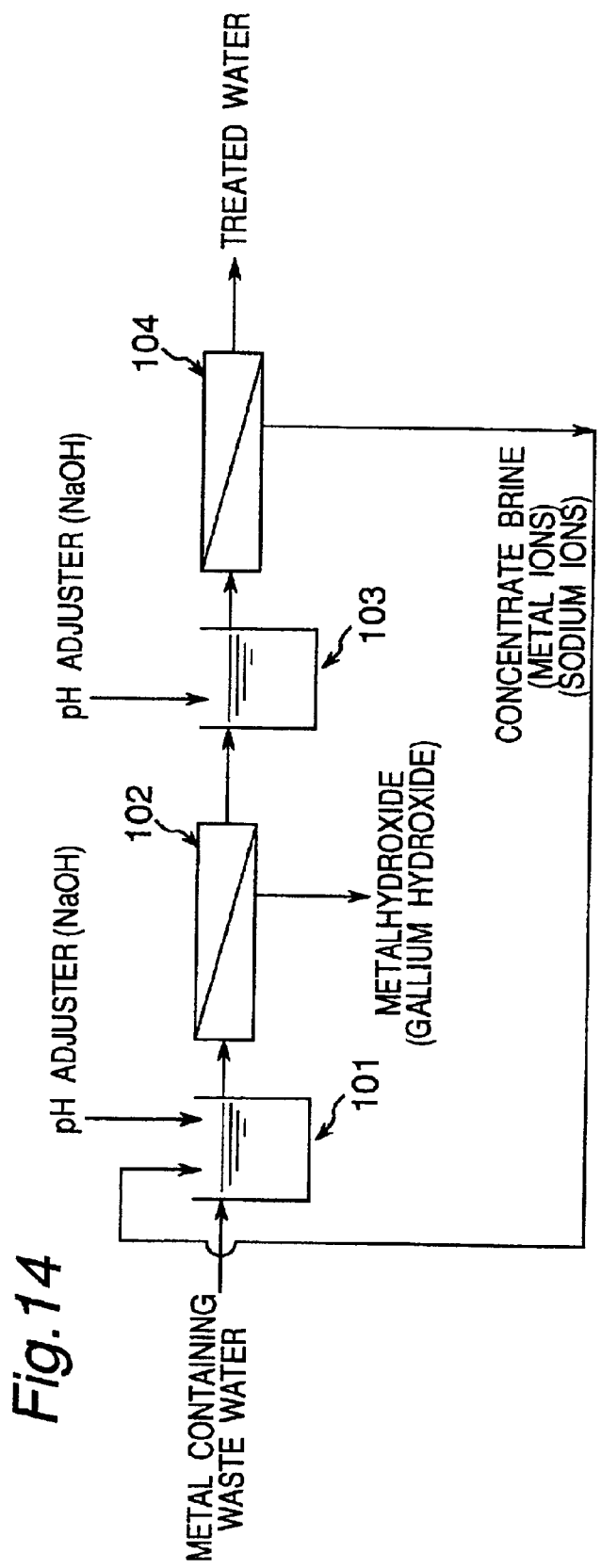

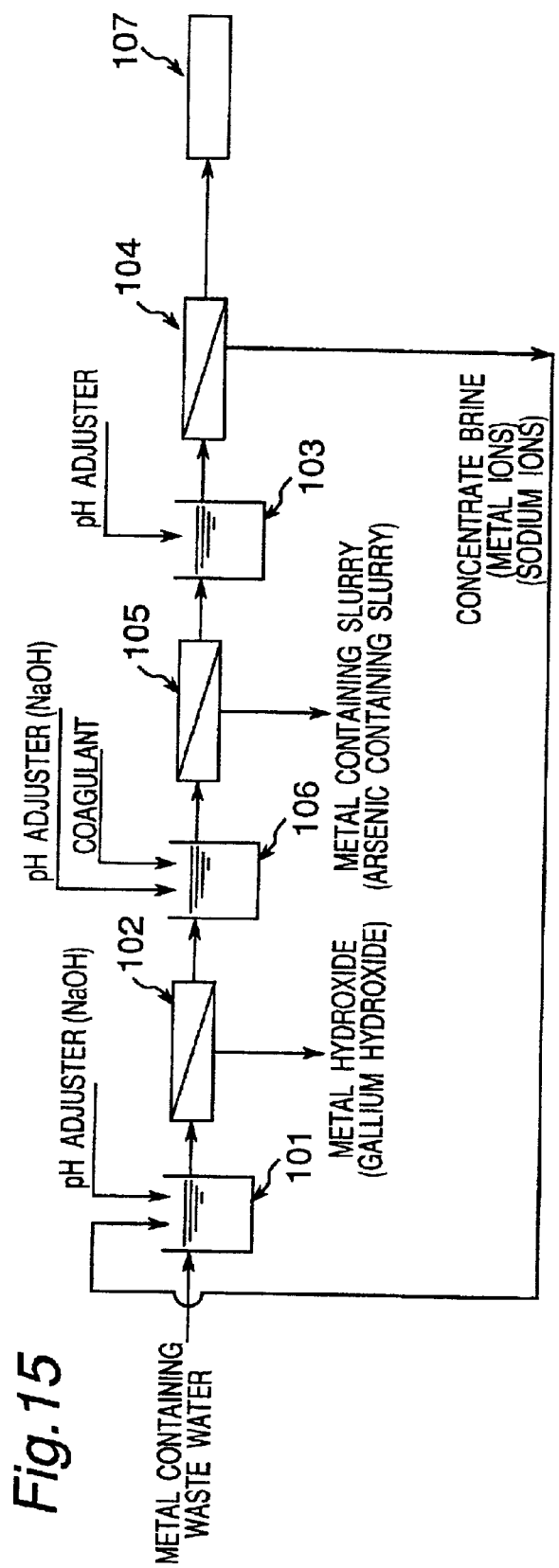

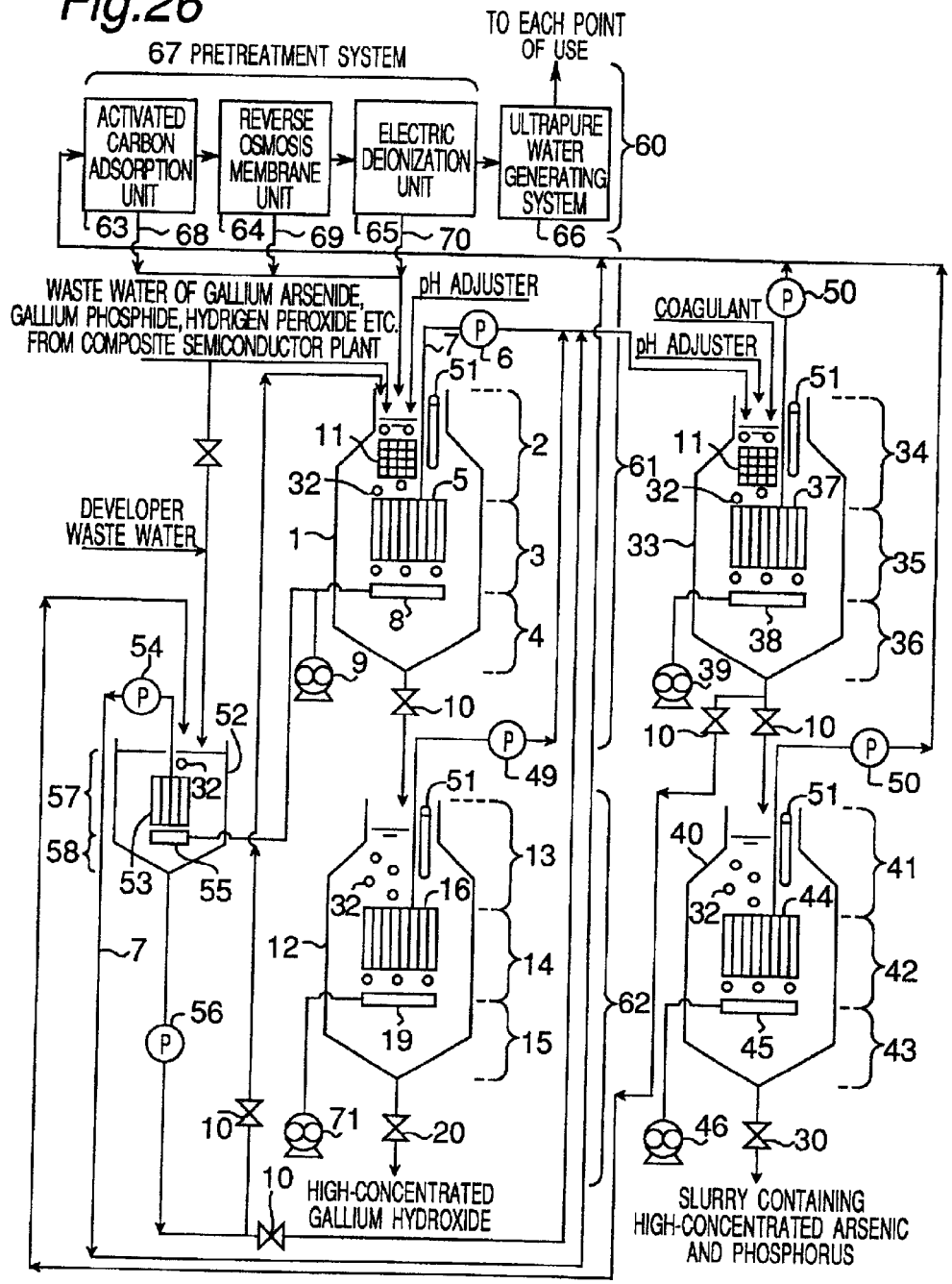

Fig.27A

WHEN CONCENTRATIONS OF GALLIUM AND ARSENIC ARE NORMAL CONCENTRATIONS

| TANK NAME | RESIDENCE TIME | TIMING (RESIDENCE TIME) | | | | | | | | | | | | | | |
|---|---|---|---|---|---|---|---|---|---|---|---|---|---|---|---|---|
| | | 1 HR. | 2 HR. | 3 HR. | 4 HR. | 5 HR. | 6 HR. | 7 HR. | 8 HR. | 9 HR. | 10 HR. | 11 HR. | 12 HR. | 13 HR. | 14 HR. | 15 HR. |
| SUBMERGED MEMBRANE SEPARATION TANK | 1 HR. | ■ | | | | | | | | | | | | | | |
| SECOND SUBMERGED MEMBRANE SEPARATION TANK | 2 HR. | | ■■ | | | | | | | | | | | | | |
| THIRD SUBMERGED MEMBRANE SEPARATION TANK | 4 HR. | | | | ■■■■ | | | | | | | | | | | |
| FOURTH SUBMERGED MEMBRANE SEPARATION TANK | 4 HR. | | | | | | | | ■■■■ | | | | | | | |

Fig.27B

WHEN CONCENTRATIONS OF GALLIUM AND ARSENIC ARE LOW CONCENTRATIONS

| TANK NAME | RESIDENCE TIME | TIMING (RESIDENCE TIME) | | | | | | | | | | | | | | |
|---|---|---|---|---|---|---|---|---|---|---|---|---|---|---|---|---|
| | | 1 HR. | 2 HR. | 3 HR. | 4 HR. | 5 HR. | 6 HR. | 7 HR. | 8 HR. | 9 HR. | 10 HR. | 11 HR. | 12 HR. | 13 HR. | 14 HR. | 15 HR. |
| SUBMERGED MEMBRANE SEPARATION TANK | 1 HR. | ■ | | | | | | | | | | | | | | |
| SECOND SUBMERGED MEMBRANE SEPARATION TANK | 2 HR. | | ■■ | | | | | | | | | | | | | |
| THIRD SUBMERGED MEMBRANE SEPARATION TANK | 3 HR. | | | | ■■■ | | | | | | | | | | | |
| FOURTH SUBMERGED MEMBRANE SEPARATION TANK | 3 HR. | | | | | | | ■■■ | | | | | | | | |

Fig.28A

WHEN CONCENTRATIONS OF GALLIUM AND ARSENIC ARE NORMAL CONCENTRATIONS

| TANK NAME | RESIDENCE TIME | TIMING (RESIDENCE TIME) | | | | | | | | | | |
|---|---|---|---|---|---|---|---|---|---|---|---|---|
| | | 1 HR. | 2 HR. | 3 HR. | 4 HR. | 5 HR. | 6 HR. | 7 HR. | 8 HR. | 9 HR. | 10 HR. | 11 HR. |
| SUBMERGED MEMBRANE SEPARATION TANK | 2 HR. | ── | ── | | | | | | | | | |
| SECOND SUBMERGED MEMBRANE SEPARATION TANK | 4 HR. | | | ── | ── | ── | ── | | | | | |

Fig.28B

WHEN CONCENTRATIONS OF GALLIUM AND ARSENIC ARE LOW CONCENTRATIONS

| TANK NAME | RESIDENCE TIME | TIMING (RESIDENCE TIME) | | | | | | | | | | |
|---|---|---|---|---|---|---|---|---|---|---|---|---|
| | | 1 HR. | 2 HR. | 3 HR. | 4 HR. | 5 HR. | 6 HR. | 7 HR. | 8 HR. | 9 HR. | 10 HR. | 11 HR. |
| SUBMERGED MEMBRANE SEPARATION TANK | 1 HR. | ── | | | | | | | | | | |
| SECOND SUBMERGED MEMBRANE SEPARATION TANK | 2 HR. | | ── | ── | | | | | | | | |

Fig.42A

WHEN CONCENTRATIONS OF GALLIUM AND ARSENIC ARE NORMAL CONCENTRATIONS

| TANK NAME | RESIDENCE TIME | TIMING (RESIDENCE TIME) | | | | | | | | | | |
|---|---|---|---|---|---|---|---|---|---|---|---|---|
| | | 1 HR. | 2 HR. | 3 HR. | 4 HR. | 5 HR. | 6 HR. | 7 HR. | 8 HR. | 9 HR. | 10 HR. | 11 HR. |
| SUBMERGED MEMBRANE SEPARATION TANK | 2 HR. | ▬ | ▬ | | | | | | | | | |
| SECOND SUBMERGED MEMBRANE SEPARATION TANK | 4 HR. | | | ▬ | ▬ | ▬ | ▬ | | | | | |

Fig.42B

WHEN CONCENTRATIONS OF GALLIUM AND ARSENIC ARE LOW CONCENTRATIONS

| TANK NAME | RESIDENCE TIME | TIMING (RESIDENCE TIME) | | | | | | | | | | |
|---|---|---|---|---|---|---|---|---|---|---|---|---|
| | | 1 HR. | 2 HR. | 3 HR. | 4 HR. | 5 HR. | 6 HR. | 7 HR. | 8 HR. | 9 HR. | 10 HR. | 11 HR. |
| SUBMERGED MEMBRANE SEPARATION TANK | 1 HR. | ▬ | | | | | | | | | | |
| SECOND SUBMERGED MEMBRANE SEPARATION TANK | 2 HR. | | ▬ | ▬ | | | | | | | | |

Fig.56A

WHEN CONCENTRATIONS OF GALLIUM AND ARSENIC ARE NORMAL CONCENTRATIONS

| TANK NAME | RESIDENCE TIME | TIMING (RESIDENCE TIME) | | | | | | | | | | |
|---|---|---|---|---|---|---|---|---|---|---|---|---|
| | | 1 HR. | 2 HR. | 3 HR. | 4 HR. | 5 HR. | 6 HR. | 7 HR. | 8 HR. | 9 HR. | 10 HR. | 11 HR. |
| SUBMERGED MEMBRANE SEPARATION TANK | 2 HR. | ━━━━ | | | | | | | | | | |
| SECOND SUBMERGED MEMBRANE SEPARATION TANK | 4 HR. | | | ━━━━━━━━━━━━━━━ | | | | | | | | |

Fig.56B

WHEN CONCENTRATIONS OF GALLIUM AND ARSENIC ARE LOW CONCENTRATIONS

| TANK NAME | RESIDENCE TIME | TIMING (RESIDENCE TIME) | | | | | | | | | | |
|---|---|---|---|---|---|---|---|---|---|---|---|---|
| | | 1 HR. | 2 HR. | 3 HR. | 4 HR. | 5 HR. | 6 HR. | 7 HR. | 8 HR. | 9 HR. | 10 HR. | 11 HR. |
| SUBMERGED MEMBRANE SEPARATION TANK | 1 HR. | ━━ | | | | | | | | | | |
| SECOND SUBMERGED MEMBRANE SEPARATION TANK | 2 HR. | | ━━━━━━━ | | | | | | | | | |

STRUCTURE OF FOAM SEPARATION TANK

METAL CONTAINING WASTE WATER TREATMENT METHOD AND METAL CONTAINING WASTE WATER TREATMENT EQUIPMENT

BACKGROUND OF THE INVENTION

This invention relates to a metal containing waste water treatment method and treatment equipment, which collects gallium and arsenic from a waste water that contains gallium as a valuable metal and arsenic as a poisonous metal and recycles the substances. This invention further relates to a metal containing waste water treatment method and treatment equipment, which can constitute a completely closed treatment system of a (gallium arsenide) waste water or the like from compound semiconductor plant by carrying out pretreatment appropriate for the remaining treated water to recycle the resulting liquid as a raw water for an ultrapure water generating system. This invention further relates to a metal containing waste water treatment method for providing a completely closed treatment system of a (gallium arsenide, gallium phosphide and so on) waste water from compound semiconductor plant by separately collecting (1) gallium and (2) a mixture of arsenic and phosphorus from the waste water from compound semiconductor plant that contains gallium as a valuable metal, arsenic as a poisonous metal and so on, recycling the substances in another place and carrying out pretreatment optimum for the remaining water to recycle the resulting liquid as a raw water for an ultrapure water generating system.

Conventionally, it has been the most general way to treat the gallium arsenide containing waste water by the so-called neutralizing coagulation and sedimentation method for treating the waste water with ferric chloride as a coagulant, a neutralizer and a high molecular coagulant added. According to this neutralizing coagulation and sedimentation method, a sedimentation has been treated and disposed of as an industrial waste under the legal regulations.

On the other hand, there is a method for collecting a concentrate by evaporating and concentrating the gallium arsenide containing waste water, restoring the evaporated water into water by cooling and carrying out appropriate pretreatment to recycle the resulting liquid as a raw water for an ultrapure water generating system.

There is another prior art disclosed in Japanese Patent Laid-Open Publication No. 2000-117270. This prior art adjusts the pH of a metal containing waste water with an alkali agent of sodium hydroxide or the like, forms a metalhydroxide, thereafter makes the waste water pass through a membrane separation unit that has a pore diameter of 1 mm to 10 mm to thereby efficiently separate water from metalhydroxide and collect and recycle the valuable metal. Further, as a pretreatment process, the pH of the metal containing waste water is adjusted to 3 to 4, hydroxides of iron and chromium are separated and collected to selectively separate and collect the metals.

As shown in concrete in FIG. 58, this prior art treatment equipment disclosed in Japanese Patent Laid-Open Publication No. 2000-117270 is constructed of a pH adjustment tank 941, an MF membrane separation unit 942 filled with a ceramic membrane or the like, a pump 943, a pH readjustment tank 944, an RO membrane separation unit 945 and a redissolution tank 946.

Then, waste water, which contains heavy metals, is supplied so that a residence time in the pH adjustment tank 941 becomes 30 minutes. Subsequently, the pump 943 connected to the MF membrane separation unit 942 is operated.

The pump 943 of the treated water is interlocked with a liquid level switch placed in the pH adjustment tank 941 and controlled by the water level of the pH adjustment tank 941. The metalhydroxide generated in the pH adjustment tank 941 is concentrated by a film placed in the MF membrane separation unit 942.

On the other hand, the concentrated metalhydroxide is dissolved in the redissolution tank 946 and becomes a high-concentration nickel and zinc solution to be recycled in a plating bath and the like of the plant.

Another prior art disclosed in the aforementioned Japanese Patent Laid-Open Publication No. 2000-117270 will be described with reference to FIG. 59. This prior art treatment unit is constructed of a ferrooxidans bacterium reaction tank 1048, an MF membrane separation unit 1049, a pH adjustment tank 1041, an MF membrane separation unit 1042, a pH readjustment tank 1044, an RO membrane separation unit 1045 and so on.

Then, the pH of the waste water in the ferrooxidans bacterium reaction tank 1048 is adjusted to pH 3 with sulfuric acid and sodium hydroxide, while nitrogen and phosphorus are added as a nutrient. A ferrooxidans bacterium collecting MF membrane separation unit 1049 is placed inside this ferrooxidans bacterium reaction tank 1048. An MF membrane that is made of silica alumina-based ceramics and has a pore diameter of 10 $\mu$m is employed for this MF membrane separation unit 1049. This MF membrane has its membrane surface continuously cleaned from inside the membrane by air.

Part of the concentrate brine of iron hydroxide, chromium hydroxide and the ferrooxidans bacterium, generated by this MF membrane, is sent back to the ferrooxidans bacterium reaction tank 1048, and another part is extracted, dried, granulated and thereafter recycled. Inside this ferrooxidans bacterium reaction tank 1048, iron hydroxide, chromium hydroxide and the ferrooxidans bacteria are accumulated and controlled within an MLSS (Mixed Liquor Suspended Solids) concentration from 100 to 200 mg/l (milligrams/liter). Further, the pH of the ferrooxidans bacterium treated water is adjusted to 9 by a sodium hydroxide solution in the pH adjustment tank 1041. Then, after stirring, a hydroxide of nickel and zinc is generated.

Subsequently, the water is made to pass from the pH adjustment tank 1041 to the MF membrane separation unit 1042 placed outside the pH adjustment tank 1041 by the pump 1043.

Yet another prior art (third prior art) is disclosed in Japanese Patent Laid-Open Publication No. HEI 9-285786. According to this third prior art, as shown in FIG. 60, mixed water 1175 obtained by preliminarily adding a chemical for precipitating arsenic or an adsorbent for adsorbing arsenic to raw water that contains arsenic is flowed into a membrane filter tank 1174.

Otherwise, arsenic in the raw water is precipitated by making the raw water flow into the membrane filter tank 1174 and making mixed water by adding the aforementioned chemical or adsorbent. Otherwise, adsorption to the adsorbent is effected, and solid-liquid separation of mixed water 1176 inside the membrane filter tank 1174 is effected by a membrane filter 1173 (submerged membrane) placed inside the tank 1174. In the above case, the precipitation of arsenic is promoted by setting the amount of a membrane filtered water 1177 with respect to the amount of influent water into the membrane filter tank 1174 to 99% or more and maintaining the added chemical at high concentration inside the membrane filter tank 1174. In FIG. 60 are shown a raw water introducing pipe 1171, a coagulant loading pipe 1172, a treatment tank 1175 and a water tank 1188.

This third prior art oxidizes trivalent arsenic into pentavalent arsenic by either one of a method for adding an oxidizer or a method for carrying out ozone treatment, thereafter introduces the mixed water to which the chemical or the adsorbent has been added into the membrane filter tank 1174 in which the submerged membrane is placed and separates arsenic by promoting the precipitation or adsorption of arsenic.

Still another prior art (fourth prior art) is disclosed in Japanese Patent No. HEI 3-61514. This fourth prior art is a waste water treatment method for removing arsenic from a waste water that contains gallium and arsenic and collecting gallium.

In concrete, soluble ferric salt is added to the waste water that contains gallium and arsenic, and gallium and arsenic are coprecipitated with the precipitation of ferric hydroxide by adjusting the pH with an alkali agent.

Then, the precipitate is suspended in water, and gallium is eluted from the precipitate by adjusting the pH to the alkali side with sodium hydroxide, or an alkali agent added. After separation from the precipitate, water is evaporated and hardened by drying to collect gallium.

The aforementioned prior art of Japanese Patent Laid-Open Publication No. 2000-117270 describes the "metal containing waste water treatment and valuable metal collecting method characterized by forming a metalhydroxide by adjusting the pH of the metal containing waste water, thereafter making the resulting liquid pass through a membrane separation unit that has a pore diameter of 1 mm to 10 mm, thereby separating water from metalhydroxide".

In contrast to this, according to the gallium arsenide process in a semiconductor plant, the liquid is circulated in the unit using a filter that has a pore diameter of not greater than 1 $\mu$m (pore diameter of 0.4 $\mu$m, for example) in a back polishing unit, or production equipment in the plant. Therefore, particles of not smaller than 0.4 $\mu$m are discharged in the waste water. In order to catch the particles of not smaller than 0.4 $\mu$m, it is required to make the water pass through a membrane separation unit that has a pore diameter of 0.4 $\mu$m.

On the other hand, it is required to carefully examine the pore diameter of the MF membrane to be adopted considering the fact that the general MF membrane has a pore diameter of about 1 $\mu$m to 10 $\mu$m and the fact that the pump power is increased when the pore diameter is reduced, also in consideration of energy saving.

Moreover, there are availed on the market UF's (Ultra Filter: ultrafiltration membrane) that have a pore diameter of about 0.002 $\mu$m to 0.4 $\mu$m. Therefore, it is proper to select the model conforming to the purpose and construct an energy-saving system.

The prior art disclosed in Japanese Patent Laid-Open Publication No. 2000-117270 cannot collect metal at high concentration (10% or more) and discharges metal ions collected by a reverse osmosis membrane in the waste water without recycling the metal ions. In the MF membrane separation unit of Japanese Patent Laid-Open Publication No. 2000-117270, the electrical energy consumed by the pump is large.

The aforementioned prior art (Japanese Patent Laid-Open Publication No. 2000-117270) describes the "metal containing waste water treatment and valuable metal collecting method characterized by forming a metalhydroxide by adjusting the pH of the metal containing waste water, concurrently loading a high molecular coagulant or a liquid chelating agent to form a flock of metalhydroxide and thereafter making the resulting liquid pass through a membrane separation unit that has a pore diameter of 50 $\mu$m to 200 $\mu$m, thereby separating water from the flock of metalhydroxide".

Although a concession is made to the fact that this description is intended for hydroxide, it is desired that the impurities of coagulant and so on should not be included, in order to collect gallium, or the valuable metal. In concrete, although only the gallium hydroxide is desired to be included, the high molecular coagulant or the liquid chelating agent is concurrently loaded to form a flock of metalhydroxide according to this prior art.

Furthermore, the aforementioned prior art (Japanese Patent Laid-Open Publication No. 2000-117270) describes the "metal containing waste water treatment and valuable metal collecting method characterized by forming a hydroxide of chromium and iron from the metal containing waste water that contains ions of trivalent chromium and bivalent iron through the oxidation of the bivalent iron to trivalent iron with pH adjusted to 3 to 4 in the first stage, thereafter making the resulting liquid pass through a membrane separation unit that has a pore diameter of 1 $\mu$m to 10 $\mu$m to thereby separate water from the hydroxides of iron and chromium and next separating and collecting the remaining metals from the treated water in the second stage according to the methods claimed in claim 1 or 2".

If the gallium arsenide waste water is treated by applying this prior art, there is the problem that the arsenic is oxidized from trivalent arsenic to pentavalent arsenic and easily precipitated and becomes a mixture of hydroxides of arsenic and gallium as a precipitate, causing a trouble in refining and collecting gallium.

There is a cost merit when the gallium hydroxide and the pentavalent arsenic are independently separately collected to the utmost.

Moreover, the aforementioned prior art (Japanese Patent Laid-Open Publication No. 2000-117270) describes the "metal containing waste water treatment and valuable metal collecting method as claimed in claim 3, characterized in that a ferrooxidans bacterium is used in oxidizing the bivalent iron to the trivalent iron". In contrast to this, there is the problem that the ferrooxidans bacterium is not useful when treating the gallium arsenide waste water.

Moreover, the aforementioned prior art (Japanese Patent Laid-Open Publication No. 2000-117270) describes the "metal containing waste water treatment and valuable metal collecting method characterized in that, when metals are separated and collected from the metal containing waste water that contains ions of nickel, zinc, trivalent chromium and bivalent iron according to the method as claimed in claim 3 or 4, hydroxides of nickel and zinc are formed by adjusting the pH to 8 to 10 in the second stage, separating water from the hydroxides of nickel and zinc.

However, in contrast to the requirement of the formation of a precipitate by adding a coagulant after the oxidation of arsenic in the second stage, i.e., after arsenic is made to be a stable insoluble salt in the case of the gallium arsenide waste water, the aforementioned prior art has the problem that no oxidation process exists.

Moreover, the aforementioned prior art (Japanese Patent Laid-Open Publication No. 2000-117270) describes the "metal containing waste water treatment and valuable metal collecting method as claimed in any one of claims 1 through 5, characterized in that a membrane made of ceramics is employed as a membrane separation unit". However, the membrane separation unit made of ceramics is generally expensive.

Moreover, the aforementioned prior art (Japanese Patent Laid-Open Publication No. 2000-117270) describes the "metal containing waste water treatment and valuable metal collecting method as claimed in any one of claims 1 through 6, characterized in that the metal of the concentrate of the metalhydroxide that has been separated and collected is re-dissolved by adjusting the pH to 0.5 to 3 by sulfuric acid, and the concentrate brine of the metal is collected and recycled.

However, there is a further problem that a concentration and precipitation process is needed after the membrane separation of the prior art since there is required a gallium slurry of which the gallium concentration is as high as possible when gallium is refined from the gallium arsenide waste water.

Moreover, the aforementioned prior art (Japanese Patent Laid-Open Publication No. 2000-117270) describes the "metal containing waste water treatment and valuable metal collecting method as claimed in any one of claims 1 through 7, characterized in that the treated water from which the metalhydroxide has been separated and collected is recycled by making the treated water pass through a reverse osmosis membrane."

However, in contrast to the necessity of a pretreatment system before the gallium arsenide waste water is made to pass through the reverse osmosis membrane, the prior art has no pretreatment process.

Moreover, the aforementioned prior art (Japanese Patent Laid-Open Publication No. 2000-117270) has the problem that the power of the pump (pump 1043 and pump 1050) related to the MF membrane separation unit is great now that energy saving is valued.

The third prior art (Japanese Patent Laid-Open Publication No. HEI 9-285786) discloses in the claim 1 the "water treatment equipment operating method by means of an immersion type membrane filter unit characterized in that the precipitation or adsorption of arsenic is promoted by flowing a mixed water obtained by preliminarily adding a chemical for precipitating arsenic or an adsorbent for adsorbing arsenic to a raw water that contains arsenic into a membrane filter tank or by flowing the raw water into the membrane filter tank then forming a mixed water with the added chemical or adsorbent, thereby precipitating the arsenic in the raw water or adsorbing the arsenic to the adsorbent, and effecting solid-liquid separation of the mixed water inside the membrane filter tank by the immersion type membrane filter unit placed in the tank and setting the amount of membrane filtered water with respect to the amount of influent water into the membrane filter tank to 99% or more when the membrane filtered water that has passed through the membrane surface of the immersion type membrane filter unit is unloaded from the tank, thereby maintaining the chemical or the adsorbent at high concentration in the membrane filter tank".

In this claim 1, although arsenic can be treated, there is no process for separating two metals apart from each other as in the case of the gallium arsenide waste water. Moreover, the claim 2 claims the "water treatment equipment operating method by means of the immersion type membrane filter unit claimed in claim 1, characterized in that the arsenic in the raw water is oxidized to the pentavalent arsenic ion by either adding an oxidizer to the raw water or treating the raw water with ozone". This claim 2, which employs the chemical for oxidizing the arsenic in the raw water to the pentavalent arsenic ion, requires a chemical cost.

SUMMARY OF THE INVENTION

Accordingly, the object of this invention is to provide a metal containing waste water treatment method and treatment equipment capable of establishing a completely closed treatment system of the waste water by efficiently and stably treating the metal containing waste water discharged from a compound semiconductor plant, saving energy and collecting and recycling valuable metals from the waste water as valuable substances.

Another object of this invention is to provide a metal containing waste water treatment method capable of establishing a completely closed treatment system of the waste water by recycling the sodium ions of the added sodium hydroxide and recycling by treatment the waste water as a raw water for an ultrapure water generating system.

In order to achieve the above objects, there is provided a metal containing waste water treatment method comprising the steps of:

introducing a metal containing waste water from above into a submerged membrane separation tank in which a reaction section, a submerged membrane section that has a submerged membrane and a precipitation section are arranged in order from top to bottom;

adding a pH adjuster to the reaction section so as to cause a reaction with the metal containing waste water;

separating the metal containing waste water into water and metal by the submerged membrane of the submerged membrane section; and precipitating and concentrating the separated metal in the precipitation section.

According to the treatment method of this invention, the pH adjuster is added to the reaction section. Therefore, a hydroxide can be formed and subjected to solid-liquid separation by the submerged membrane. Moreover, the metal can be precipitated and concentrated in the precipitation section by the action of gravity without using energy.

Also, there is provided metal containing waste water treatment equipment comprising:

a submerged membrane separation tank in which a reaction section, a submerged membrane section that has a submerged membrane and a precipitation section are arranged in order from top to bottom and into which a metal containing waste water is introduced from above, whereby a pH adjuster is added to the reaction section so as to cause a reaction with the metal containing waste water, the metal containing waste water is separated into water and metal in the submerged membrane section, and the separated metal is precipitated and concentrated in the precipitation section.

In the treatment equipment of this invention, the metal containing waste water is introduced from above into the submerged membrane separation tank, and the pH adjuster is added to the reaction section to cause a reaction, separating water and the metal from each other in the submerged membrane section and precipitating and concentrating the metal in the precipitation section. Through these processes, a hydroxide can be formed and subjected to solid-liquid separation by the submerged membrane. Moreover, the metal can be precipitated and concentrated in the precipitation section by the action of gravity without using energy.

In one embodiment of the present invention, the submerged membrane is an ultrafiltration membrane, a pH meter and a filler are placed in the reaction section, pH in the reaction section is adjusted to 4 to 5 and an air diffusion pipe is placed below the submerged membrane owned by the submerged membrane section.

In this embodiment, the submerged membrane is an ultrafiltration membrane, and the pH meter and the filler are placed in the reaction section, by which the pH in the reaction section is adjusted to 4 to 5. Therefore, it is enabled to efficiently generate gallium hydroxide and thereafter effect solid-liquid separation with high accuracy by the submerged membrane, or the ultrafiltration membrane.

In this embodiment, air is discharged from the air diffusion pipe placed below the submerged membrane, and the filler for stirring use is existing in the reaction section. Therefore, in the reaction section, the stirring of the waste water is promoted to ensure the reaction of the waste water with the pH adjuster, efficiently generating gallium hydroxide. Moreover, since the pH in the reaction section is adjusted to 4 to 5, the gallium in the waste water is selectively generated as gallium hydroxide.

In one embodiment of the present invention, the filler is a reaction promoting member of a line mixer or the like that has a stirring structure.

In this embodiment, the filler is a reaction promoting material such as a line mixer. Therefore, the stirring of the waste water is further promoted by air discharged from the air diffusion pipe and the filler in the reaction section. Even with a residence time of a few minutes, the reaction of the waste water with the pH adjuster is further ensured.

In one embodiment of the present invention, the water separated in the submerged membrane section is pretreated by being introduced into a pretreatment system and recycled as a raw water for an ultrapure water generating system.

In this embodiment, the water separated in the submerged membrane section is introduced into the pretreatment system to carry out pretreatment and recycled as a raw water for an ultrapure water generating system. Therefore, the effective use of water can be achieved, completing a closed treatment system.

Also, there is provided metal containing waste water treatment equipment comprising:

a first submerged membrane separation tank in which a first reaction section, a first submerged membrane section that has a first submerged membrane and a first precipitation section are arranged in order from top to bottom and into which a metal containing waste water is introduced from above; and a second submerged membrane separation tank in which a second reaction section, a second submerged membrane section that has a second submerged membrane and a second precipitation section are arranged in order from top to bottom and into which a treated water from the first submerged membrane section of the first submerged membrane separation tank is introduced from above, whereby the first submerged membrane separation tank serves to add a pH adjuster to the first reaction section so as to cause a reaction with the metal containing waste water, subsequently separate water and metal from the metal containing waste water by the first submerged membrane of the first submerged membrane section and subsequently precipitate and concentrate the metal in the first precipitation section located in a lowermost portion, and the second submerged membrane separation tank serves to add a coagulant and a pH adjuster to the second reaction section so as to cause a reaction, subsequently separate water and metal by the second submerged membrane of the second submerged membrane section and subsequently precipitate and concentrate the metal in the second precipitation section located in a lowermost portion.

The waste water treatment equipment of this invention is provided with the first submerged membrane separation tank and the second submerged membrane separation tank. Therefore, the precipitates of two groups can be separated, concentrated and precipitated.

In the first submerged membrane separation tank, the hydroxide formed by the pH adjuster can be concentrated, precipitated and separated. In the second submerged membrane separation tank, the coagulant and the pH adjuster are added to the treated water (separated water) that has undergone separation by the membrane in the first submerged membrane separation tank. Through this process, a larger precipitate such as a flock can be formed, enabling the hydroxide to be concentrated, precipitated and separated.

In one embodiment of the present invention, the water separated in the second submerged membrane section is pretreated by being introduced into the pretreatment system and recycled as a raw water for an ultrapure water generating system.

In this embodiment, the water separated in the second submerged membrane section is introduced into the pretreatment system to carry out pretreatment and recycled as a raw water for the ultrapure water generating system. Therefore, the water treated by the membranes of two stages is to be pretreated. Therefore, the load of the pretreatment system is reduced and easily recycled as a raw water for the ultrapure water generating system.

Also, there is provided metal containing waste water treatment equipment comprising:

a first submerged membrane separation tank in which a first reaction section, a first submerged membrane section that has a first submerged membrane and a first precipitation section are arranged in order from top to bottom and into which a metal containing waste water is introduced from above, the first submerged membrane separation tank serving to add a pH adjuster to the first reaction section so as to cause a reaction with the metal containing waste water, subsequently separate water and metal from the metal containing waste water by the first submerged membrane of the first submerged membrane section and subsequently precipitate and concentrate the metal in the first precipitation section located in a lowermost portion;

a second submerged membrane separation tank in which a second reaction section, a second submerged membrane section that has a second submerged membrane and a second precipitation section are arranged in order from top to bottom and into which a treated water from the first submerged membrane of the first submerged membrane separation tank is introduced from above, the second submerged membrane separation tank serving to add a coagulant and a pH adjuster to the second reaction section so as to cause a reaction, subsequently separate water and metal by the second submerged membrane of the second submerged membrane section and subsequently precipitate and concentrate the metal in the second precipitation section located in a lowermost portion; and a third submerged membrane separation tank that has a third submerged membrane.

In the treatment equipment of this invention, the treated water from the first submerged membrane and the precipitate from the third submerged membrane separation tank are introduced from above into the second submerged membrane separation tank. Therefore, in this second submerged membrane separation tank, the mixed waste water is treated while receiving the influence of the precipitate from the third submerged membrane separation tank. Moreover, in the second reaction section, the coagulant and the pH adjuster are added. Therefore, in the second reaction section, a larger precipitate such as a flock is formed and able to be concentrated, precipitated and separated.

In one embodiment of the present invention, the metal containing waste water is a waste water that contains a compound semiconductor, and the pH adjuster is sodium hydroxide.

In this embodiment, the metal containing waste water is the waste water from compound semiconductor plant, and the pH adjuster is sodium hydroxide. Therefore, with the metal related to the compound semiconductor plant, a hydroxide can be formed by sodium hydroxide.

In one embodiment of the present invention, the waste water that contains the compound semiconductor is a waste water that contains gallium arsenide.

In this embodiment, the waste water from compound semiconductor plant is the waste water that contains gallium arsenide. Therefore, gallium can be collected as gallium hydroxide.

In one embodiment of the present invention, the ultrafiltration membrane has a pore diameter of 0.1 $\mu$m to 1.0 $\mu$m.

In this embodiment, the pore diameter of the ultrafiltration membrane is 0.1 $\mu$m to 1.0 $\mu$m. Therefore, a minute solid matter can reliably be separated.

In one embodiment of the present invention, the pretreatment system is any one or a combination of an activated carbon absorption unit, an ion exchange unit and a reverse osmosis membrane unit.

In this embodiment, the pretreatment system is any one or a combination of the activated carbon absorption unit, the ion exchange unit and the reverse osmosis membrane unit. Therefore, even if some organic matter, ions, minute particles and so on are existing in the treated water to the pretreatment system, the substances can reliably be removed resulting in pretreated as a raw water for the ultrapure water generating system.

In one embodiment of the present invention, the metal containing waste water is a waste water that contains gallium arsenide, and the metal precipitated and concentrated in the precipitation section is gallium hydroxide.

In this embodiment, the metal containing waste water is the waste water that contains gallium arsenide, and the precipitated concentrated metal is gallium hydroxide. Therefore, the gallium hydroxide can be received as a valuable substance by the gallium manufacturer, and this enables the recycling of gallium.

In one embodiment of the present invention, the coagulant is ferric chloride, and the pH adjuster is sodium hydroxide.

Also, in one embodiment of the present invention, the coagulant is ferric chloride, and the pH adjuster is sodium hydroxide.

According to the embodiment, the coagulant is ferric chloride, and the pH adjuster is sodium hydroxide. Therefore, arsenic can be made to be an insoluble salt as iron arsenate.

In one embodiment of the present invention, the metal containing waste water is a waste water that contains gallium arsenide, the precipitated concentrated metal in the first submerged membrane separation tank is gallium hydroxide, and the precipitated concentrated metal in the second submerged membrane separation tank is iron arsenate.

In this embodiment, the metal containing waste water is the waste water that contains gallium arsenide, the precipitated concentrated metal in the first submerged membrane separation tank is gallium hydroxide, and the precipitated concentrated metal in the second submerged membrane separation tank is iron arsenate. Therefore, two kinds of metals can separately be collected, and this allows the easy refinement by the manufacturer.

In one embodiment of the present invention, a developer waste water discharged through a gallium arsenide process and a waste water that contains arsenic are introduced into the third submerged membrane separation tank.

In this embodiment, the developer waste water discharged from the gallium arsenide process that contains developer and arsenic is introduced into the third submerged membrane separation tank. Therefore, the arsenic oxidizing bacterium can be cultured and bred in the third submerged membrane separation tank using nitrogen in the developer contained in the waste water as a nutrient.

In one embodiment of the present invention, a slurry precipitated and concentrated in the second precipitation section located in the lowermost portion of the second submerged membrane separation tank is sent back to the third submerged membrane separation tank.

In this embodiment, the slurry precipitated and concentrated in the precipitation section located in the lowermost portion of the second submerged membrane separation tank is sent back to the third submerged membrane separation tank. Therefore, the necessary amount of arsenic oxidizing bacterium can be secured by being sent back to the third submerged membrane separation tank, and this can be utilized for oxidizing trivalent arsenic to pentavalent arsenic again in the second submerged membrane separation tank.

In one embodiment of the present invention, a developer waste water and an arsenic containing waste water are introduced into the third submerged membrane separation tank so as to culture an arsenic oxidizing bacterium, and the cultured arsenic oxidizing bacterium is introduced into the second submerged membrane separation tank.

In this embodiment, the developer containing waste water and the arsenic containing waste water are introduced into the third submerged membrane separation tank so as to culture the arsenic oxidizing bacterium, and the cultured arsenic oxidizing bacterium is introduced into the second submerged membrane separation tank. Therefore, the nitrogen component in the developer contained in the waste water can be utilized for culturing and breeding the arsenic oxidizing bacterium. Moreover, by utilizing the cultured arsenic oxidizing bacterium, the oxidation from trivalent arsenic to pentavalent arsenic in the second submerged membrane separation tank can efficiently be carried out at low cost.

In one embodiment of the present invention, a slurry precipitated and concentrated in the second precipitation section located in the lowermost portion of the second submerged membrane separation tank contains an arsenic oxidizing bacterium.

In this embodiment, the arsenic oxidizing bacterium adheres to the slurry precipitated and concentrated in the precipitation section in the lowermost portion of the second submerged membrane separation tank. Therefore, it is enabled to construct an optimum system by circulating necessary amount of the slurry within the system.

Also, there is provided a metal containing waste water treatment method for carrying out waste water treatment by microorganically oxidizing trivalent arsenic in the arsenic containing waste water to pentavalent arsenic by an arsenic oxidizing bacterium.

According to the treatment method of this invention, the waste water treatment is carried out by microorganically oxidizing trivalent arsenic in the arsenic containing waste water into pentavalent arsenic by the arsenic oxidizing bacterium. This obviates the need for using a chemical as an oxidizer and allows the reduction of the running cost.

In one embodiment of the present invention, the waste water treatment is carried out by changing the trivalent arsenic in the arsenic containing waste water into the pentavalent arsenic by the arsenic oxidizing bacterium and adding a coagulant and a pH adjuster.

In this embodiment, the waste water treatment is carried out by changing trivalent arsenic in the arsenic containing waste water into pentavalent arsenic by the arsenic oxidizing bacterium with the coagulant added. Therefore, arsenic as an insoluble salt is caught and formed into a large flock by the coagulant and the pH adjuster.

Also, there is provided a metal containing waste water treatment method for collecting metal from a metal containing waste water, comprising the steps of:

separating a first metalhydroxide from the waste water by making the metal containing waste water pass through a first submerged membrane separation unit with a pH adjuster added;

separating a concentrate brine that contains another metal dissolved in the waste water from the waste water by making the waste water pass through a reverse osmosis membrane separation unit; and sending the concentrate brine that contains said another metal back to the first submerged membrane separation unit and adding the concentrate brine to the waste water together with the pH adjuster.

According to the treatment method of this invention, when the metal containing waste water is made to pass through the first submerged membrane separation unit after the formation of a metalhydroxide through the reaction with the pH adjuster added, then the metalhydroxide can be concentrated in the first submerged membrane separation unit.

Moreover, another metal, which has passed through the first submerged membrane separation unit, is made to pass through the reverse osmosis membrane separation unit. Because of the reverse osmosis membrane separation unit used this time, the metal moves to the concentrate brine side. By sending again the concentrate brine that contains another metal as a new pH adjuster back to the waste water so as to be added, the amount of use of the new pH adjuster can be reduced. That is, the running cost can be reduced.

In one embodiment of the present invention, the metal containing waste water is made to pass through the second submerged membrane separation unit with a pH adjuster and a coagulant added to the metal containing waste water in a stage behind the first submerged membrane separation unit, the resulting liquid is made to pass through the reverse osmosis membrane separation unit with a pH adjuster added and further pass through an ultrapure water generating system arranged in a stage behind the reverse osmosis membrane separation unit, and the concentrate brine from the reverse osmosis membrane separation unit is sent back to the first submerged membrane separation unit and added to the waste water together with the pH adjuster.

According to this embodiment, the pH adjuster is added to the waste water so as to generate water and a first metalhydroxide. The water and the first metalhydroxide are separated into water and the concentrate of the first metalhydroxide by the first submerged membrane separation unit.

Subsequently, the pH adjuster (sodium hydroxide, for example) and the coagulant (ferric chloride, for example) are added to the waste water in the stage behind the first submerged membrane separation unit. Subsequently, the waste water in which the second metal (arsenic) is dissolved can be separated into water and a second metallic concentrate by the second submerged membrane separation unit.

Further, the metal (sodium ions) concentrated by the reverse osmosis membrane separation unit in the stage behind the second submerged membrane separation unit is sent back and added to the stage before the initial first submerged membrane separation unit and able to be recycled as a pH adjuster.

According to this embodiment, the two kinds of first and second metals can be separated and collected by the first and second submerged membrane separation units. At the same time, the metal (sodium) included in the pH adjuster added initially can be recycled as a pH adjuster, and this produces the effect of reducing the running cost.

In one embodiment of the present invention, the water obtained from an electric deionization unit arranged behind the reverse osmosis membrane separation unit is recycled by being introduced into an ultrapure water generating system, and a concentrate brine from the reverse osmosis membrane separation unit and the electric deionization unit is sent back to the first submerged membrane separation unit, added to the waste water together with the pH adjuster and made to pass through the first submerged membrane separation unit.

According to this embodiment, the water quality of the ultrapure water generating system can be improved by placing the electric deionization unit behind the reverse osmosis membrane separation unit, effecting electric deionization and reducing the load of the ultrapure water generating system in the subsequent stage.

The electric deionization unit is not required to be reproduced by acid or alkali as in the case of the ion exchange resin, and, of course, no waste liquid is generated. Therefore, the waste water treatment equipment can be obviated. That is, since the electric deionization unit is used, the system can be completed without using a chemical substance as a chemical nor generating a waste liquid, producing the effect of providing an environment-friendly system.

In one embodiment of the present invention, a pH adjuster, a coagulant and metal oxidizing bacterium are added in a stage behind the first submerged membrane separation unit and before the second submerged membrane separation unit.

According to this embodiment, the pH adjuster, the coagulant and the metal oxidizing bacterium are added in the stage behind the first submerged membrane separation unit. Therefore, the metal in the waste water can be oxidized by this metal oxidizing bacterium, allowing the metal to be stabilized.

According to this embodiment, the metal is oxidized not by the oxidizer as a chemical but by using the metal oxidizing bacterium. Therefore, the chemical cost can be saved, and the running cost can be reduced.

Also, there is provided a metal containing waste water treatment method comprising the steps of:

introducing a metal containing compound semiconductor waste water from above into a first submerged membrane separation tank in which a reaction section, a submerged membrane section that has a submerged membrane and a precipitation section are arranged in order from top to bottom and adding a pH adjuster to the reaction section so as to cause a reaction;

subsequently separating metal from the waste water by the submerged membrane of the submerged membrane section and subsequently precipitating and concentrating the metal in the precipitation section;

treating a treated water obtained by the submerged membrane sequentially in an arsenic- and phosphorus-removing unit, an activated carbon adsorption unit, a reverse osmosis membrane unit and an electric deionization unit and thereafter introducing the resulting liquid into an ultrapure water generating system; and sending a concentrate brine from the reverse osmosis membrane separation unit and the electric deionization unit back to the reaction section.

According to the treatment method of this invention, gallium as a metal can be collected, and arsenic and phosphorus in the separated water are removed by the arsenic- and phosphorus-removing unit and further pretreated to recycle the water for the ultrapure water generating system. Therefore, a completely closed treatment system of the waste water that contains gallium, arsenic and phosphorus can be completed.

Moreover, by sending the concentrate brine from the reverse osmosis membrane separation unit and the electric deionization unit back to the reaction section of the first submerged membrane separation tank, the metal (sodium ions) in the concentrate brine can be sent back and recycled. This enables the reduction in the amount of use of sodium hydroxide as a pH adjuster and the reduction in the running cost.

In one embodiment of the present invention, a concentrate concentrated in the first submerged membrane separation tank is further concentrated by being introduced into a second submerged membrane separation tank arranged below the first submerged membrane separation tank.

According to this embodiment, the second submerged membrane separation tank is arranged below the first submerged membrane separation tank. Therefore, the metal in the waste water can be concentrated by the physical means in two steps without consuming a vast amount of energy like that of the evaporator, and this allows the concentration of the concentrate brine to be increased.

In one embodiment of the present invention, a treated water from the submerged membrane of the first submerged membrane separation tank and the submerged membrane of the second submerged membrane separation tank are introduced into a reaction section of a third submerged membrane separation tank together with a pH adjuster and a coagulant, the precipitate in the third submerged membrane separation tank is further concentrated in a fourth submerged membrane separation tank, a treated water separated by the submerged membranes of the third submerged membrane separation tank and the fourth submerged membrane separation tank is meanwhile treated sequentially in an activated carbon adsorption unit, a reverse osmosis membrane unit and an electric deionization unit and thereafter introduced into an ultrapure water generating system, and a concentrate brine from the reverse osmosis membrane unit and the electric deionization unit is sent back to a reaction section of the first submerged membrane separation tank.

According to this embodiment, after the separation of gallium and arsenic, gallium and arsenic can be each concentrated by the two-stage submerged membrane separation tank (second submerged membrane separation tank and fourth submerged membrane separation tank) without consuming a vast amount of energy like that of the evaporator. Therefore, according to this embodiment, gallium and arsenic can be concentrated while saving energy as far as possible.

In one embodiment of the present invention, an arsenic oxidizing bacterium is cultured and concentrated by introducing part of the metal containing waste water from compound semiconductor plant and a developer waste water into a fifth submerged membrane separation tank, and the arsenic oxidizing bacterium is introduced into the third submerged membrane separation tank.

According to this embodiment, the arsenic oxidizing bacterium cultured and concentrated in the fifth submerged membrane separation tank is introduced into the third submerged membrane separation tank. Therefore, in this third submerged membrane separation tank, trivalent arsenic can be concentrated and separated as stable pentavalent arsenic by the arsenic oxidizing bacterium. Moreover, since no oxidizer is used as a chemical, the running cost can be reduced.

Moreover, the arsenic oxidizing bacterium propagates using the organic matter in the developer contained in the waste water discharged from the compound semiconductor fabricating process as a nutrient in fifth submerged membrane separation tank and propagates on the basis of the arsenic included in the waste water. For this reason, there is no need for using the costing nutrient in culturing the arsenic oxidizing bacterium, and the running cost can be reduced.

In one embodiment of the present invention, part of the concentrate brine precipitated in the third submerged membrane separation tank is sent back to the fifth submerged membrane separation tank.

According to this embodiment, part of the concentrate brine precipitated in the third submerged membrane separation tank is sent back to the fifth submerged membrane separation tank. Therefore, the arsenic oxidizing bacterium in the concentrate brine can be recycled, and the speed of culturing the arsenic oxidizing bacterium in the fifth submerged membrane separation tank can be increased.

In one embodiment of the present invention, the arsenic oxidizing bacterium cultured in the fifth submerged membrane separation tank is introduced into the first submerged membrane separation tank and the third submerged membrane separation tank.

According to this embodiment, the arsenic oxidizing bacterium is introduced into the first submerged membrane separation tank and the third submerged membrane separation tank, allowing trivalent arsenic to be changed into stable pentavalent arsenic and allowing the organic matter in the waste water to be resolved by utilizing the organic matter resolving power possessed by the arsenic oxidizing bacterium. Consequently, the load on the ultrapure water generating system by the raw water quality can further be reduced.

In one embodiment of the present invention, the metal oxidizing bacterium is an arsenic oxidizing bacterium.

According to this embodiment, the metal can be oxidized without using an oxidizer as a chemical, and this produces the effect of reducing the running cost.

In one embodiment of the present invention, metal is precipitated and concentrated in the precipitation section and thereafter further concentrated by an evaporator.

According to this embodiment, the metal is precipitated and concentrated in the precipitation section and thereafter further concentrated by the evaporator, and therefore, the metal can be concentrated in a short time. Moreover, since the evaporator is used, the concentration can easily be increased to the desired level.

In one embodiment of the present invention, the liquid precipitated and concentrated in the first submerged membrane separation tank is concentrated by being introduced into an evaporator, and the liquid precipitated and concentrated in the third submerged membrane separation tank is meanwhile concentrated by being introduced into an evaporator.

According to this embodiment, different metals can be concentrated to the desired concentration level in a short time in the first submerged membrane separation tank and the third submerged membrane separation tank.

In one embodiment of the present invention, the waste water from compound semiconductor plant is a waste water that contains hydrogen peroxide containing gallium arsenide.

According to this embodiment, the hydrogen peroxide in the waste water is resolved by the anaerobic microorganism and becomes easily recycled as a raw water for the ultrapure water generating system.

Also, there is provided a metal containing waste water treatment method for treating metal and water contained in a waste water from compound semiconductor plant and separately collecting the metal and water, thereby establishing a completely closed treatment system.

According to the treatment method of this invention, a completely closed treatment system is established by treating and separately collecting the metal and water included in the waste water from compound semiconductors plant. This produces the effect of minimizing the influence exerted on the environment.

Also, there is provided a metal containing waste water treatment method for treating metal and water contained in a waste water from compound semiconductor plant, separately collecting the metal and water, collecting the metal as a valuable substance and meanwhile collecting the water as a raw water for an ultrapure water generating system, thereby establishing a completely closed treatment system.

According to the treatment method of this invention, a completely closed treatment system is established by treating and separately collecting the metal and water included in the waste water from compound semiconductors plant, collecting the metal as a valuable substance and collecting the water as a raw water for the ultrapure water generating system. Therefore, the influence exerted on the environment can be minimized, and the metal is collected as a valuable substance, allowing the economical efficiency to be improved.

Also, there is provided a metal containing waste water treatment method for treating gallium, arsenic and water in a gallium arsenide waste water and separately collecting the gallium, arsenic and water, thereby establishing a completely closed treatment system.

According to the treatment method of this invention, a completely closed treatment system is established by treating and separately collecting the gallium, arsenic and water included in the waste water. Therefore, the influence exerted on the environment can be minimized.

Also, there is provided a metal containing waste water treatment method for treating gallium, arsenic and water in a gallium arsenide waste water, separately collecting the gallium, arsenic and water, collecting the gallium and arsenic as valuable substances and meanwhile collecting the water as a raw water for an ultrapure water generating system, thereby establishing a completely closed treatment system.

According to the treatment method of this invention, a completely closed treatment system is established by treating and separately collecting the gallium, arsenic and water included in the waste water, collecting the metal as a valuable substance and collecting the water as a raw water for the ultrapure water generating system. Therefore, the influence exerted on the environment can be minimized, and the metal is collected as a valuable substance, allowing the economical efficiency to be improved.

In one embodiment of the present invention, a microorganism is used for treating the arsenic. According to this embodiment, arsenic can be treated by the power of the microorganism, and the running cost be reduced in comparison with the treatment with a chemical.

In one embodiment of the present invention, the microorganism is a metal oxidizing bacterium. According to this embodiment, the metal can be oxidized at low cost.

In one embodiment of the present invention, the metal oxidizing bacterium is an arsenic oxidizing bacterium. According to this embodiment, trivalent arsenic can be oxidized to pentavalent arsenic at low cost.

Also, there is provided a metal containing waste water treatment method for collecting metal from a metal containing waste water, comprising the steps of:

preliminarily adding a pH adjuster to the waste water so as to cause a reaction;

making the resulting waste water pass through a multistage type submerged membrane separation unit including submerged membranes arranged vertically in a plurality of tiers, an adhesional precipitation section arranged below the submerged membranes for precipitating a reactant by making the reactant adhere to a filler and a diaphragm for vibrating the submerged membranes in order to separate a metalhydroxide from the waste water;

separating a concentrate brine that contains another metal dissolved in the waste water from the waste water by making the treated water, from which the metalhydroxide has been removed, pass through a reverse osmosis membrane separation unit; and sending the concentrate brine that contains said another metal back to a stage before the multistage type submerged membrane separation unit and adding the concentrate brine to the waste water together with the pH adjuster.

According to the treatment method of this invention, the waste water is made to react with the pH adjuster added to form a metalhydroxide and thereafter made to pass through the submerged membrane separation unit in which the submerged membranes are placed vertically in a plurality of tiers. Through these processes, a large amount of metalhydroxide can efficiently be concentrated by this submerged membrane separation unit. That is, the treatment capability can be improved.

Moreover, another metal (sodium ions, for example) attributed to the pH adjuster, which has passed through the submerged membrane separation unit in which the submerged membranes are placed vertically in a plurality of tiers, is made to pass through the reverse osmosis membrane separation unit. Due to the reverse osmosis membrane separation unit used this time, the metal moves to the concentrate brine side. The concentrate brine that includes the metal is sent again back to the waste water together with the pH adjuster so as to be recycled, by which the amount of use of a new pH adjuster can be reduced.

In one embodiment of the present invention, a pH adjuster and a coagulant are added in a stage behind the multistage type submerged membrane separation unit that serves as a first multistage type submerged membrane separation unit, next the resulting waste water is made to pass through a second multistage type submerged membrane separation unit, which has submerged membranes arranged vertically in a plurality of tiers, an adhesional precipitation section for precipitating a reactant by making the reactant adhere to a filler and a diaphragm for vibrating the submerged membranes, the resulting liquid is subsequently made to pass through a reverse osmosis membrane separation unit with a pH adjuster added, a treated water from the reverse osmosis membrane separation unit is further introduced into an ultrapure water generating system arranged in a stage behind the reverse osmosis membrane separation unit, and the concentrate brine from the reverse osmosis membrane separation unit is sent back to a stage before the first multistage type submerged membrane separation unit and the concentrate brine is added to the waste water together with the pH adjuster.

According to this embodiment, the pH adjuster is added to the waste water, and a large amount of water and a large amount of metalhydroxide are efficiently separated into water and a concentrate by the submerged membrane separation unit in which the submerged membranes are placed vertically in a plurality of tiers. Subsequently, the pH adjuster (sodium hydroxide) and the coagulant (ferric chloride) are added, by which the metal (arsenic) dissolved in the water can be separated from a large amount of water as a large amount of concentrate. That is, the treatment capability can be improved.

Moreover, the metal (sodium ions) concentrated by the reverse osmosis membrane separation unit can be recycled by being sent back to the stage before the first submerged membrane separation unit in which the submerged membranes are placed vertically in a plurality of tiers.

In one embodiment of the present invention, the treated water obtained by the reverse osmosis membrane separation unit is made to pass through an electric deionization unit, a treated water obtained from the electric deionization unit is recycled by being introduced into an ultrapure water generating system, and a concentrate brine from the reverse osmosis membrane separation unit and the electric deionization unit is meanwhile sent back to the stage before the first multistage type submerged membrane separation unit and added to the waste water together with the pH adjuster.

According to this embodiment, the water quality of the ultrapure water generating system can be improved by arranging the electric deionization unit in the stage behind the reverse osmosis membrane separation unit and effecting electric deionization to reduce the load of the ultrapure water generating system in the subsequent stage. This electric deionization unit is not required to be reproduced by acid or alkali as in the case of the ion exchange resin, and, of course, no waste liquid is discharged by the reproduction. Therefore, the waste water treatment equipment can be obviated.

Moreover, the concentrate brine (concentrate brine containing sodium ions) from the electric deionization unit is sent back and made to pass through the first submerged membrane separation unit in which the submerged membranes are arranged vertically in a plurality of tiers. Therefore, the metal (sodium) ions can be recycled.

In one embodiment of the present invention, a pH adjuster, a coagulant and a metal oxidizing bacterium are added in a stage behind the first multistage type submerged membrane separation unit.

According to this embodiment, the pH adjuster, the coagulant and the metal oxidizing bacterium are added in the stage behind the first submerged membrane separation unit in which the submerged membranes are arranged vertically in a plurality of tiers. Therefore, concurrently with the improvement of the treatment capability of the submerged membranes arranged vertically in a plurality of tiers, the metal in the waste water can be oxidized by the metal oxidizing bacterium for the stabilization of the metal.

In particular, the oxidation is effected by means of the metal oxidizing bacterium without oxidizing the metal with the oxidizer as a chemical. Therefore, the chemical cost can be saved, and the running cost can be reduced.

Also, there is provided a metal containing waste water treatment method comprising the steps of:

adding a pH adjuster to a waste water from compound semiconductor plant in a pH adjustment tank so as to cause a reaction;

introducing the waste water from the pH adjustment tank upwardly in an upward flow into a multistage submerged membrane separation tank in which an upper portion where a pH meter is placed, a submerged membrane section that includes submerged membranes arranged vertically in a plurality of tiers and a diaphragm for vibrating the submerged membranes and an adhesional precipitation section for making a reactant adhere to a filler are arranged in order from top to bottom;

primarily separating a metal from the waste water by physically catching and filtering the metal in the waste water in the adhesional precipitation section and secondarily separating the metal from the waste water by the submerged membranes in the submerged membrane section;

treating a treated water obtained by the submerged membranes sequentially in an arsenic- and phosphorus-removing unit, an activated carbon adsorption unit, a reverse osmosis membrane unit and an electric deionization unit and thereafter introducing the resulting liquid into an ultrapure water generating system; and sending a concentrate brine from the reverse osmosis membrane unit and the electric deionization unit back to the pH adjustment tank.

According to the treatment method of this invention, the waste water from the pH adjustment tank is introduced from below into the multistage submerged membrane separation tank constructed of the upper portion where the pH meter is placed, the submerged membrane section where the diaphragm and the submerged membranes arranged vertically in a plurality of tiers and the adhesional precipitation section. Through this process, the pH inside the water tank can be first adjusted by the pH meter. Moreover, the treatment capability of the submerged membrane section can be improved by applying vibrations to the submerged membranes arranged vertically in a plurality of tiers to flake off the accretion to the submerged membranes.

Moreover, the waste water from the pH adjustment tank is first introduced into the adhesional precipitation section, and therefore, the solid matter in the waste water can be removed by being stuck to the filler of the adhesional precipitation section. It is to be noted that the solid matter in the waste water means the solid matter originally included in the waste water and the solid matter of hydroxide and so on formed by adding the pH adjuster.

The solid matter stuck to the filler, which includes the hydroxide, gradually grows with a lapse of time. As a result, the solid matter becomes easily precipitated and is able to be unloaded to the outside of the tank.

Moreover, by sending the concentrate brine from the reverse osmosis membrane separation unit and the electric deionization unit back to the pH adjustment tank, the metal (sodium, as one example) ions in the concentrate brine can be sent back and recycled.

It is to be noted that the compound semiconductor is the generic term of the substances that play the role of a semiconductor constructed by combining a plurality of elements, which are exemplified by gallium arsenide, gallium phosphide, indium phosphide, gallium nitride and zinc sulfide. The compound semiconductor can obtain high-frequency high-speed characteristics and a light-emitting characteristic superior to those of silicon.

In one embodiment of the present invention, the treated water and the concentrate brine from the first multistage type submerged membrane separation unit is treated by being introduced into a second submerged membrane separation tank arranged below the multistage type submerged membrane separation tank that serves as a first submerged membrane separation tank.

According to this embodiment, the waste water can be concentrated in two steps in the second submerged membrane separation tank arranged below the first submerged membrane separation tank, and the concentration level of the concentrate brine can be increased.

In one embodiment of the present invention, the pH adjustment tank is served as a first pH adjustment tank, the treated water from the submerged membrane of the first submerged membrane separation tank and the submerged membrane of the second submerged membrane separation tank is introduced into a second pH adjustment tank together with a pH adjuster so as to cause a reaction, the treated water from the second pH adjustment tank is subsequently introduced upwardly in an upward flow into a multistage submerged membrane separation tank that serves as a third submerged membrane separation tank in which an upper portion where a pH meter is placed, a submerged membrane section that includes submerged membranes arranged vertically in a plurality of tiers and a diaphragm for vibrating the submerged membranes and an adhesional precipitation section for precipitating a reactant by making the reactant adhere to a filler are arranged in order from top to bottom, a metal is separated from the treated water, the metal is further concentrated in a fourth submerged membrane separation tank arranged below the third submerged membrane separation tank, the treated water separated by the submerged membranes of the third submerged membrane separation tank and the fourth submerged membrane separation tank is treated sequentially in an activated carbon adsorption unit, a reverse osmosis membrane unit and an electric deionization unit and thereafter introduced into an ultrapure water generating system, and a concentrate brine from the reverse osmosis membrane unit and the electric deionization unit is sent back to the first pH adjustment tank.

According to this embodiment, the waste water treatment capability can be improved. At the same time, after the separation of two kinds of metals (gallium and arsenic, as one example) in the first and third submerged membrane separation tanks, the two kinds of metals (gallium and arsenic, as one example) can also be concentrated by the two-stage submerged membrane separation tanks (second submerged membrane separation tank and fourth submerged membrane separation tank). According to this invention, the two kinds of metals can be concentrated saving the energy as far as possible.

In one embodiment of the present invention, an arsenic oxidizing bacterium cultured and concentrated in the fifth submerged membrane separation tank into which part of the waste water from compound semiconductor plant that contains a developer waste water and a metal are introduced into the third submerged membrane separation tank.

According to this embodiment, the arsenic oxidizing bacterium cultured and concentrated is introduced into the third submerged membrane separation tank. Therefore, trivalent arsenic can be concentrated and separated as stable pentavalent arsenic by the arsenic oxidizing bacterium in this third submerged membrane separation tank. Moreover, since no oxidizer is used as a chemical, the running cost can be reduced.

Moreover, the arsenic oxidizing bacterium propagates using the organic matter in the developer contained in the waste water discharged from the compound semiconductor fabricating process as a nutrient in fifth submerged membrane separation tank and propagates on the basis of the arsenic included in the waste water. Therefore, the running cost can be reduced without using the costing nutrient for culturing the bacterium.

In one embodiment of the present invention, part of the concentrate brine precipitated in the third submerged membrane separation tank is sent back to the fifth submerged membrane separation tank.

According to this embodiment, part of the concentrate brine precipitated in the third submerged membrane separation tank is sent back to the fifth submerged membrane separation tank. Therefore, the arsenic oxidizing bacterium in the concentrate brine can be recycled, and the speed of culturing the arsenic oxidizing bacterium in the fifth submerged membrane separation tank can be increased.

In one embodiment of the present invention, an arsenic oxidizing bacterium cultured in the fifth submerged membrane separation tank is introduced into the first submerged membrane separation tank and the third submerged membrane separation tank.

According to this embodiment, the arsenic oxidizing bacterium is introduced into the first submerged membrane separation tank and the third submerged membrane separation tank. The organic load on the ultrapure water generating system by the raw water quality can further be reduced by not only changing trivalent arsenic into stable pentavalent arsenic but also resolving the organic matter in the waste water utilizing the organic matter resolving power possessed by the arsenic oxidizing bacterium.

In one embodiment of the present invention, the metal oxidizing bacterium is an arsenic oxidizing bacterium. According to this embodiment, the metal is oxidized without using a oxidizer as a chemical, resulting in a reduction of the running cost.

In one embodiment of the present invention, the resulting liquid is further condensed by being introduced into an evaporator after the metal is precipitated and condensed in the adhesional precipitation section.

According to this embodiment, the metal is precipitated and condensed in the adhesional precipitation section and thereafter further concentrated by being introduced into the evaporator. Therefore, the concentration can be achieved in a short time. Furthermore, since the evaporator is used, the concentration can easily be increased to the desired concentration level.

In one embodiment of the present invention, the liquid precipitated and concentrated in the first submerged membrane separation tank is concentrated by being introduced into an evaporator, and the liquid precipitated and concentrated in the third submerged membrane separation tank is concentrated by being introduced into an evaporator.

According to this embodiment, the concentrate brine from the first submerged membrane separation tank and the third submerged membrane separation tank are introduced into the respective evaporators, and different metals can be concentrated to the desired concentration level in a short time.

In one embodiment of the present invention, an influent water is a waste water from compound semiconductor plant that contains hydrogen peroxide containing gallium arsenide.

According to this embodiment, hydrogen peroxide in the waste water, which serves as an oxidizer, is treated by being resolved by the reducibility possessed by the anaerobic microorganism generated attendant on culturing the arsenic oxidizing bacterium at high concentration. Through this process, a treated water, which can easily be recycled as a raw water for the ultrapure water generating system, is obtained. Moreover, since the hydrogen peroxide in the waste water is treated by being resolved by the anaerobic microorganism, the running cost can be reduced in comparison with the method of using a chemical.

Also, there is provided a metal containing waste water treatment method for subjecting metal and water contained in a waste water from compound semiconductor plant to a physical treatment, a biological treatment and a chemical treatment to collect gallium and other metals by separation, thereby establishing a completely closed treatment system.

According to the treatment method of this invention, the metal and water included in the water from compound semiconductor plant are treated physically, biologically and chemically, i.e., subjected to all of the three treatment processes (physical treatment, biological treatment and chemical treatment). Therefore, the water quality of the treated water can be improved.

Moreover, the metal included in the waste water is collected by being separated into gallium and other metals. Therefore, the refinery manufacturer can easily recycle gallium, and other metals can also easily be recycled.

Moreover, a completely closed treatment system is established by separately collecting gallium and other metals. Therefore, the influence exerted on the environment can be minimized.

Also, there is provided a metal containing waste water treatment method for subjecting metal and water contained in a waste water from compound semiconductor plant to a physical treatment, a biological treatment and a chemical treatment to collect gallium and other metals by separation, collecting the metal as a valuable substance and collecting the water as a raw water for an ultrapure water generating system, thereby establishing a completely closed treatment system.

According to the treatment method of this invention, a completely closed treatment system is established by physically, biologically and chemically treating the metal and water included in the waste water, separately collecting the substances, collecting the metal as a valuable substance and collecting the water as a raw water for the ultrapure water generating system. As described above, according to this invention, the waste water is subjected to the three treatment processes. Therefore, the treatment is reliable, and the influence exerted on the environment can concurrently be minimized. Moreover, since the metal is collected as a valuable substance, the economic efficiency can be improved. Moreover, if the metal is collected as a valuable substance, there is no subjection to the law on waste disposal, and there are many merits including system control.

Also, there is provided a metal containing waste water treatment method for subjecting gallium, arsenic, phosphorus and water in a waste water that contains gallium arsenide and gallium phosphide to a physical treatment, a biological treatment and a chemical treatment, and separately collecting the substances as gallium and a mixture of arsenic and phosphorus, thereby establishing a completely closed treatment system.

According to the treatment method of this invention, the gallium arsenide and the gallium, arsenic, phosphorus and water contained in the gallium phosphide waste water are treated physically, biologically and chemically, and therefore, the treatment is reliable. Moreover, (1) gallium and (2) a mixture of arsenic and phosphorus, which are separately collected, can easily be recycled by the refinery manufacturer. Moreover, since a completely closed treatment system is established, the influence exerted on the environment can be minimized.

Also, there is provided a metal containing waste water treatment method for subjecting gallium, arsenic, phosphorus and water in a waste water that contains gallium arsenide and gallium phosphide to a physical treatment, a biological treatment and a chemical treatment, separately collecting the substances as gallium and a mixture of arsenic and phosphorus, collecting the gallium and the mixture of arsenic and phosphorus as valuable substances and collecting the water as a raw water for an ultrapure water generating system, thereby establishing a completely closed treatment system.

According to the treatment method of this invention, the gallium arsenide and the gallium, arsenic, phosphorus and water contained in the gallium phosphide waste water are subjected to the aforementioned three treatment processes, and therefore, the waste water can reliably be treated. Moreover, in this embodiment, the gallium and the mixture of arsenic and phosphorus, which are separately collected, can easily be recycled by the refinery manufacturer. Moreover, since the metals are collected as valuable substances, the economic efficiency can be increased. At the same time, the metals, which are not wastes, are not subjected to the law on waste disposal, and there is the merit that the statutory regulations are totally reduced. Moreover, a completely closed treatment system is established by collecting water as a raw water for the ultrapure water generating system. Therefore, the influence exerted on the environment can be minimized.

In one embodiment of the present invention, a microorganism is used for treating the arsenic.

According to this embodiment, the arsenic can be treated by the power of the microorganism, and the running cost can be reduced in comparison with the method with a chemical. The microorganic treatment generally has the feature that the running cost is low.

In one embodiment of the present invention, the microorganism is a metal oxidizing bacterium. According to this embodiment, the metal in the waste water can be oxidized at low cost.

In one embodiment of the present invention, the metal oxidizing bacterium is an arsenic oxidizing bacterium.

According to this embodiment, trivalent arsenic can be oxidized to pentavalent arsenic at low cost.

Also, there is provided a metal containing waste water treatment method for treating a waste water by introducing a waste water into a multistage submerged membrane separation tank constructed of a lower portion that has an adhesional precipitation section, a submerged membrane section that serves as an intermediate portion in which submerged membranes are arranged in a plurality of tiers and an upper portion where a pH meter is placed, from the lower portion.

According to the treatment method of this invention, the metal contained in the waste water is primarily treated by adhesion in the filtration section located in the lower portion and subsequently introduced into the submerged membrane section that serves as an intermediate section where the submerged membranes are arranged vertically in a plurality of tiers. In this intermediate section, the submerged membranes are arranged vertically in a plurality of tiers. Therefore, the treatment capability concerning the separation of water from metal is improved. Subsequently, water and metal can be separated from each other by adjusting the pH in the upper portion.

Also, there is provided A metal containing waste water treatment method for treating a waste water by introducing a waste water into a multistage submerged membrane separation tank constructed of a lower portion that has an adhesional precipitation section, a submerged membrane section serving as an intermediate portion that has submerged membranes arranged in a plurality of tiers and a vibrating device for vibrating the submerged membranes and an upper portion where a pH meter is placed, from the lower portion.

According to the treatment method of this invention, by vibrating the submerged membranes arranged in a plurality of tiers in the submerged membrane section by the vibrating device in the intermediate section of the multistage submerged membrane separation tank, the accretion on the submerged membrane is flaked off, allowing the treatment capability to be improved.

In one embodiment of the present invention, the multistage submerged membrane separation tank is provided with a vibrating device, and the vibrating device is constructed of a frequency transmitter, a diaphragm and a signal line.

According to this embodiment, the vibrating device is constructed of the frequency transmitter, the diaphragm and the signal line. Therefore, the treatment capability of the submerged membrane can be controlled by the frequency transmitter.

In one embodiment of the present invention, the submerged membranes are arranged vertically in a plurality of tiers, and the submerged membranes are cleaned by air discharged from one air diffusion pipe.

According to this embodiment, all of the submerged membranes arranged vertically in a plurality of tiers are cleaned by air discharged from one air diffusion pipe. Therefore, air can be saved, and energy saving can be achieved.

In one embodiment of the present invention, the multistage submerged membrane separation tank has an unloading port for unloading the submerged membranes arranged vertically in a plurality of tiers by horizontally moving the submerged membranes.

According to this embodiment, the submerged membranes arranged vertically in a plurality of tiers can be unloaded from the unloading port by being horizontally moved. It is to be noted that the conventional system, which has been to unload the submerged membranes from above the tank, has therefor been unable to arrange the submerged membranes vertically in a plurality of tiers. In contrast to this, according to this embodiment, the surface area of the submerged membranes is increased by arranging the submerged membranes vertically in a plurality of tiers, and this allows the treatment capability to be improved by the increased surface area.

Also, there is provided a metal containing waste water treatment method for collecting metal from a metal containing waste water, comprising the steps of:

preliminarily adding a pH adjuster to a waste water in a first pH adjustment tank so as to cause a reaction, thereafter introducing the generated metalhydroxide into a foam separation tank, making bubbles generated in the waste water in the foam separation tank adhere to the metalhydroxide and making the metalhydroxide surface, thereby subjecting the metalhydroxide to foam separation;

making a treated water obtained after the separation of the metalhydroxide pass through a multistage type submerged membrane separation unit that has submerged membranes arranged vertically in a plurality of tiers, an adhesional precipitation section that is placed below the submerged membranes and precipitate a reactant obtained through the reaction by making the reactant adhere to a filler and a diaphragm for vibrating the submerged membranes, thereby further separating the metalhydroxide from the treated water;

separating a concentrate brine that contains another metal dissolved in the treated water from the treated water by making the treated water pass through a reverse osmosis membrane separation unit and sending the concentrate brine that contains said another metal back to the first pH adjustment tank;

introducing the metalhydroxide separated in the foam separation tank and the multistage type submerged membrane separation unit into an evaporator and concentrating the metalhydroxide; and cooling steam evaporated from the evaporator to restore water and introducing the resulting water into a second pH adjustment tank in a stage before the reverse osmosis membrane separation unit.

According to the treatment method of this invention, the treated water can be obtained by treating the metal containing waste water in the first pH adjustment tank, the foam separation tank, the multistage type submerged membrane separation unit and the reverse osmosis membrane separation unit. The metal containing slurry can be obtained in a short time by introducing the metalhydroxide as a floating substance that has surfaced and separated in the foam separation tank and the concentrate that has been precipitated and concentrated in the multistage type submerged membrane separation tank directly into the evaporator.

In one embodiment of the present invention, the multistage type submerged membrane separation unit is served as a first multistage type submerged membrane separation unit, a reaction tank to which a pH adjuster and a coagulant are added is arranged in a stage behind the first multistage type submerged membrane separation unit and a treated water from the first multistage type submerged membrane separation unit is made to react, a treated water from the reaction tank is made to further pass through a second multistage type submerged membrane separation unit that has submerged membranes arranged vertically in a plurality of tiers, an adhesional precipitation section that is placed below the submerged membranes and precipitates a reactant obtained through the reaction by making the reactant adhere to a filler and a diaphragm for vibrating the submerged membranes, the resulting water is subsequently made to pass through a second pH adjustment tank to which a pH adjuster is added and a reverse osmosis membrane separation unit, a treated water from the reverse osmosis membrane separation unit is further introduced into an ultrapure water generating system arranged in a stage behind the reverse osmosis membrane separation unit, a concentrate brine from the reverse osmosis membrane separation unit is sent back to the first pH adjustment tank, a metalhydroxide separated by the foam separation tank, the first multistage type submerged membrane separation unit and the second multistage type submerged membrane separation unit is meanwhile introduced into an evaporator and concentrated, and steam evaporated from the evaporator is restored into water and utilized as a raw water for an ultrapure water generating system.

According to this embodiment, the metal containing waste water is treated in the first pH adjustment tank, the foam separation tank, the multistage type submerged membrane separation unit, the reaction tank, the second multistage type submerged membrane separation unit, the second pH adjustment tank and the reverse osmosis membrane separation unit. The treated water is introduced into the ultrapure water generating system to produce the ultrapure water, and the ultrapure water can be recycled by being supplied to each production unit.

Moreover, the first metal containing slurry can be obtained by introducing the metalhydroxide as a floating substance that has surfaced and separated in the foam separation tank and the concentrate that has been precipitated and concentrated in the multistage type submerged membrane separation tank into the evaporator. Also, the second metal containing slurry can be obtained by introducing the concentrate that has been precipitated and concentrated in the second multistage type submerged membrane separation unit into the evaporator. Through this process, the two kinds of high-concentration metal containing slurries can be obtained in a short time.

In one embodiment of the present invention, the treated water from the reverse osmosis membrane separation unit is made to pass through an electric deionization unit arranged in a stage behind the reverse osmosis membrane separation unit, a treated water from the electric deionization unit is recycled by being introduced into an ultrapure water generating system, and a concentrate brine from the reverse osmosis membrane separation unit and the electric deionization unit is sent back to the first pH adjustment tank and introduced into the tank together with the pH adjuster.

According to this embodiment, the metal containing waste water is treated in the first pH adjustment tank, the foam separation tank, the first multistage type submerged membrane separation unit, the reaction tank, the second multistage type submerged membrane separation unit, the second pH adjustment tank, the reverse osmosis membrane separation unit and the electric deionization unit. The treated water is introduced into the ultrapure water generating system to produce the ultrapure water, and the ultrapure water can be recycled by being supplied to each production unit.

Moreover, the first metal containing slurry can be obtained by introducing the metalhydroxide as a floating substance that has surfaced and separated in the foam separation tank and the concentrate that has been precipitated and concentrated in the multistage type membrane separation tank into the evaporator. Also, the second metal containing slurry can be obtained by introducing the concentrate that has been precipitated and concentrated in the second multistage type submerged membrane separation unit into the evaporator. Through this process, the two kinds of high-concentration metal containing slurries can be obtained in a short time. According to this embodiment, by virtue of the existence of the electric deionization unit, the ultrapure water can be produced without putting a load on the ultrapure water generating system.

In one embodiment of the present invention, a pH adjuster, a coagulant and a ferrooxidans bacterium are added to a reaction tank arranged in a stage behind the first multistage type membrane separation unit.

According to this embodiment, the pH adjuster, the coagulant and the metal oxidizing bacterium are added to the reaction tank arranged in the stage behind the first multistage type submerged membrane separation unit. Therefore, according to this embodiment, since the metal is oxidized by the metal oxidizing bacterium without using an oxidizer as a chemical, the running cost can be reduced.

Also, there is provided a metal containing waste water treatment method, comprising steps of:

introducing a compound semiconductor waste water that contains gallium arsenide, gallium phosphide and so on into a pH adjustment tank so as to cause a reaction with a pH adjuster added;

thereafter introducing a waste water from the pH adjustment tank into a foam separation tank, making bubbles generated in the waste water in the foam separation tank adhere to a metalhydroxide obtained through the reaction so as to make the metalhydroxide surface, thereby subjecting the metalhydroxide to foam separation;

introducing a treated water obtained after the separation of the metalhydroxide upwardly in an upward flow into a multistage type submerged membrane separation tank in which an upper portion where a pH meter is placed, a submerged membrane section that includes submerged membranes arranged vertically in a plurality of tiers and a diaphragm for vibrating the submerged membrane and an adhesional precipitation section for precipitating a reactant obtained through the reaction by making the reactant adhere to a filler are arranged in order from top to bottom;

primarily separating a metal from the treated water by physically catching and filtering the metal in the treated water in the adhesional precipitation section;

secondarily separating a metalhydroxide from the treated water by the submerged membranes of the submerged membrane section, treating the treated water obtained by the submerged membranes sequentially in an arsenic- and phosphorus-removing unit, an activated carbon absorption unit, a reverse osmosis membrane unit and an electric deionization unit, thereafter introducing the resulting liquid into an ultraviolet sterilizer, a cartridge polisher and an ultrafilter unit to produce an ultrapure water and supply the ultrapure water to each production unit and introducing a waste water from each production unit into the pH adjustment tank;

sending and introducing a concentrate brine from the activated carbon absorption unit, the reverse osmosis membrane unit, the electric deionization unit and the ultrafilter unit back into the pH adjustment tank; and concentrating the metalhydroxide concentrated in the foam separation tank and the multistage type submerged membrane separation unit by introducing the metalhydroxide into an evaporator, cooling steam evaporated from the evaporator to restore water, making the water join the water separated in the multistage type submerged membrane separation tank and introducing the resulting liquid into the arsenic- and phosphorus-removing unit.

According to the treatment method of this invention, the treated water that has undergone the foam separation of metalhydroxide and passed through the pH adjustment tank and the foam separation tank is introduced upwardly in an upward flow into the multistage type submerged membrane separation tank. Therefore, gallium hydroxide can efficiently be concentrated and precipitated. Moreover, since the submerged membranes are arranged vertically in a plurality of tiers, the treatment capability can be improved.

Moreover, the ultrapure water generating system is constructed of the ultraviolet sterilizer, the cartridge polisher and the ultrafilter unit. Therefore, the ultrapure water generating system can be compactly constructed.

In one embodiment of the present invention, the multistage type submerged membrane separation tank is served as a first multistage type submerged membrane separation tank, the metalhydroxide from the first multistage type submerged membrane separation tank is introduced into a second submerged membrane separation tank arranged below the first multistage type submerged membrane separation tank, and the metalhydroxide from the second submerged membrane separation tank is introduced into an evaporator so as to concentrate the metalhydroxide and steam obtained from the evaporator is cooled and restored into water and treated by being introduced into the arsenic- and phosphorus-removing unit.

According to this embodiment, the second submerged membrane separation tank is arranged below the multistage type membrane separation tank, and therefore, concentration to a high concentration level can be effected in two steps. Therefore, the load of the evaporator can be reduced, and the energy consumed by the evaporator can be reduced.

In one embodiment of the present invention, the water from the submerged membranes of the first submerged membrane separation tank and the submerged membrane of the second submerged membrane separation tank is introduced into a reaction tank together with a pH adjuster and a coagulant so as to cause a reaction, the resulting liquid is introduced upwardly in an upward flow into a third multistage submerged membrane separation tank in which an upper portion where a pH meter is placed, a submerged membrane section that includes submerged membranes arranged vertically in a plurality of tiers and a diaphragm for vibrating the submerged membranes and an adhesional precipitation section for precipitating a reactant obtained through the reaction by making the reactant adhere to a filler are arranged in order from top to bottom, thereby separating water from a metalhydroxide, the metalhydroxide is further concentrated in a fourth submerged membrane separation tank arranged below the third multistage type submerged membrane separation tank, the treated water separated by the submerged membranes of the third multistage type submerged membrane separation tank and the fourth submerged membrane separation tank is sequentially introduced into an activated carbon absorption unit, a reverse osmosis membrane separation unit and an electric deionization unit, thereafter the resulting liquid is introduced into an ultraviolet sterilizer, a cartridge polisher and an ultrafilter unit, a concentrate brine from the reverse osmosis membrane unit, the electric deionization unit and the ultrafilter unit is sent back to the pH adjustment tank, a metalhydroxide from the second submerged membrane separation tank is introduced into the evaporator so as to concentrate the metalhydroxide, steam obtained from the evaporator is cooled and restored into water, made to join the water separated in the second multistage type submerged membrane separation tank and introduced into the reaction tank, and a metalhydroxide from the fourth submerged membrane separation tank is introduced into an evaporator so as to concentrate the metalhydroxide, steam obtained from the evaporator is cooled and restored into water, made to join the water separated in the fourth multistage type submerged membrane separation tank and introduced into the activated carbon adsorption unit.

According to the treatment method of this invention, the metal contained in the metal containing waste water is separated into gallium and other metals (arsenic, phosphorus, etc.) by the first and third multistage type submerged membrane separation tanks. Also, the second submerged membrane separation tank is arranged below the first multistage type submerged membrane separation tank, and the fourth submerged membrane separation tank is arranged below the third multistage type submerged membrane separation tank. Therefore, in each of the first and third multistage type submerged membrane separation tanks, the submerged membrane separation tanks are arranged in two tiers, by which the gallium hydroxide and the slurry that contains arsenic and phosphorus can each be obtained at a high concentration and further concentrated by the evaporator. Moreover, concentration is carried out in each of the two-tier submerged membrane separation tanks. Therefore, the load on the evaporator in the subsequent stage can be reduced, and the energy consumed by the evaporator can be reduced.

In one embodiment of the present invention, part of a waste water from compound semiconductor plant that includes a developer waste water and a metal is introduced into a fifth submerged membrane separation tank, an arsenic oxidizing bacterium cultured and concentrated in the fifth submerged membrane separation tank is introduced into the third multistage type submerged membrane separation tank via the reaction tank.

According to this embodiment, the arsenic oxidizing bacterium, which has been cultured and concentrated in the fifth submerged membrane separation tank, is introduced into the third multistage type submerged membrane separation tank. Therefore, the running cost can be reduced in comparison with the case of a chemical used as an oxidizer.

In one embodiment of the present invention, part of a concentrate brine precipitated in the third multistage type submerged membrane separation tank is sent back to the fifth submerged membrane separation tank.

According to this embodiment, the arsenic oxidizing bacterium included in the concentrate precipitated and concentrated in the third multistage type submerged membrane separation tank is sent back to the fifth submerged membrane separation tank. Therefore, the arsenic oxidizing bacterium can be recycled. That is, the arsenic oxidizing bacterium can be effectively utilized.

In one embodiment of the present invention, the arsenic oxidizing bacterium cultured in the fifth submerged membrane separation tank is introduced into the first multistage type submerged membrane separation tank and the third multistage type submerged membrane separation tank.

According to this embodiment, the arsenic oxidizing bacterium cultured in the fifth submerged membrane separation tank is introduced into the first submerged membrane separation tank and the third multistage type submerged membrane separation tank. Therefore, the arsenic oxidizing bacterium spreads throughout the entire system, and an improved microorganic treatment can be expected.

In one embodiment of the present invention, the ferrooxidans bacterium is an arsenic oxidizing bacterium.

According to this embodiment, the metal oxidizing bacterium is the arsenic oxidizing bacterium. Therefore, arsenic can be selectively oxidized.

In one embodiment of the present invention, not only the waste water from compound semiconductor plant that contains gallium arsenide, a pH adjuster toach production unit but also the developer waste water from each production unit are treated by being introduced into the pH adjustment tank.

According to this embodiment, by introducing and treating the waste water containing developer from each production unit into the pH adjustment tank, the waste water treatment system becomes simple, and the initial cost can be reduced. Moreover, the waste water containing developer is the waste water constructed mainly of the organic matter, and therefore, a large amount of microorganisms can be bred in the multistage type submerged membrane separation tank.

In one embodiment of the present invention, the concentrate brine precipitated and concentrated in the first multistage type submerged membrane separation tank and a floating substance that has surfaced and separated in the foam separation tank are concentrated by being introduced into an evaporator, the treated water from the submerged membrane of the first multistage type submerged membrane separation tank and the evaporator is introduced into a reaction tank together with a pH adjuster and a coagulant so as to cause a reaction, the resulting liquid is introduced upwardly in an upward flow into a third multistage type submerged membrane separation tank in which an upper portion where a pH meter is placed, a submerged membrane section that includes submerged membranes arranged vertically in a plurality of tiers and a diaphragm for vibrating the submerged membranes and an adhesional precipitation section for precipitating a reactant obtained through the reaction by making the reactant adhere to a filler are arranged in order from top to bottom, thereby separating water from a metalhydroxide, and the liquid precipitated and concentrated in the third multistage type submerged membrane separation tank is concentrated by being introduced into an evaporator.

According to this embodiment, the concentrate brine from the first multistage type submerged membrane separation tank is introduced directly into the evaporator. Moreover, the concentrate brine from the third multistage type submerged membrane separation tank is introduced directly into the evaporator. Accordingly, there is the merit that concentration can be carried out in a short time.

In one embodiment of the present invention, an influent water to the pH adjustment tank is a waste water from compound semiconductor plant that contains hydrogen peroxide and contains gallium arsenide, gallium phosphide and so on.

According to this embodiment, hydrogen peroxide can be resolved by the microorganism. Since no oxidizer is used as a chemical, the running cost can be reduced.

Also, there is provided a metal containing waste water treatment method comprising the steps of:

causing a reaction of metal and water contained in a waste water from compound semiconductor plant that contains gallium arsenide with a pH adjuster added in a pH adjustment tank, making bubbles generated in a waste water adhere to a metalhydroxide generated through the reaction in a foam separation tank so as to make the metalhydroxide surface in the waste water, thereby subjecting the metalhydroxide to foam separation; and making the treated water that has passed through the foam separation tank pass from below through a multistage type submerged membrane separation tank, which has submerged membranes arranged vertically in a plurality of tiers, an adhesional precipitation section that is placed below the submerged membranes and precipitates a reactant caused by the reaction by making the reactant adhere to a filler and a diaphragm for vibrating the submerged membranes, thereby further separating the metalhydroxide from the treated water, whereby the waste water is subjected to a physical treatment, a biological treatment and a chemical treatment, and the resulting liquid is thereafter treated in an evaporator so as to separate the liquid into gallium, other metals and water and separately collect the substances, thereby establishing a completely closed treatment system.

According to the treatment method of this invention, the waste water from compound semiconductor plant that contains gallium arsenide and so on is treated physically, biologically and chemically in the pH adjustment tank, the foam separation tank and the multistage type submerged membrane separation unit and thereafter treated in the evaporative condenser, by which the waste water can be separated into (1) gallium, (2) other metals and (3) water and separately collected. Therefore, the resources can be effectively recycled. Moreover, since a completely closed treatment system is established, the influence on the environment is minimized.

Also, there is provided a metal containing waste water treatment method comprising the steps of:

causing a reaction of metal and water contained in a waste water from compound semiconductor plant that contains gallium arsenide with a pH adjuster added in a pH adjustment tank, making bubbles generated in a waste water adhere to a metalhydroxide generated through the reaction in a foam separation tank so as to make the metalhydroxide surface in the waste water, thereby subjecting the metalhydroxide to foam separation; and making the treated water that has passed through the foam separation tank pass from below through a multistage type submerged membrane separation tank, which has submerged membranes arranged vertically in a plurality of tiers, an adhesional precipitation section that is placed below the submerged membranes and precipitates a reactant caused by the reaction by making the reactant adhere to a filler and a diaphragm for vibrating the submerged membranes, thereby further separating the metalhydroxide from the treated water, whereby the waste water is subjected to a physical treatment, a biological treatment and a chemical treatment, and the resulting liquid is thereafter treated in an evaporator so as to separate the liquid into gallium, other metals and water and separately collect the substances, collecting the metals as valuable substances and collecting the water as a raw water for an ultrapure water generating system, thereby establishing a completely closed treatment system.

According to the treatment method of this invention, the metal and water included in the waste water that contains gallium arsenide and so on is treated physically, biologically and chemically in the pH adjustment tank, the foam separation tank and the multistage type submerged membrane separation unit and thereafter treated in the evaporative condenser, by which the waste water is separated into (1) gallium, (2) other metals and (3) water and separately collected. The metals are all collected as valuable substances, and the water is collected as a raw water for the ultrapure water generating system. Therefore, the economic efficiency of the system can be increased. Moreover, since a completely closed treatment system is established, the influence on the environment is minimized.

Also, there is provided a metal containing waste water treatment method comprising the steps of:

causing a reaction of gallium, arsenic, phosphorus and water in a waste water of gallium arsenide and gallium phosphide with a pH adjuster added in a pH adjustment tank, making bubbles generated in a waste water adhere to a metalhydroxide generated through the reaction in a foam separation tank so as to make the metalhydroxide surface in the waste water, thereby subjecting the metalhydroxide to foam separation; and making the treated water that has passed through the foam separation tank pass from below through a multistage type submerged membrane separation tank, which has submerged membranes arranged vertically in a plurality of tiers, an adhesional precipitation section that is placed below the submerged membranes and precipitates a reactant caused by the reaction by making the reactant adhere to a filler and a diaphragm for vibrating the submerged membranes, thereby further separating the metalhydroxide from the treated water, whereby the waste water is subjected to a physical treatment, a biological treatment and a chemical treatment, and the resulting liquid is thereafter treated in an evaporator so as to separately collect gallium, a mixture of arsenic and phosphorus and water, thereby establishing a completely closed treatment system.

According to the treatment method of this invention, after undergoing the physical treatment, biological treatment and chemical treatment, the waste water is treated in the evaporative condenser so as to separately collect (1) gallium, (2) a mixture of arsenic and phosphorus and (3) water. Therefore, the valuable resources can be recycled. Moreover, since a completely closed treatment system is established, the influence on the environment is minimized.

Also, there is provided a metal containing waste water treatment method comprising the steps of:

causing a reaction of gallium, arsenic, phosphorus and water in a waste water of gallium arsenide and gallium phosphide with a pH adjuster added in a pH adjustment tank, making bubbles generated in a waste water adhere to a metalhydroxide generated through the reaction in a foam separation tank so as to make the metalhydroxide surface in the waste water, thereby subjecting the metalhydroxide to foam separation; and making the treated water that has passed through the foam separation tank pass from below through a multistage type submerged membrane separation tank, which has submerged membranes arranged vertically in a plurality of tiers, an adhesional precipitation section that is placed below the submerged membranes and precipitates a reactant caused by the reaction by making the reactant adhere to a filler and a diaphragm for vibrating the submerged membranes, thereby further separating the metalhydroxide from the treated water, whereby the waste water is subjected to a physical treatment, a biological treatment and a chemical treatment, and the resulting liquid is thereafter treated in an evaporator so as to separately collect gallium, a mixture of arsenic and phosphorus and water, collecting the gallium and the mixture of arsenic and phosphorus as valuable substances and collecting the water as a raw water for an ultrapure water generating system, thereby establishing a completely closed treatment system.

According to the treatment method of this invention, (1) gallium, (2) a mixture of arsenic and phosphorus and (3) water are separately collected as valuable substances. Therefore, the valuable resources can be economically recycled. Moreover, since a completely closed treatment system is established, the influence on the environment is minimized.

In one embodiment of the present invention, a microorganism is used for the treatment of arsenic.

According to this embodiment, since the microorganism is used instead of a chemical for the treatment of arsenic, the running cost can be reduced.

In one embodiment of the present invention, the microorganism is a metal oxidizing bacterium.

According to this embodiment, since the microorganism is the metal oxidizing bacterium, the metal can be selectively microorganically oxidized.

In one embodiment of the present invention, the metal oxidizing bacterium is an arsenic oxidizing bacterium.

According to this embodiment, since the metal oxidizing bacterium is the arsenic oxidizing bacterium, arsenic as a metal can be selectively microorganically oxidized.

Also, there is provided a metal containing waste water treatment method for treating a waste water by introducing the waste water into a multistage type submerged membrane separation tank constructed of a lower portion that has an adhesional precipitation section for catching and precipitating a metal contained in the waste water, an intermediate portion constructed of a submerged membrane section in which submerged membranes are arranged in a plurality of tiers and an upper portion where a pH meter is placed, from the lower portion.

According to the treatment method of this invention, the comparatively large particles can be treated in the adhesional precipitation section located in the lower portion, and water and the concentrate can be separated in the submerged membrane section in which the submerged membranes are arranged in a plurality of tiers. The treatment can be adjusted to the optimum pH by measuring the pH of the liquid in the upper portion in which the pH meter is placed.

Also, there is provided a metal containing waste water treatment method comprising the steps of:

firstly introducing a metal containing waste water into a foam separation tank and making bubbles adhere to a metal contained in the metal containing waste water, thereby subjecting the metal containing waste water to foam separation; and treating a treated water from the foam separation tank by introducing the treated water into a multistage type submerged membrane separation tank constructed of a lower portion that has an adhesional precipitation section for catching and precipitating a metal contained in the metal containing waste water, an intermediate portion constructed of a submerged membrane section that includes submerged membranes are arranged in a plurality of tiers and a diaphragm for vibrating the submerged membranes and an upper portion where a pH meter is placed, from the lower portion, thereby carrying out membrane separation.

According to the treatment method of this invention, the metal containing waste water is first subjected to foam separation in the foam separation tank. Therefore, the pretreatment is already achieved, and this can reduce the load on the subsequent treating process by the supplied water quality.

In one embodiment of the present invention, the vibrating device is constructed of a frequency transmitter, a diaphragm and a signal line for transmitting a signal from the frequency transmitter to the diaphragm.

According to this embodiment, the vibrating device is constructed of the frequency transmitter, the diaphragm and the signal line. Therefore, the treatment capability of the submerged membrane can be freely controlled by vibrating the diaphragm strongly and weakly by the frequency transmitter.

Also, there is provided a metal containing waste water treatment method for treating a metal containing waste water by firstly generating a hydroxide with a pH adjuster added, secondly carrying out foam separation by making bubbles adhere to the hydroxide in a foam separation tank and thirdly introducing a water obtained from the foam separation tank into a multistage type submerged membrane separation unit having submerged membranes arranged vertically in a plurality of tiers and cleaned by air discharged from one air diffusion pipe.

According to the treatment method of this invention, the hydroxide is subjected to foam separation in the foam separation tank. Therefore, the pretreatment can be reliably carried out, and the load on the submerged membranes can be reduced. Moreover, the membranes arranged in a plurality of tiers are cleaned by air discharged from one air diffusion pipe located in the lower portion. Therefore, all of the multistage type submerged membranes can efficiently be cleaned with a small amount of air.

In one embodiment of the present invention, the multistage type submerged membrane separation unit has an unloading port for unloading the submerged membranes arranged vertically in a plurality of tiers by horizontally moving the submerged membranes.

According to this embodiment, the submerged membranes arranged vertically in a plurality of tiers can easily be unloaded from the unloading port by being horizontally moved, and this allows the replacement work of the submerged membranes to be easy.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 13A is a timing chart when the concentrations of gallium and arsenic in the waste water are normal concentrations in the twelfth embodiment;

FIG. 13B is a timing chart when the concentrations of gallium and arsenic in the waste water are low concentrations in the twelfth embodiment;

FIG. 14 is a view for explaining the thirteenth embodiment of the metal containing waste water treatment method of this invention;

FIG. 15 is a view for explaining the fourteenth embodiment of the metal containing waste water treatment method of this invention;

FIG. 26 is a view for explaining the twenty-fifth embodiment of this invention;

FIG. 27A is a timing chart when the concentrations of gallium and arsenic in the waste water are normal concentrations in the nineteenth embodiment;

FIG. 27B is a timing chart when the concentrations of gallium and arsenic in the waste water are low concentrations in the nineteenth embodiment;

FIG. 28A is a timing chart when the concentrations of gallium and arsenic in the waste water are normal concentrations in the eighteenth embodiment;

FIG. 28B is a timing chart when the concentrations of gallium and arsenic in the waste water are low concentrations in the eighteenth embodiment;

FIG. 42A is a timing chart when the concentrations of gallium and arsenic in the waste water are normal concentrations in the thirtieth embodiment; FIG. 42B is a timing chart when the concentrations of gallium and arsenic in the waste water are low concentrations;

FIGS. 56A and 56B are timing charts of the forty-fourth embodiment of this invention;

DETAILED DESCRIPTION OF THE PREFERRED EMBODIMENTS

Figure 1:
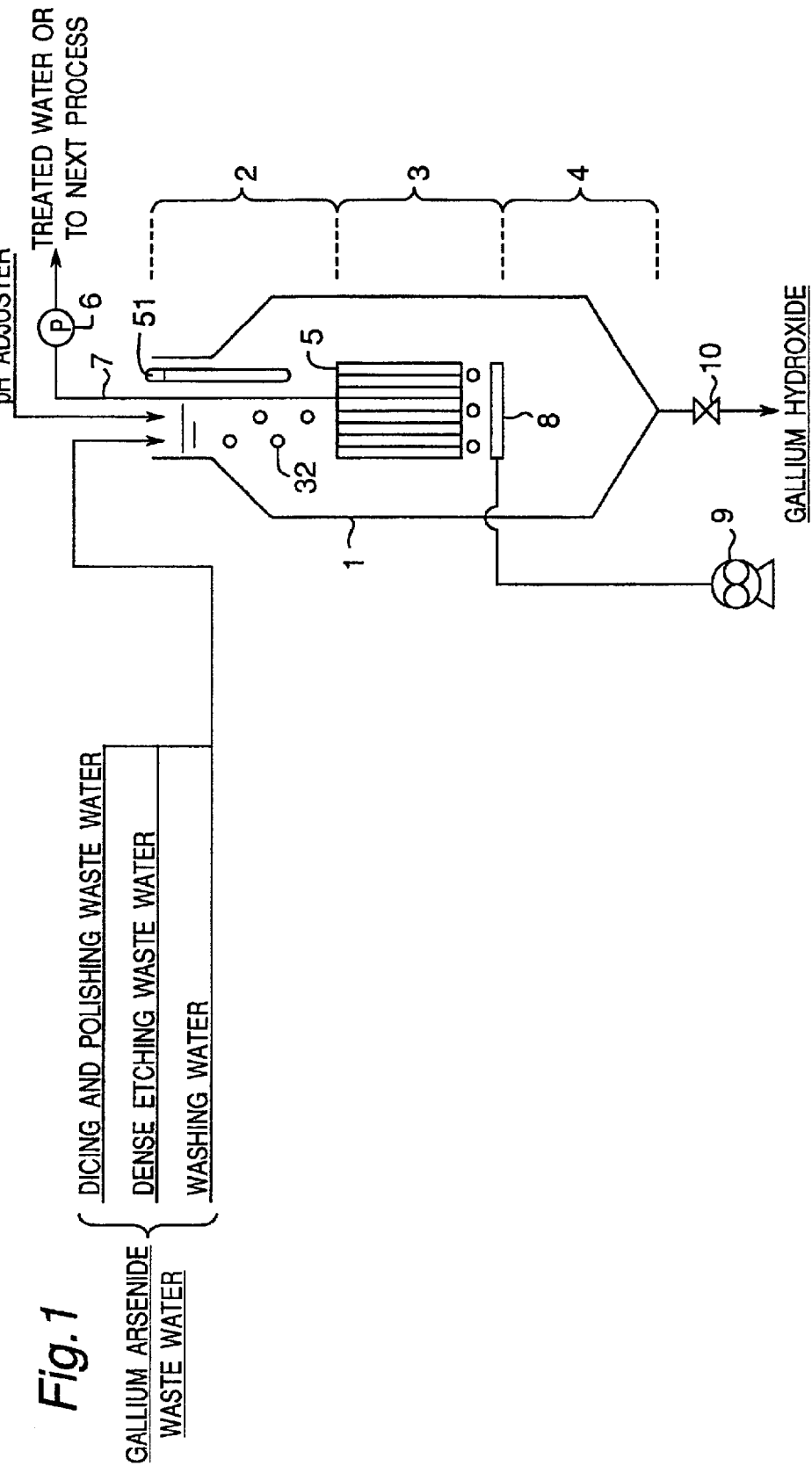
FIG. 1 is a schematic view showing the first embodiment of the metal containing waste water treatment equipment of this invention.

The present invention will be described in detail below on the basis of the embodiments shown in the drawings.

(First Embodiment)

FIG. 1 shows the construction of the first embodiment of the metal containing waste water treatment equipment of this invention. The waste water treatment equipment of this first embodiment collects a metal in the waste water.

This first embodiment is the equipment for treating a waste water from a compound semiconductor plant. In more concrete, the equipment is the waste water treatment equipment that treats a waste water containing gallium and/or arsenide and is able to collect gallium (gallium hydroxide) in the waste water.

As a gallium arsenide waste water (waste water containing both or either one of gallium and arsenic) in a compound semiconductor plant, there are (1) dicing waste water, (2) dense etching waste water and (3) washing water.

The waste water of a mixture of the aforementioned substances (1), (2) and (3), i.e., an acid gallium arsenide waste water is introduced into a reaction section 2 located in an upper portion of a submerged membrane separation tank 1, and a pH adjuster of sodium hydroxide or the like is added.

As shown in FIG. 1, the treatment equipment of this embodiment is constructed of the submerged membrane separation tank 1. This submerged membrane separation tank 1 totally constitutes one tank in which the reaction section 2, a submerged membrane section 3 and a precipitation section 4 are arranged in order from top to bottom.

In this submerged membrane separation tank 1, the reaction section 2 is located in the upper portion where a pH meter 51 is placed. The submerged membrane section 3 is located in the middle and provided with a submerged membrane 5. An air diffusion pipe 8 is arranged below this submerged membrane 5 and connected to a blower 9 provided outside the tank. The precipitation section 4 is located in a lower portion.

The acid waste water introduced into the reaction section 2 of this submerged membrane separation tank 1 receives a pH adjuster of sodium hydroxide or the like added to the reaction section 2 and is efficiently stirred and mixed by bubbles discharged from the air diffusion pipe 8 provided below the submerged membrane 5 of the submerged membrane section 3.

The operating conditions of this reaction section 2 are controlled by the first pH meter 51 that is a pH meter. This control should preferably be executed within a range of pH 4 to pH 5 with regard to the pH measured by the first pH meter 51, but this is not the absolute way.

In this reaction section 2, the waste water is efficiently stirred and mixed by bubbles 32, as a consequence of which the gallium ions dissolved in the waste water become gallium hydroxide, which easily precipitate. Gallium particles as a solid matter precipitate as they are, but the rate of precipitation is slow.

The bubbles discharged from the air diffusion pipe 8 placed below the submerged membrane 5 consistently clean the membrane surface of the submerged membrane 5. Therefore, the membrane is not blocked up by minute solid matter. This submerged membrane 5 is provided by an ultrafiltration membrane, and in concrete, it is proper to select the submerged membranes produced by Kubota Corp., Yuasa Corp., Mitsubishi Rayon Co., Ltd. and so on.

The blower, denoted by reference numeral 9, supplies air to the air diffusion pipe 8. For this blower 9, it is proper to select the general Roots blower.

A treated water pump 6 is connected to a pipe 7 that extends upward from the submerged membrane 5 penetrating the reaction section 2. By operating this treated water pump 6, water and a concentrate are separated from each other by the submerged membrane 5. The water is sent to the next process by the treated water pump 6 through the pipe 7 or becomes a treated water. The water becomes a treated water when the water quality of this treated water is lower than the intended water quality.

The treated water is sent to the next process when the concentration of arsenic or the like has not yet reached the intended concentration. Reference numeral 10 denotes a valve 10, which is opened when a slurry of gallium hydroxide and so on precipitated in the precipitation section 4 is taken out.

Since the precipitation section 4 is cone-shaped, the precipitate is naturally gathered to the deepest portion in the center portion of the precipitation section 4 and concentrated.

Moreover, the reaction section 2 of the submerged membrane separation tank 1 is narrowed in the upper portion. Therefore, the density of bubbles 32 discharged from the air diffusion pipe 8 is increased when the bubbles move up and come in contact with the gallium arsenide waste water in the reaction section 2, improving the efficiency of stirring. Moreover, since the lowermost portion of the precipitation section 4 is cone-shaped, the solid matter of gallium hydroxide or the like can be naturally precipitated.

According to this first embodiment, the metal containing waste water is introduced from above into the submerged membrane separation tank 1 in which the reaction section 2, the submerged membrane section 3 that has the submerged membrane 5 and the precipitation section 4 are arranged in order from top to bottom, and the pH adjuster is added to the reaction section 2 to cause a reaction. Subsequently, water and metal are separated from each other by the submerged membrane 5 of the submerged membrane section 3, and subsequently the metal is precipitated and concentrated in the precipitation section 4. As described above, in this first embodiment, the pH adjuster is added to the reaction section 2. Therefore, solid-liquid separation can be effected by the submerged membrane 5 with a hydroxide formed. Moreover, the metal can be precipitated and concentrated by the action of gravity without using energy in the precipitation section 4.

(Second Embodiment)

Figure 2:
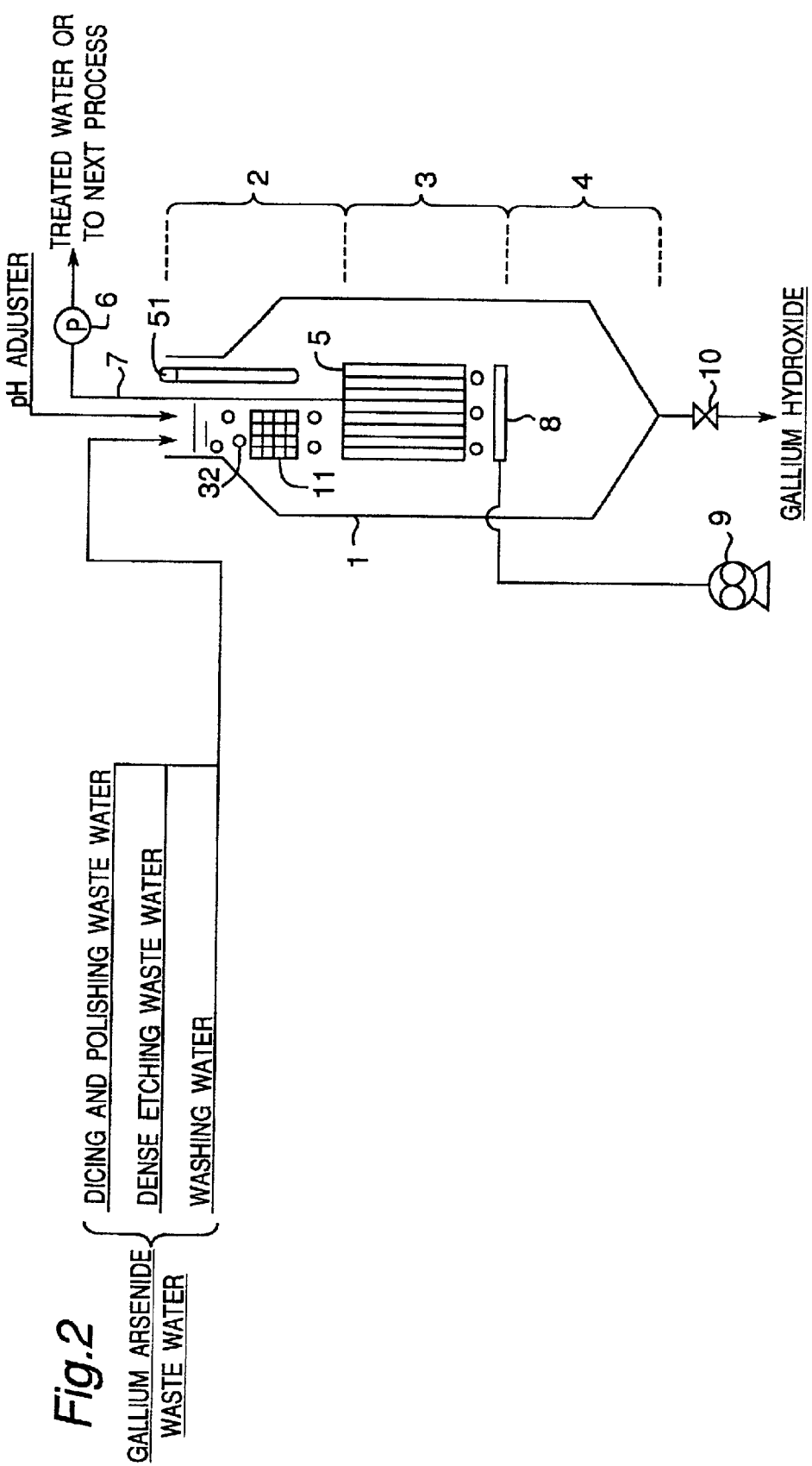
FIG. 2 is a schematic view showing the second embodiment of the metal containing waste water treatment equipment of this invention.

Next, FIG. 2 shows the construction of the second embodiment of the metal containing waste water treatment equipment of this invention.

This second embodiment differs from the aforementioned first embodiment only in that a filler 11 is placed in the reaction section 2. Therefore, in this second embodiment, the same components as those of the aforementioned first embodiment are denoted by same reference numerals, and no detailed description is provided therefor.

In this second embodiment, the filler 11 is placed in the reaction section 2. By virtue of the existence of this filler 11, the bubbles 32 do not go out straightly into the air but collide against the filler 11. This causes a turbulence in the reaction section 2, by which the waste water and the pH adjuster are stirred and mixed. Therefore, the stirring of the waste water is further promoted by the air discharged from the air diffusion pipe 8 and the filler 11 in the reaction section 2, as a consequence of which the reaction of the waste water with the pH adjuster is further ensured even during a residence time of a few minutes.

The filler 11 is not specifically limited so long as it has a structure for causing a turbulence in the reaction section 2. However, it is required to select a material that has a chemical resistance since the filler comes in contact with the chemical. In concrete, a Tellerette line mixer made of plastic can be selected.

(Third Embodiment)

Figure 3:
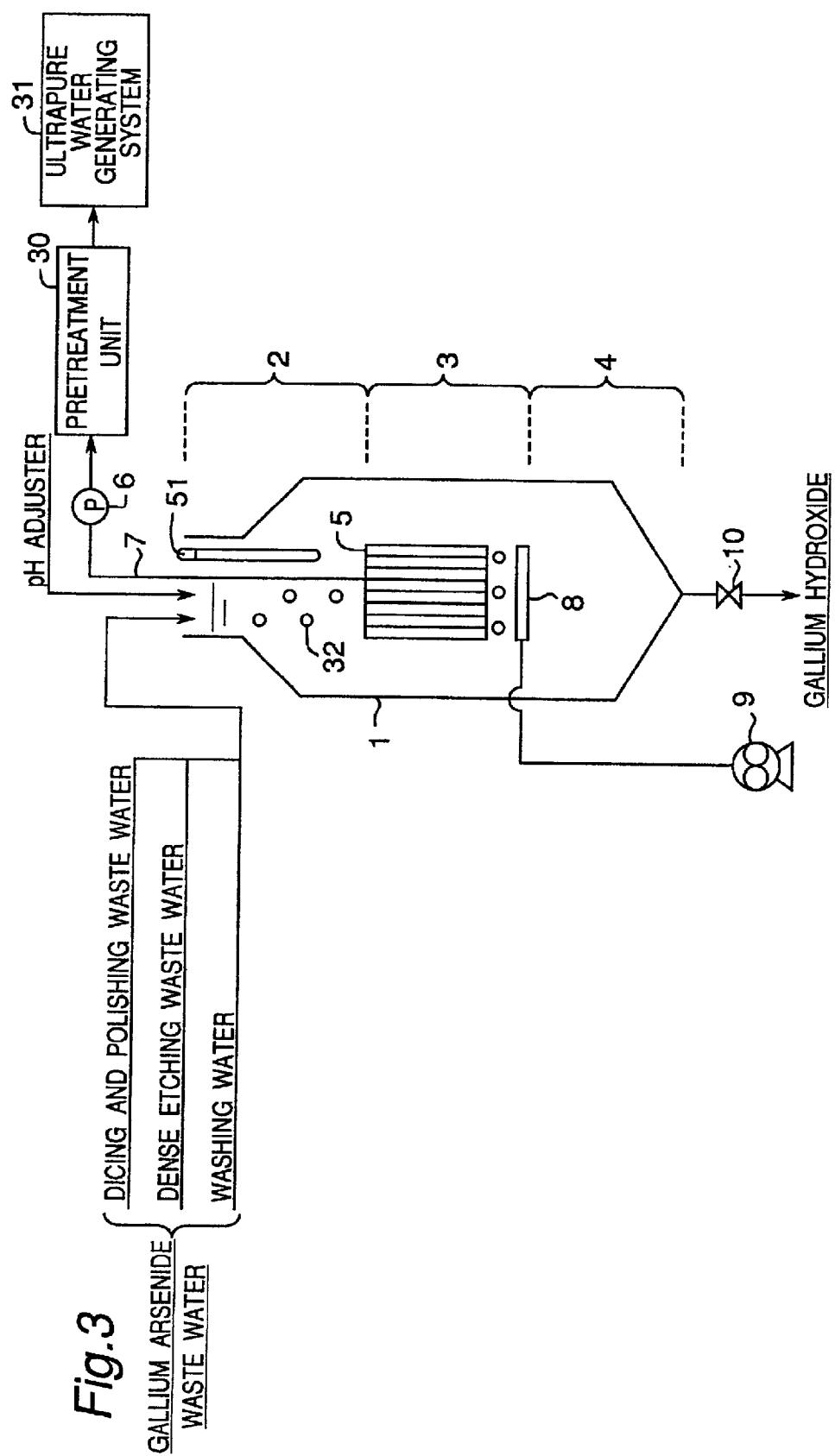
FIG. 3 is a schematic view showing the third embodiment of the metal containing waste water treatment equipment of this invention.

Next, FIG. 3 shows the construction of the third embodiment of the metal containing waste water treatment equipment of this invention.

This third embodiment differs from the aforementioned first embodiment only in that the treated water is sent to a pretreatment system 30 and then to an ultrapure water generating system 31 by the treated water pump 6 of the first embodiment, in comparison with the first embodiment. Therefore, in this third embodiment, the same components as those of the aforementioned first embodiment are denoted by same reference numerals, and no detailed description is provided therefor.

In this third embodiment, the treated water is sent to the pretreatment system 30 and then to the ultrapure water generating system 31 by the treated water pump 6. Then, the treated water is pretreated by being introduced into the pretreatment system by the treated water pump 6, and thereafter, the treated water is further introduced into a general ultrapure water generating system so as to be recycled.

Therefore, this third embodiment is a system suitable particularly for a plant that is required to recycle the waste water.

In concrete, this pretreatment system 30 is required to be determined basically in accordance with the water quality of the treated water. In general, there are provided an activated carbon absorption unit for treating the organic matter in the treated water, an ion exchange unit for treating ions in the treated water and a reverse osmosis membrane unit for treating ions and minute particles.

According to this third embodiment, the water separated in the submerged membrane section 3 is pretreated by being introduced into the pretreatment system 30 and recycled as a raw water for the ultrapure water generating system 31. Therefore, the water can effectively be utilized, and a closed system is completed.

(Fourth Embodiment)

Figure 4:
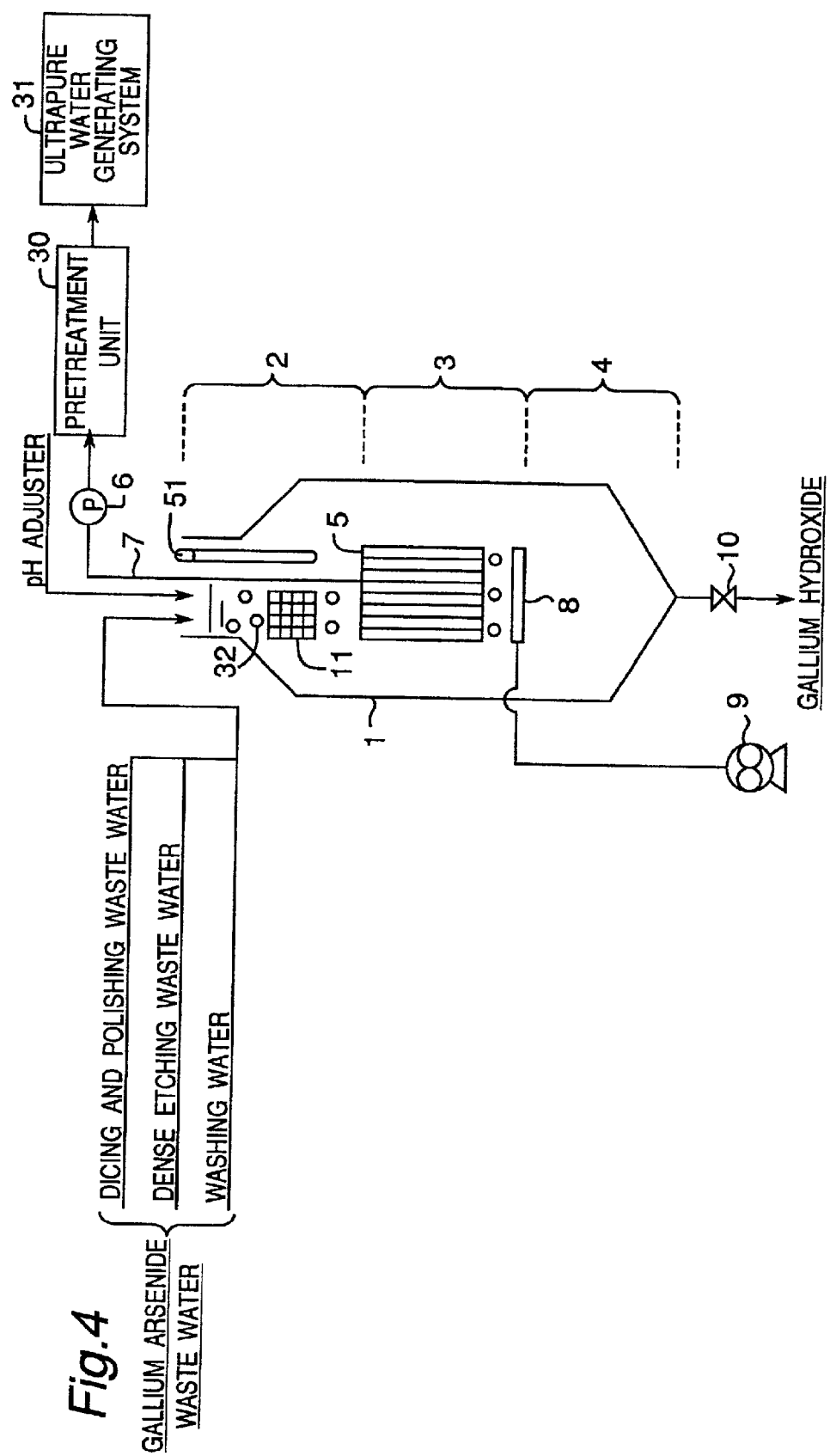
FIG. 4 is a schematic view showing the fourth embodiment of this invention.

Next, FIG. 4 shows the construction of the fourth embodiment of the metal containing waste water treatment equipment of this invention.

This fourth embodiment differs from the aforementioned second embodiment only in that the treated water is set to the pretreatment system 30 and subsequently to the ultrapure water generating system 31 by the treated water pump 6. Therefore, in this fourth embodiment, the same components as those of the aforementioned second embodiment are denoted by same reference numerals, and no detailed description is provided therefor.

In this fourth embodiment, the treated water is set to the pretreatment system 30 and subsequently to the ultrapure water generating system 31 by the treated water pump 6. Therefore, the treated water is pretreated by being introduced into the pretreatment system 30 by the treated water pump 6, and thereafter the treated water is further introduced into a general ultrapure water generating system 31, enabling the recycling.

Therefore, this fourth embodiment is a system suitable particularly for a plant that is required to recycle the waste water.

In concrete, this pretreatment system 30 is required to be determined basically in accordance with the water quality of the treated water. In general, there are provided an activated carbon absorption unit for treating the organic matter in the treated water, an ion exchange unit for treating ions in the treated water and a reverse osmosis membrane unit for treating ions and minute particles.

(Fifth Embodiment)

Figure 5:
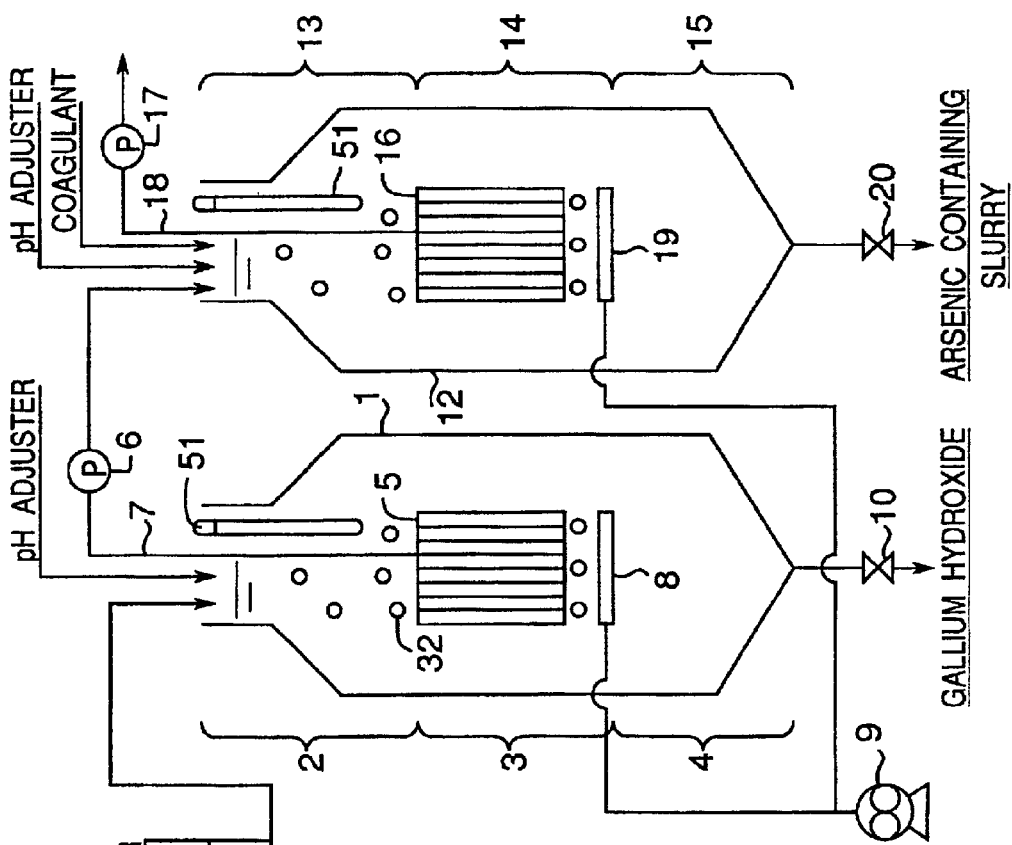
FIG. 5 is a schematic view showing the fifth embodiment of this invention.

Next, FIG. 5 shows the construction of the fifth embodiment of the metal containing waste water treatment equipment of this invention.

In this fifth embodiment, a submerged membrane separation tank 12 that has a structure similar to that of the submerged membrane separation tank 1 is provided adjacent to the submerged membrane separation tank 1 of the aforementioned first embodiment shown in FIG. 1. That is, in this fifth embodiment, two similar submerged membrane separation tanks are arranged in series. Therefore, in this fifth embodiment, the same components as those of the aforementioned first embodiment are denoted by same reference numerals, and no detailed description is provided therefor.

In this fifth embodiment, the second submerged membrane separation tank 12 is placed in the stage behind the submerged membrane separation tank 1.

The treated water separated by the submerged membrane 5 of the submerged membrane separation tank 1 was introduced into the second membrane separation tank 12, and ferric chloride, or a coagulant, was added. Arsenic, which has been separated by the submerged membrane 5 of the submerged membrane separation tank 1 and dissolved in the treated water, becomes a flock by the coagulant of ferric chloride.

The second submerged membrane separation tank 12 is constructed of a second reaction section 13, a second submerged membrane section 14 that has a second submerged membrane 16 and a second precipitation section 15, arranged in order from top to bottom. The specifications of the contents of the sections 13, 14 and 15 (second pH meter 52, submerged membrane 16, air diffusion pipe 19, etc.) of this second submerged membrane separation tank 12 are similar to those of the submerged membrane separation tank 1. In contrast to the fact that the pH adjuster is added to the submerged membrane separation tank 1, ferric chloride as a coagulant is added to the second submerged membrane separation tank 12.

Arsenic dissolved in the treated water in the second submerged membrane separation tank 12 becomes a flock by the coagulant of ferric chloride and is separated into a solid matter and a treated water by the second submerged membrane 16. The arsenic containing flock is concentrated by the second submerged membrane 16 of the second submerged membrane section 14 and precipitated and concentrated while being naturally gradually precipitated in the second precipitation section 15.

In this fifth embodiment, concentrated gallium hydroxide can be taken out of the lowermost portion of the precipitation section 4 of the submerged membrane separation tank 1. Moreover, an arsenic containing slurry based on the aforementioned arsenic containing flock can be taken out of the lowermost portion of the second precipitation section 15 of the second submerged membrane separation tank 12.

Therefore, according to this fifth embodiment, which is provided with the first submerged membrane separation tank 1 and the second submerged membrane separation tank 12, is able to separate, concentrate and precipitate the precipitates of two kinds of groups. In the first submerged membrane separation tank 1, hydroxide (gallium hydroxide) formed by the pH adjuster can be concentrated, precipitated and separated. In the second submerged membrane separation tank 12, a larger precipitate such as a flock is formed by adding a coagulant and a pH adjuster to the treated water (separated water) that has undergone membrane separation in the first submerged membrane separation tank 1, and a hydroxide (arsenic containing slurry) can be concentrated, precipitated and separated.

(Sixth Embodiment)

Figure 6:
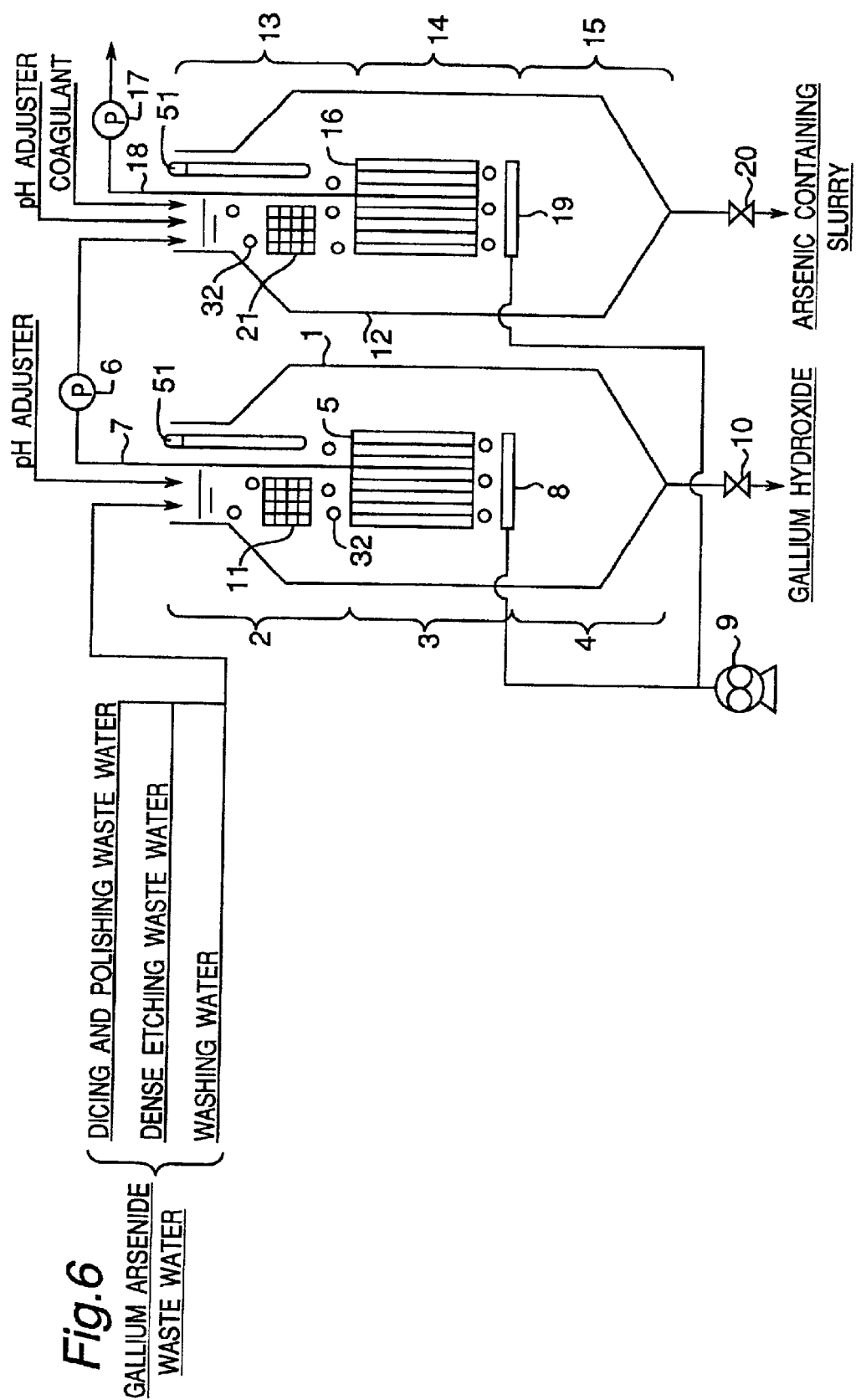
FIG. 6 is a schematic view showing the sixth embodiment of this invention.

Next, FIG. 6 shows the construction of the sixth embodiment of the metal containing waste water treatment equipment of this invention.

This sixth embodiment differs from the fifth embodiment only in that a filler 11 is placed in the first reaction section 2 of the aforementioned fifth embodiment and a filler 21 is placed in the second reaction section 13. Therefore, in this sixth embodiment, the same components as those of the aforementioned fifth embodiment are denoted by same reference numerals, and no detailed description is provided therefor.

In this sixth embodiment, the filler 11 is placed in the first reaction section 2, and the filler 21 is placed in the second reaction section 13.

The filler 11 and the filler 21 are placed in the first and second reaction sections 2 and 13. Therefore, the bubbles 32 do not go out straightly into the air but collide against the filler 11 and the filler 21. With this construction, a turbulence of the waste water is caused in the reaction sections 2 and 13, and the waste water, the pH adjuster and the coagulant are smoothly stirred and mixed.

The fillers 11 and 21 are not specifically limited. However, it is required to select a material that has a chemical resistance since the fillers come in contact with the chemical. In concrete, a Tellerette line mixer made of plastic was selected as the fillers 11 and 21.

(Seventh Embodiment)

Figure 7:
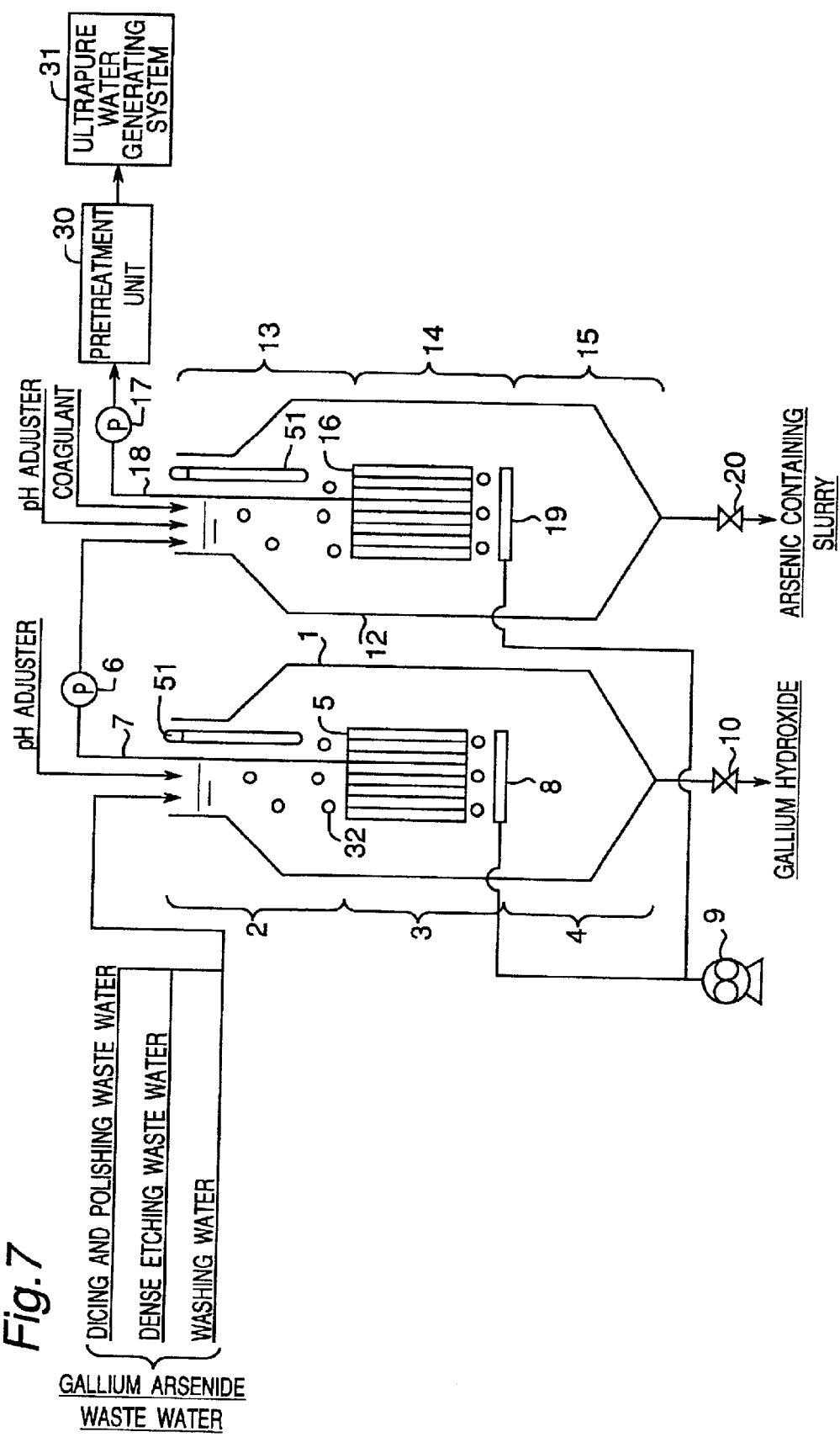
FIG. 7 is a schematic view showing the seventh embodiment of this invention.

Next, FIG. 7 shows the construction of the seventh embodiment of the metal containing waste water treatment and metal collecting method of this invention.

This seventh embodiment differs from the fifth embodiment only in that the treated water is sent to the pretreatment system 30 and subsequently to the ultrapure water generating system 31 by a second treated water pump 17 of the fifth embodiment. Therefore, in this seventh embodiment, the same components as those of the aforementioned fifth embodiment are denoted by same reference numerals, and no detailed description is provided therefor.

In this seventh embodiment, the treated water is sent to the pretreatment system 30 by the second treated water pump 17 of the fifth embodiment and subsequently to the ultrapure water generating system 31. Then, the treated water was pretreated by being introduced into the pretreatment system 30 by the second treated water pump 17, and thereafter, the treated water was recycled by being further introduced into a general ultrapure water generating system 31. Therefore, this seventh embodiment is a system suitable particularly for a plant required to recycle the waste water.

In concrete, the aforementioned pretreatment system 30 is required to be determined basically in accordance with the water quality of the treated water. In general, there are provided an activated carbon absorption unit for treating the organic matter in the treated water, an ion exchange unit for treating ions in the treated water and a reverse osmosis membrane unit for treating ions and minute particles.

Therefore, according to this seventh embodiment, the water separated in the second submerged membrane section 14 is pretreated by being introduced into the pretreatment system 30 and recycled as raw water for the ultrapure water generating system 31. Therefore, the water treated by the two-stage submerged membranes (first and second submerged membrane sections 3 and 14) is to be pretreated. Therefore, the load on the pretreatment system 30 is reduced, and the water quality of the water to be easily recycled as raw water for the ultrapure water generating system 31 can be achieved.

(Eighth Embodiment)

Figure 8:
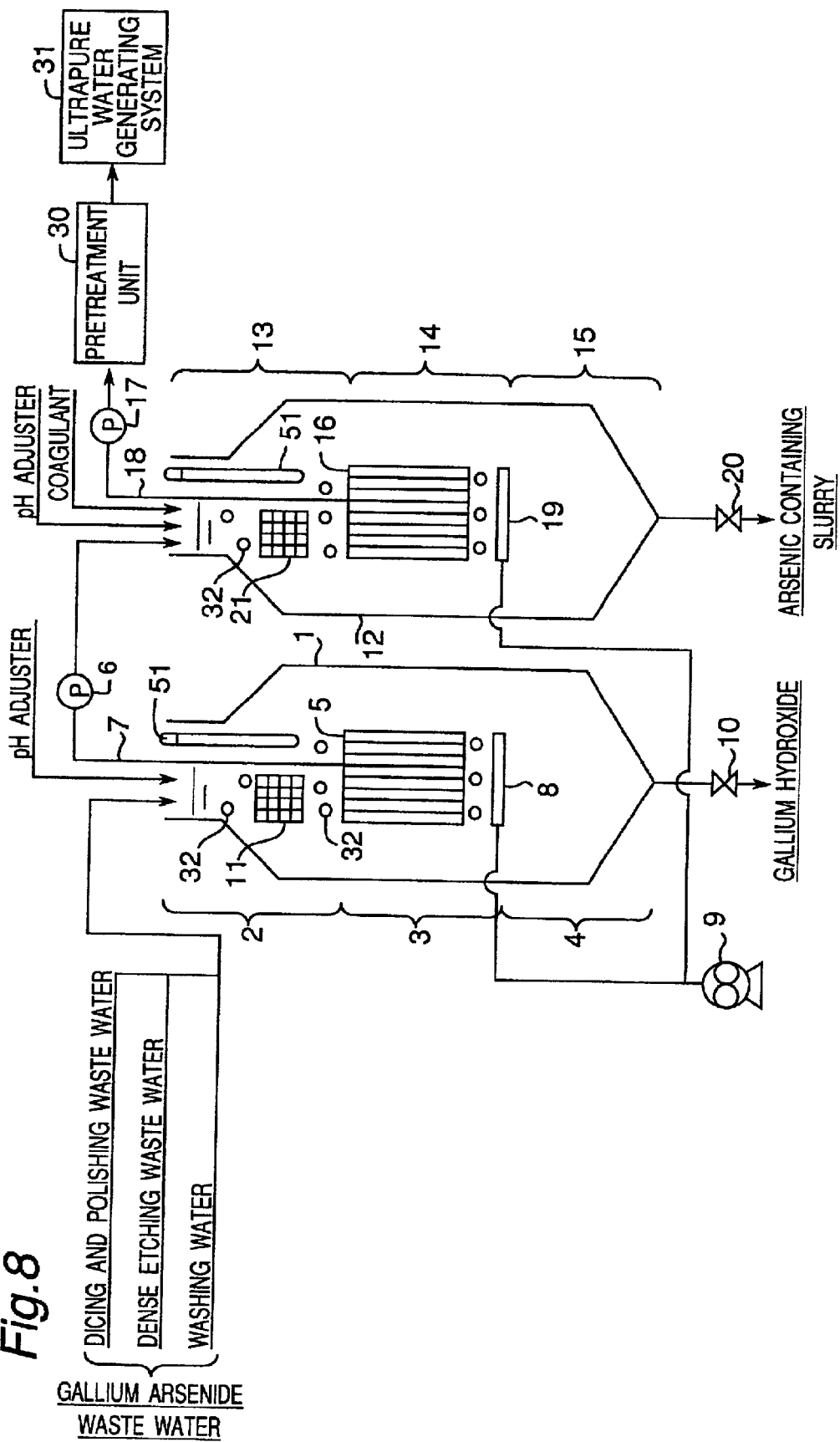
FIG. 8 is a schematic view showing the eighth embodiment of this invention.

Next, FIG. 8 shows the construction of the eighth embodiment of the metal containing waste water treatment equipment of this invention.

This eighth embodiment differs from the seventh embodiment only in that filler 11 is placed in the reaction section 2 of the aforementioned seventh embodiment, and filler 21 is placed in the second reaction section 13. Therefore, in this eighth embodiment, the same components as those of the aforementioned seventh embodiment are denoted by same reference numerals, and no detailed description is provided therefor.

In this eighth embodiment, the filler 11 is placed in the first reaction section 2, and the filler 21 is placed in the second reaction section 13. By virtue of the existence of the filler 11 and the filler 21, the bubbles 32 do not go out straightly into the air but collide against the filler 11 and the filler 21. With this construction, turbulence is caused in the first and second reaction sections 2 and 13, and the waste water, the pH adjuster and the coagulant are smoothly stirred and mixed.

The fillers 11 and 12 are not specifically limited. However, it is required to select a material that has a chemical resistance since the fillers come in contact with the chemical. In concrete, a Tellerette line mixer made of plastic was selected as the fillers 11 and 12.

(Ninth Embodiment)

Figure 9:
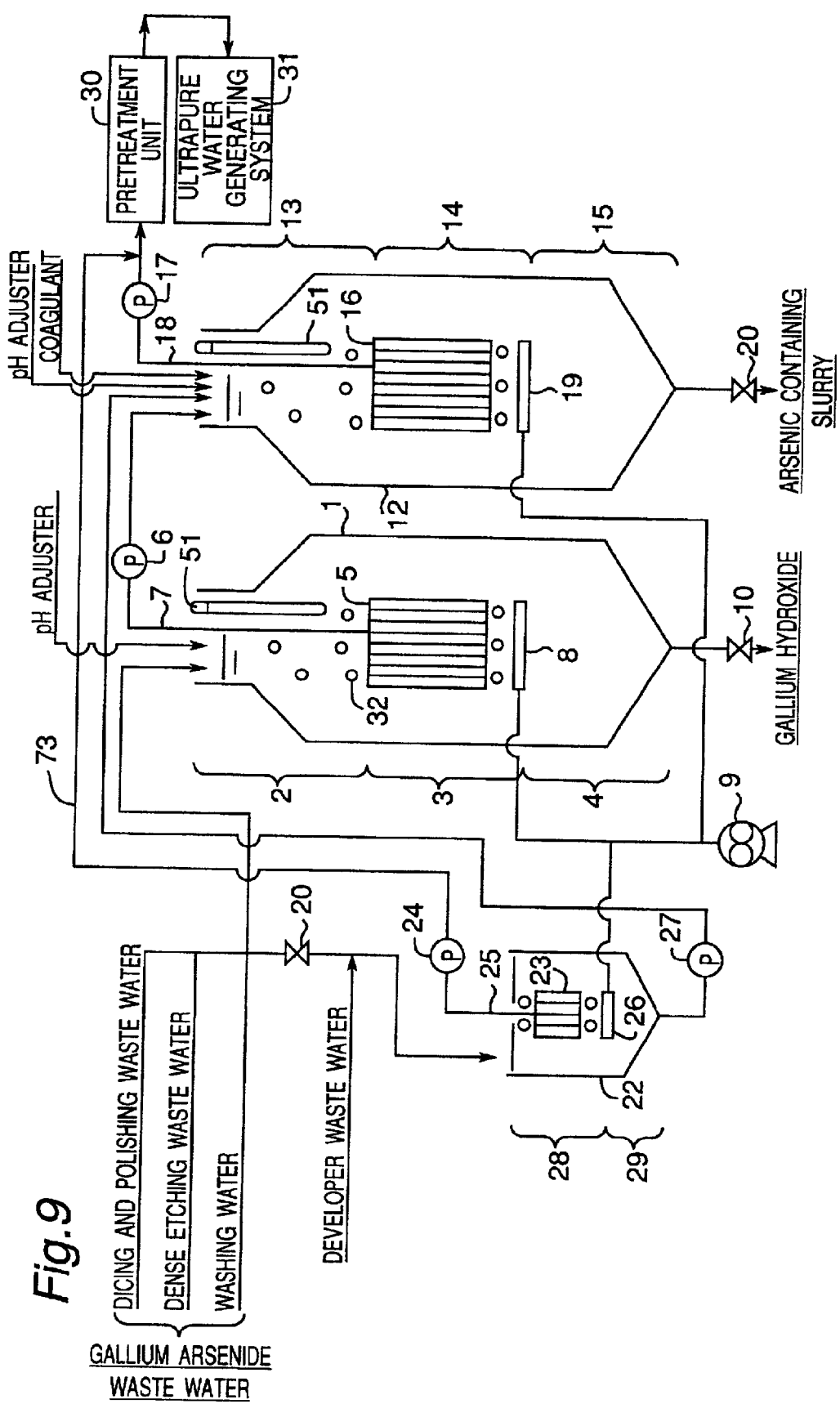
FIG. 9 is a schematic view showing the ninth embodiment of this invention.

Next, FIG. 9 shows the construction of the ninth embodiment of the metal containing waste water treatment equipment of this invention.

This ninth embodiment differs from the aforementioned seventh embodiment in that a third submerged membrane separation tank 22 is provided and a waste water containing developer is added as a waste water. The gallium arsenide process also includes a developer process, and the waste water containing developer is discharged.

In this ninth embodiment, by opening a valve 20, the developer waste water is introduced into the third submerged membrane separation tank 22 together with part of an arsenic containing dicing waste water, a polishing waste water and a dense etching waste water and so on. Through this process, an arsenic oxidizing bacterium is cultured and bred in the third submerged membrane separation tank 22.

This arsenic oxidizing bacterium propagates with a lapse of time by using nitrogen in the developer waste water and phosphorus in the dense etching waste water as a nutrient. In general, it is known that this arsenic oxidizing bacterium propagates when there is an appropriate amount of nitrogen and phosphorus.

This third submerged membrane separation tank 22 is constructed of a third submerged membrane section 28 located in an upper portion and a third precipitation section 29. A third submerged membrane 23 is placed in the third submerged membrane section 28 located in the upper portion.

An air diffusion pipe 26 connected to the blower 9 by way of a pipe is placed below this third submerged membrane 23. This air diffusion pipe 26 consistently cleans the membrane surface of the third submerged membrane 23 with bubbles 32.

The arsenic oxidizing bacterium cultured and bred in this third submerged membrane separation tank 22 is precipitated and introduced from below the third precipitation section 29 into the second submerged membrane separation tank 12 through a pipe by a third precipitation section pump 27.

On the other hand, the treated water (water) separated by the third submerged membrane 23 is introduced into the pretreatment system 30 through a pipe 33 by a third treated water pump 24. The treated water from this third submerged membrane 23 is introduced into the pretreatment system 30 together with the treated water from the second submerged membrane 16 of the second submerged membrane separation tank 12. Then, the treated water, which has passed through this pretreatment system 30, is recycled as raw water for the ultrapure water generating system 31.

The arsenic oxidizing bacterium introduced from the third submerged membrane separation tank 22 into the second submerged membrane separation tank 12 oxidizes toxic trivalent arsenic (arsenious acid) in the waste water to stable harmless pentavalent arsenic (arsenic acid) more stably than the oxidizer as a chemical.

Moreover, ferric chloride is added as a coagulant to the second submerged membrane separation tank 12. Therefore, the pentavalent arsenic acid generates a slightly soluble salt with iron and further becomes a chemically stabilized flock in the second reaction section 13 of the second submerged membrane separation tank 12. The iron salt attributed to ferric chloride tends to have a great specific gravity and is also concentrated by the second submerged membrane 16. Subsequently, the iron salt precipitates to become a high-concentration arsenic containing slurry and taken out of the second precipitation section 15 by opening the valve 20.

As described above, according to this ninth embodiment, the developer waste water discharged through the gallium arsenide process and the arsenic containing waste water are introduced into the third submerged membrane separation tank 22. Therefore, the arsenic oxidizing bacterium can be cultured and bred using nitrogen in the developer waste water as a nutrient in the third submerged membrane separation tank 22.

Moreover, according to this ninth embodiment, the slurry precipitated and concentrated in the precipitation section 15 located in the lowermost portion of the second submerged membrane separation tank 12 is sent back to the third submerged membrane separation tank 22. Therefore, the necessary amount of arsenic oxidizing bacterium can be sent back to the third submerged membrane separation tank 22 and secured and concurrently utilized again for the oxidation of trivalent arsenic to pentavalent arsenic in the second submerged membrane separation tank 12.

(Tenth Embodiment)

Figure 10:
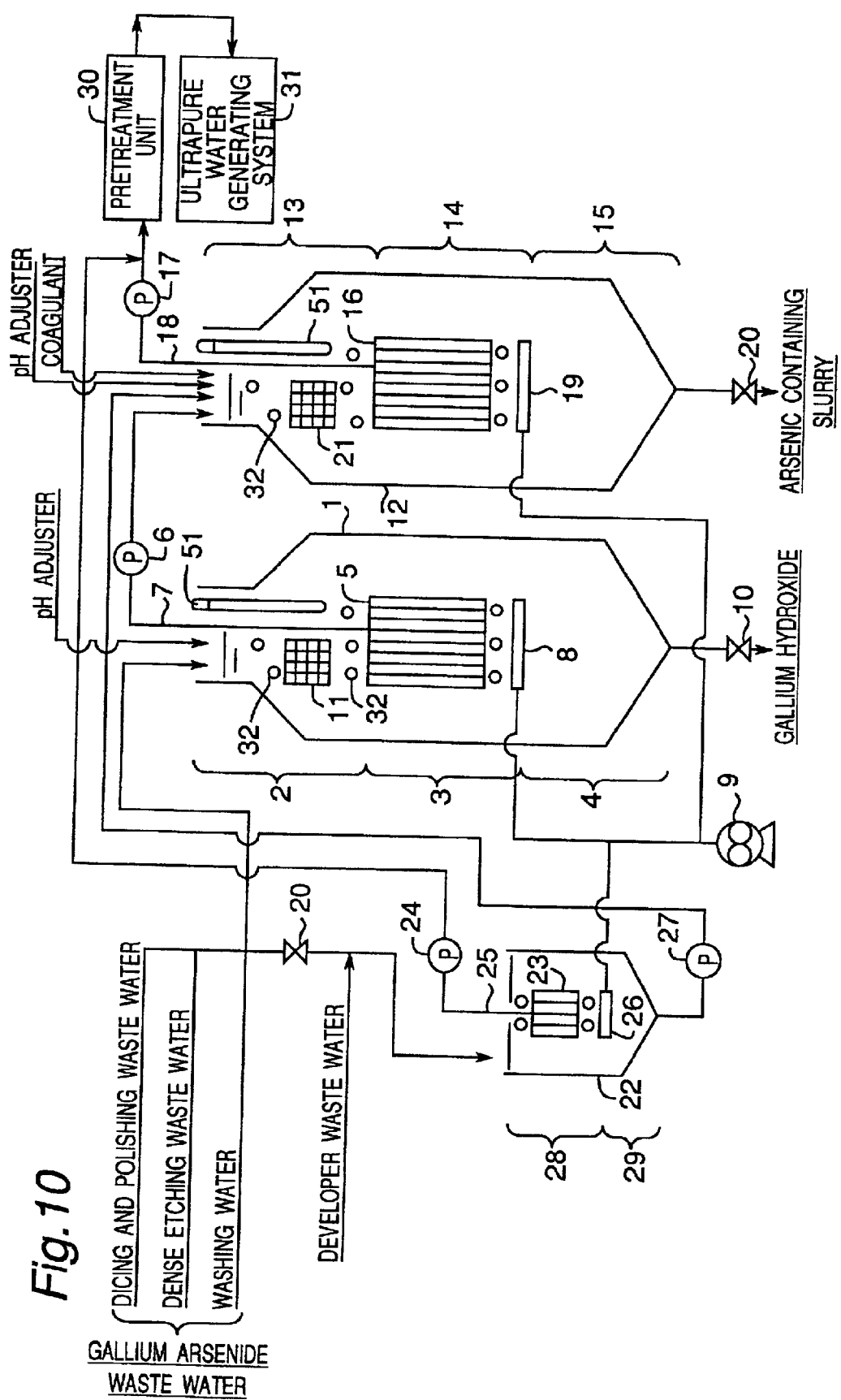
FIG. 10 is a schematic view showing the tenth embodiment of this invention.

Next, FIG. 10 shows the construction of the tenth embodiment of the metal containing waste water treatment equipment of this invention.

This tenth embodiment differs from the ninth embodiment only in that the filler 11 is placed in the reaction section 2 and the filler 21 is placed in the second reaction section 13, in comparison with the ninth embodiment. Therefore, in this tenth embodiment, the same components as those of the aforementioned ninth embodiment are denoted by same reference numerals, and no detailed description is provided therefor.

In this tenth embodiment, the filler 11 is placed in the reaction section 2, and the filler 21 is placed in the second reaction section 13. By virtue of the existence of the filler 11 and the filler 21, the bubbles 32 do not go out straightly into the air but collide against the filler 11 and the filler 21, causing turbulence in the waste water. By this operation, the waste water, the pH adjuster and the coagulant are smoothly stirred and mixed.

The fillers 11 and 12 are not specifically limited. However, it is required to select a material that has a chemical resistance since the fillers come in contact with the chemical. In concrete, a Tellerette line mixer made of plastic was selected as the fillers 11 and 21.

(Eleventh Embodiment)

Figure 11:
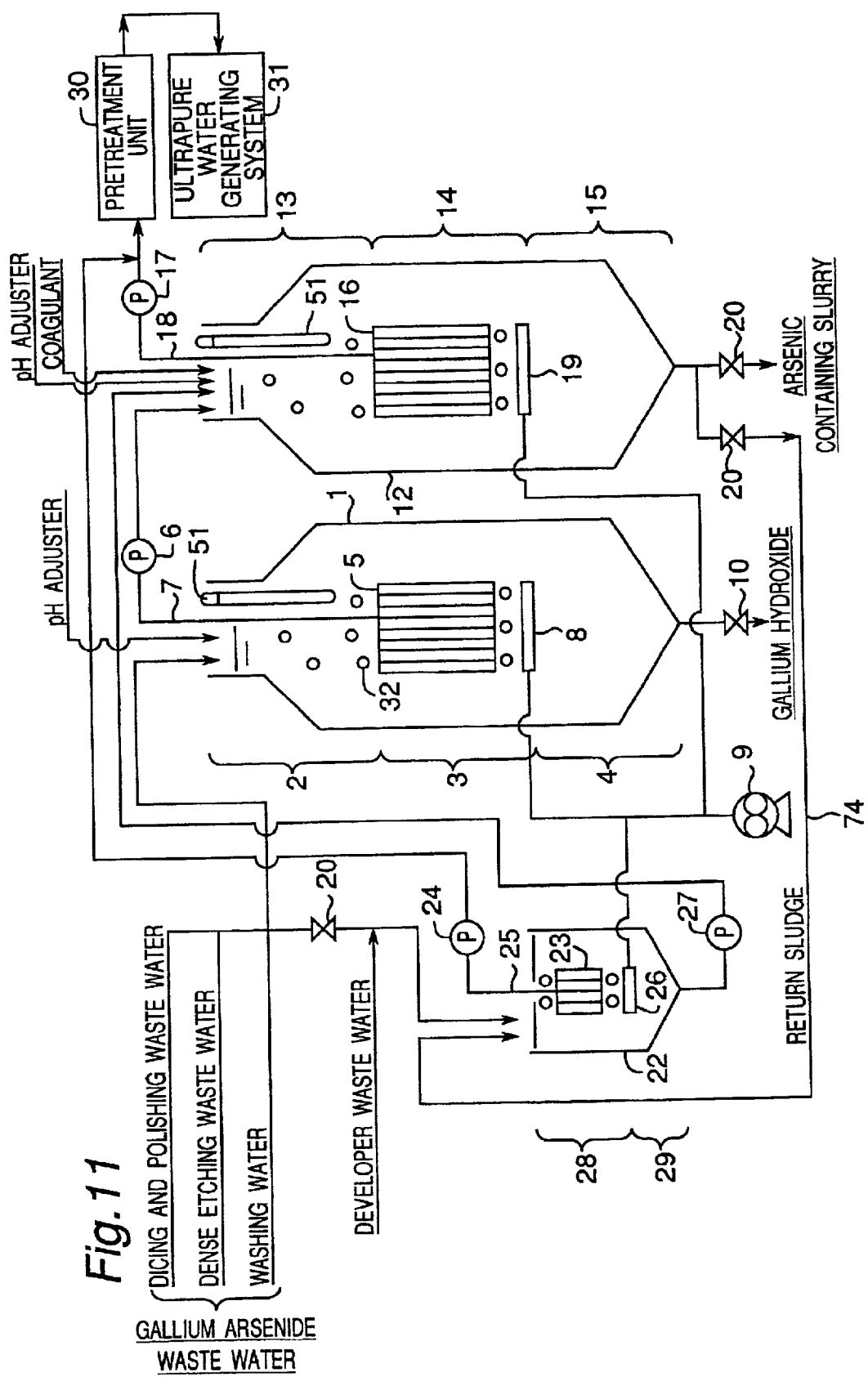
FIG. 11 is a schematic view showing the eleventh embodiment of this invention.

Next, FIG. 11 shows the construction of the eleventh embodiment of the metal containing waste water treatment equipment of this invention.

This eleventh embodiment differs from the aforementioned ninth embodiment only in that part of the arsenic containing slurry that includes the arsenic oxidizing bacterium concentrated in the lowermost portion of the second precipitation section 15 of the second submerged membrane separation tank 12 is sent back to the third submerged membrane separation tank 22 through a pipe 34. Therefore, in this eleventh embodiment, the same components as those of the aforementioned ninth embodiment are denoted by same reference numerals, and no detailed description is provided therefor.

In this eleventh embodiment, part of the arsenic containing slurry that includes the arsenic oxidizing bacterium concentrated in the lowermost portion of the second precipitation section 15 of the second submerged membrane separation tank 12 is sent back to the third submerged membrane separation tank 22 through the valve 20 and the pipe 34.

The effective arsenic oxidizing bacterium is sent back and introduced into the third submerged membrane separation tank 22 from the second precipitation section 15 of the second submerged membrane separation tank 12 so as to be cultured and bred with nitrogen and phosphorus added again as a nutrient. Subsequently, the bacterium is introduced again into the second submerged membrane separation tank 12 and utilized for the oxidation of trivalent arsenic to pentavalent arsenic.

In this eleventh embodiment, the treated water is sent by the second treated water pump 17 from the second submerged membrane 16 via the pipe 18 to the pretreatment system 30 and subsequently to the ultrapure water generating system 31. In this eleventh embodiment, the treated water was pretreated by being introduced into the pretreatment system 30 by the second treated water pump 17 and thereafter recycled by being introduced into the general ultrapure water generating system 31. Therefore, this eleventh embodiment is a system suitable particularly for a plant that is required to recycle the waste water.

In concrete, the pretreatment system 30 is required to be determined basically in accordance with the water quality of the treated water. In general, there are provided an activated carbon absorption unit for treating the organic matter in the treated water, an ion exchange unit for treating ions in the treated water and a reverse osmosis membrane unit for treating ions and minute particles.

(Twelfth Embodiment)

Figure 12:
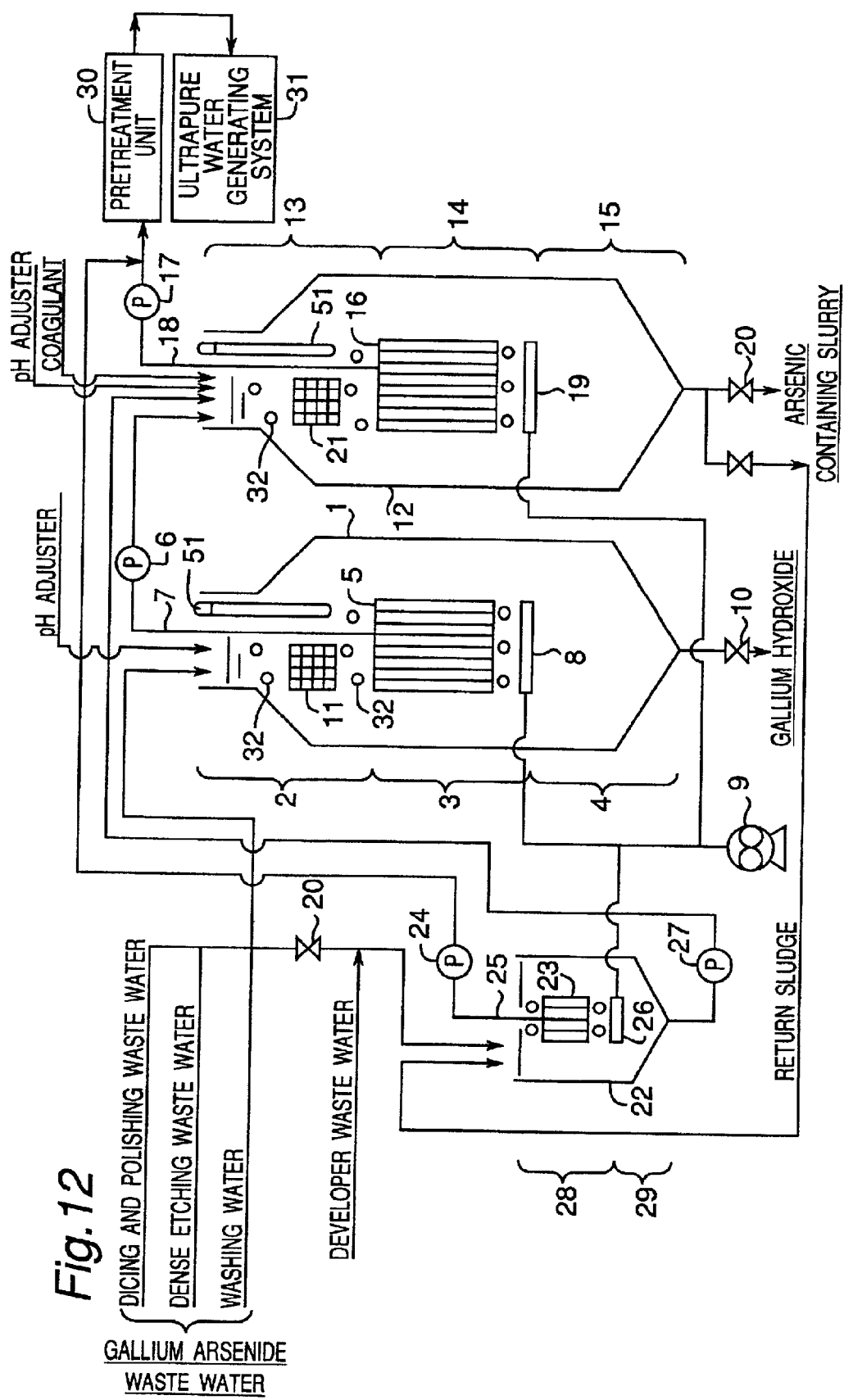
FIG. 12 is a schematic view showing the twelfth embodiment of this invention.

Next, FIG. 12 shows the construction of the twelfth embodiment of the metal containing waste water treatment equipment of this invention.

This twelfth embodiment differs from the aforementioned eleventh embodiment only in that the filler 11 is placed in the reaction section 2 and the filler 21 is placed in the second reaction section 13. Therefore, in this twelfth embodiment, the same components as those of the aforementioned eleventh embodiment are denoted by same reference numerals, and no detailed description is provided therefor.

In this twelfth embodiment, the filler 11 is placed in the reaction section 2, and the filler 21 is placed in the second reaction section 13. By virtue of the existence of the filler 11 and the filler 21, the bubbles 32 do not go out straightly into the air but collide against the filler 11 and the filler 21. This causes a turbulence, by which the waste water, the pH adjuster and the coagulant are smoothly stirred and mixed.

FIGS. 13A and 13B show timing charts of residence times in the first submerged membrane separation tank 1, the second submerged membrane separation tank 12 and the third submerged membrane separation tank 22 of this twelfth embodiment. FIG. 13A is the timing chart when the concentrations of gallium and arsenic in the waste water are normal concentrations. FIG. 13B is the timing chart when the concentrations of gallium and arsenic in the waste water are low concentrations.

The fillers 11 and 12 are not specifically limited. However, it is required to select a material that has a chemical resistance since the fillers come in contact with the chemical. In concrete, a Tellerette line mixer made of plastic was selected.

(First Experimental Example)

Next, as a concrete experimental example, an experimental example with an experimental apparatus of the same structure as that of the first embodiment shown in FIG. 1 will be described.

In this first experimental example, the capacity of the submerged membrane separation tank 1 was set to 160 liters. Then, the experiment was carried out by using ten A4-size submerged membranes of Kubota Corp.

At this time, the concentration of the influent gallium considerably changed within a range of about 100 ppm to 2000 ppm. However, by treatment in the submerged membrane separation tank 1, gallium was able to be obtained at a concentration of 50000 ppm in the form of a slurry.

(Second Experimental Example)

Next, as a concrete experimental example, an experimental example with an experimental apparatus of the same structure as that of the twelfth embodiment shown in FIG. 12 will be described.

In this second experimental example, the capacities of the first submerged membrane separation tank 1 and the second submerged membrane separation tank 12 were each set to 160 liters. Then, experiments were carried out by using a total of twenty A4-size submerged membranes of Kubota Corp., or ten submerged membranes for each of the submerged membrane separation tanks.

At this time, the concentration of the influent gallium considerably changed within a range of about 100 ppm to about 2000 ppm. However, by treatment in the submerged membrane separation tank 1, a slurry containing gallium at a concentration of about 50000 ppm was able to be obtained from the valve 10 of the first submerged membrane separation tank 1. Moreover, a slurry containing arsenic at a concentration of about 10000 ppm was able to be obtained from the valve 20 of the second submerged membrane separation tank 12.

(Thirteenth Embodiment)

Next, FIG. 14 shows the construction of a waste water treatment system for carrying out the thirteenth embodiment of the metal containing waste water treatment method of this invention.

This thirteenth embodiment is a method for treating a metal containing waste water from a compound semiconductor plant and, more concretely, a gallium waste water treatment method. Furthermore, this embodiment is a waste water treatment method capable of collecting gallium (gallium hydroxide) and sodium ions as a pH adjuster.

As a gallium waste water in a compound semiconductor plant, there are (1) dicing waste water, (2) dense etching waste water and (3) washing water.

The metal containing waste water of a mixture of the aforementioned substances (1), (2) and (3), i.e., an acid gallium arsenide waste water is introduced into a first reaction section 101. A reaction is caused by sodium hydroxide added as a pH adjuster, and a hydroxide of gallium hydroxide is formed. This gallium hydroxide is concentrated in the next submerged membrane separation unit 102 and discharged as a metalhydroxide.

On the other hand, the treated water separated in the submerged membrane separation unit 102 is introduced into the second reaction section 103. In this second reaction section 103, sodium hydroxide as a pH adjuster is added for pH adjustment. The treated water is subsequently treated by being introduced from the second reaction section 103 into a reverse osmosis membrane separation unit 104. In this reverse osmosis membrane separation unit 104, sodium ions, which are metal ions contained in the treated water, are concentrated, sent back to the first reaction section 101 and recycled for the pH adjustment of the gallium waste water as an acid metal containing waste water.

Therefore, according to this thirteenth embodiment, gallium in the metal containing waste water is made to be gallium hydroxide by sodium hydroxide that serves as a pH adjuster, and then this gallium hydroxide can be concentrated and collected in the submerged membrane separation unit 102. Moreover, by virtue of the addition of sodium hydroxide as a pH adjuster, the sodium ions contained in the waste water can be recycled as a pH adjuster by being concentrated in the reverse osmosis membrane separation unit 104 and sent back to the first reaction section 101. Through these processes, the amount of use of the pH adjuster is reduced to enable the reduction of running cost.

(Fourteenth Embodiment)

Next, FIG. 15 shows the construction of a waste water treatment system for carrying out the fourteenth embodiment of the metal containing waste water treatment method of this invention.

The waste water treatment system for carrying out this fourteenth embodiment differs from the waste water treatment system of the thirteenth embodiment only in the following points (1) and (2).

(1) A third reaction section 106 to which a pH adjuster and a coagulant are added and a second submerged membrane separation unit 105 are arranged behind the submerged membrane separation unit 102.

(2) An ultrapure water generating system 107 is arranged behind the reverse osmosis membrane separation unit 104.

Therefore, in this fourteenth embodiment, the same components as those of the aforementioned system of FIG. 14 are denoted by same reference numerals, and no detailed description is provided therefor.

In a compound semiconductor plant, a compound semiconductor, represented by gallium arsenide, is used, and a gallium arsenide waste water is discharged. A method for recycling the water obtained by securely treating the gallium arsenide waste water as a raw water for an ultrapure water generating system 107 is the fourteenth embodiment of FIG. 15.

In this fourteenth embodiment, first of all, gallium in the metal containing waste water, or the gallium arsenide waste water is separated as gallium hydroxide in the first submerged membrane separation unit 102. Next, the arsenic containing treated water obtained in the first submerged membrane separation unit 102 is introduced into a third reaction section 106. In this third reaction section 106, sodium hydroxide as a pH adjuster and ferric chloride as a coagulant are added to cause a reaction. Then, the treated water from the third reaction section 106 is introduced into the second submerged membrane separation unit 105, and the treated water is separated into arsenic and water in this second submerged membrane separation unit 105.

The arsenic is separated to a concentrate brine side in the second submerged membrane separation unit 105 and becomes an arsenic containing slurry.

On the other hand, arsenic is separated in the second submerged membrane separation unit 105, and the obtained treated water is introduced into the second reaction section 103. In this second reaction section 103, sodium hydroxide as a pH adjuster is added. Through these processes, the treated water is subjected to pH adjustment and thereafter introduced into the reverse osmosis membrane separation unit 104. The water obtained by being introduced into this reverse osmosis membrane separation unit 104 is recycled by being introduced into the ultrapure water generating system 107.

As described above, according to this fourteenth embodiment, gallium in the waste water can be separated and collected as gallium hydroxide in the first submerged membrane separation unit 102, and arsenic in the waste water can be separated and collected as an arsenic containing slurry in the second submerged membrane separation unit 105. Moreover, the treated water, which has passed through the reverse osmosis membrane separation unit 104, can be used as a raw water for the ultrapure water generating system 107, and metal (sodium ions) concentrated in this reverse osmosis membrane separation unit 104 is sent back to the first reaction section 101 and recycled as a PH adjuster.

(Fifteenth Embodiment)

Figure 16:
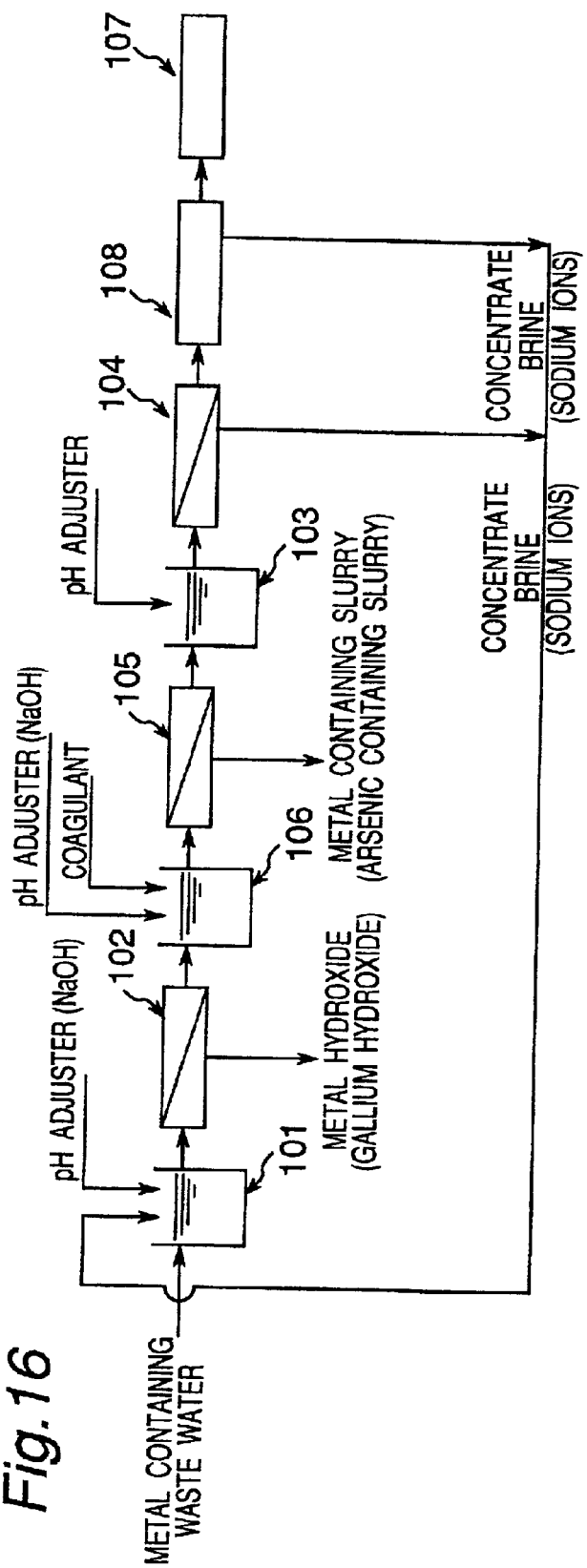
FIG. 16 is a view for explaining the fifteenth embodiment of the metal containing waste water treatment method of this invention.

Next, FIG. 16 shows the construction of a waste water treatment system for carrying out the fifteenth embodiment of the metal containing waste water treatment method of this invention.

This fifteenth embodiment differs from the aforementioned fourteenth embodiment only in that waste water treatment is carried out by means of a waste water treatment system in which an electric deionization unit 108 is arranged behind the reverse osmosis membrane separation unit 104 of FIG. 15. Therefore, in this fifteenth embodiment, the same components as those of the waste water treatment system employed in the fourteenth embodiment are denoted by same reference numerals, and no detailed description is provided therefor.

In this fifteenth embodiment, the electric deionization unit 108 is arranged behind the reverse osmosis membrane separation unit 104, and the ions, which are dissolved in the treated water introduced from the reverse osmosis membrane separation unit 104, are electrically removed by means of an ion exchange membrane and an ion exchange resin.

Therefore, according to this fifteenth embodiment, the ionic load on the ultrapure water generating system 107 is reduced. Therefore, the water quality of the ultrapure water generating system 107 is improved, and the running cost of the ultrapure water generating system 107 is concurrently reduced. On the other hand, the concentrate brine of the reverse osmosis membrane separation unit 104 and the electric deionization unit 108 contains sodium ions. Therefore, the sodium ions are recycled by being sent back to the first reaction section 101. Through these processes, the amount of use of sodium hydroxide as a new pH adjuster can be reduced.

(Sixteenth Embodiment)

Figure 17:
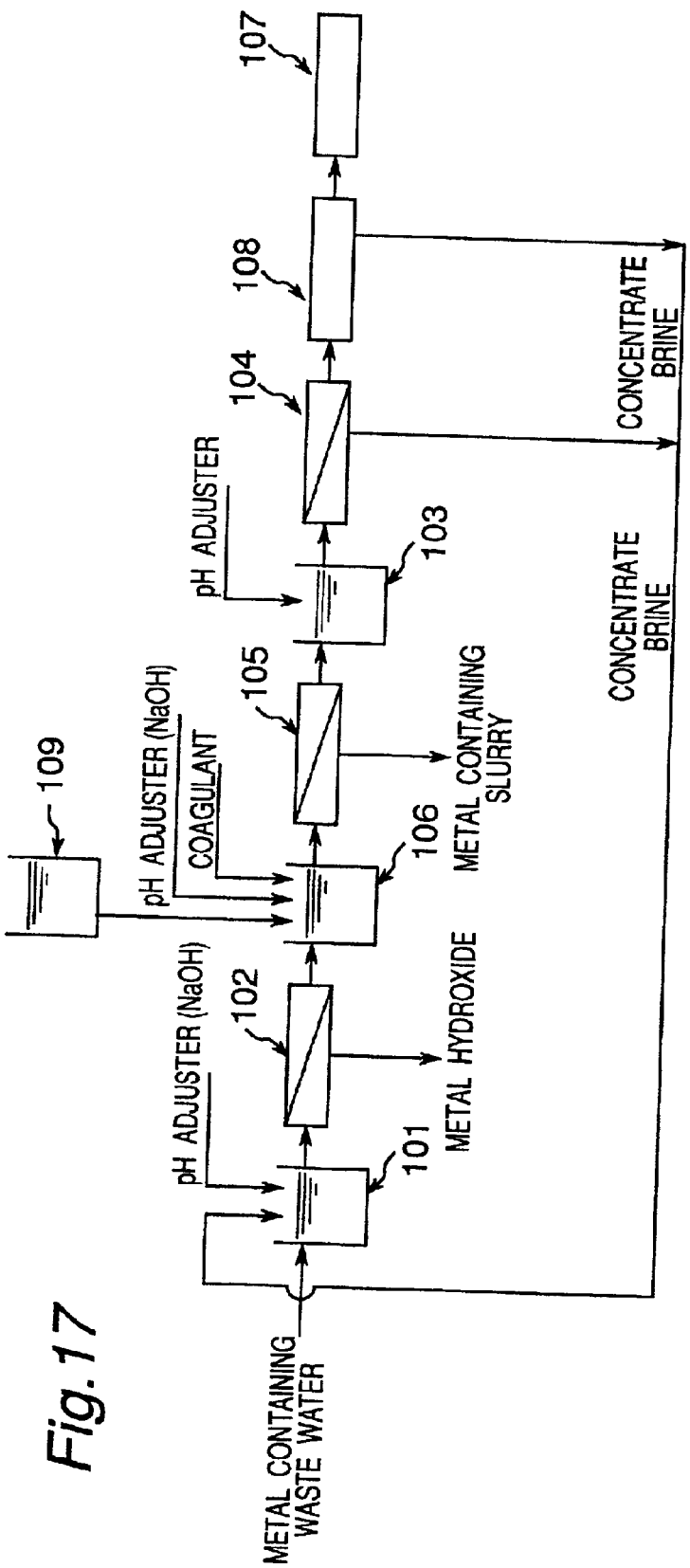
FIG. 17 is a view for explaining the sixteenth embodiment of this invention.

Next, FIG. 17 shows the construction of a waste water treatment system for carrying out the sixteenth embodiment of the metal containing waste water treatment method of this invention.

This sixteenth embodiment differs from the aforementioned fifteenth embodiment only in that a metal oxidizing bacterium is loaded from a metal oxidizing bacterium culturing tank 109 into the third reaction section 106 of FIG. 16. Therefore, in this sixteenth embodiment, the same components as those of the waste water treatment system employed in the aforementioned fifteenth embodiment are denoted by same reference numerals, and no detailed description is provided therefor.

In this sixteenth embodiment, the metal oxidizing bacterium is loaded from the metal oxidizing bacterium culturing tank 109 into the third reaction section 106.

Through this process, when the metal containing waste water is the gallium arsenide waste water, trivalent arsenic is changed to pentavalent arsenic in the third reaction section 106 so as to be detoxified and stabilized. In concrete, the arsenic oxidizing bacterium was loaded as the metal oxidizing bacterium into the third reaction section 106.

Although there is also a method for using an oxidizer in an oxidizing process, the running cost can be reduced by using the metal oxidizing bacterium.

(Seventeenth Embodiment)

Figure 18:
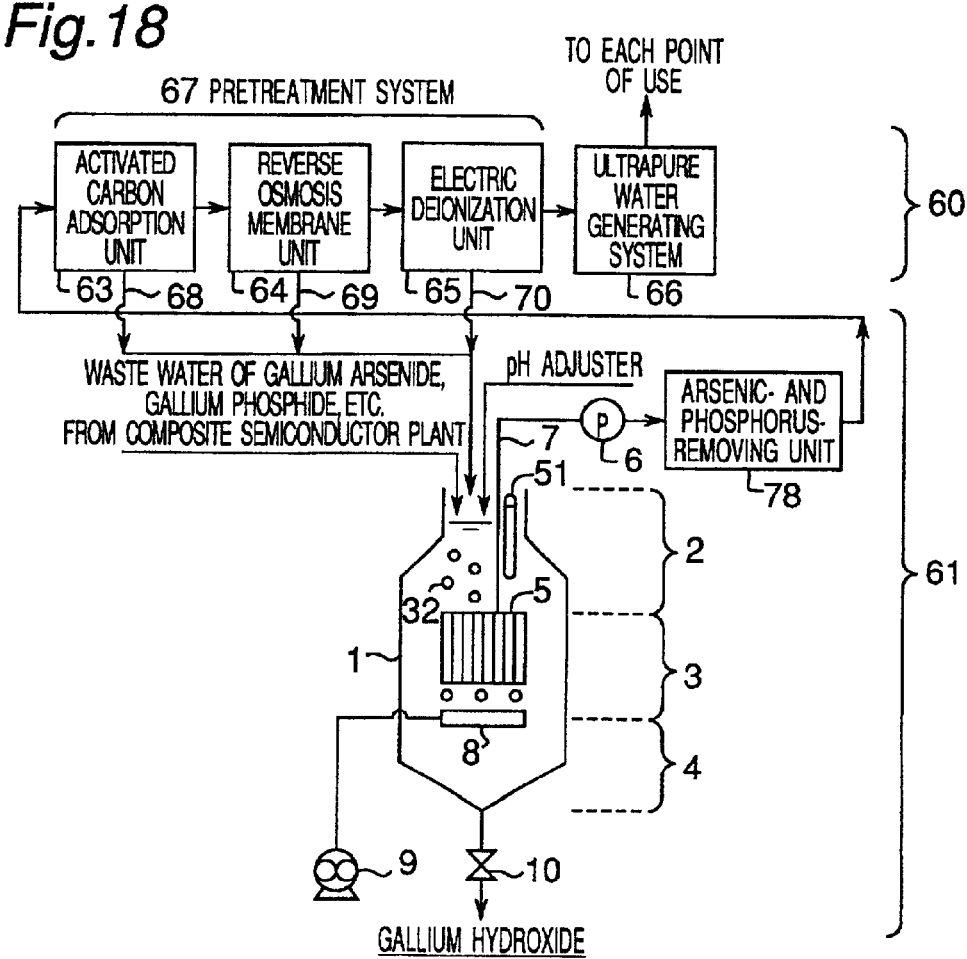
FIG. 18 is a view for explaining the seventeenth embodiment of this invention.

Next, FIG. 18 shows the construction of a waste water treatment system for carrying out the seventeenth embodiment of the metal containing waste water treatment method of this invention. This waste water treatment system is constructed of a unit uppermost portion 60 and an unit upper portion 61 as a whole. This unit uppermost portion 60 is constructed of a pretreatment system 67 and an ultrapure water generating system 66. The unit upper portion 61 is constructed mainly of the submerged membrane separation tank 1.

In this seventeenth embodiment, the waste water from compound semiconductors plant, which contains gallium arsenide, gallium phosphide and so on, is introduced into the reaction section 2 arranged in the upper portion of the submerged membrane separation tank 1, and a pH adjuster of sodium hydroxide or the like is added to this reaction section 2.

This submerged membrane separation tank 1 is constructed of a reaction section 2, a submerged membrane section 3 and a precipitation section 4. The reaction section 2 is located in the upper portion, and a pH meter 51 is placed. Moreover, the submerged membrane section 3 is arranged in the middle, and the precipitation section 4 is arranged in a lower portion.

The acid waste water due to compound semiconductors, which contains gallium arsenide and so on, is introduced into the reaction section 2 of the submerged membrane separation tank 1. The pH adjuster of sodium hydroxide or the like is added, and the waste water is efficiently stirred and mixed by bubbles 32 discharged from the air diffusion pipe 8 placed below the submerged membrane 5 of the submerged membrane section 3.

The operating conditions in the reaction section 2 are controlled by the pH meter 12. The treated water in the reaction section 2 should preferably be controlled within a range of pH 4 to pH 5, but it is not the absolute way.

By being efficiently stirred and mixed in this reaction section 2, gallium ions dissolved in the waste water becomes gallium hydroxide and easily precipitates. Gallium particles as a solid matter precipitate as they are, but the rate of precipitation is slow.

The bubbles discharged from the air diffusion pipe 8 placed below the submerged membrane 5 consistently clean the membrane surface of the submerged membrane 5. Therefore, the membrane is not blocked up by minute solid matter. This submerged membrane 5 is provided by an ultrafiltration membrane, and in concrete, it is proper to select the submerged membranes produced by Kubota Corp., Yuasa Corp., Mitsubishi Rayon Co., Ltd. and so on.

The blower, denoted by reference numeral 9, supplies air to the air diffusion pipe 8. It is proper to select the general Roots blower. Reference numeral 60 denotes the uppermost portion of the waste water treatment unit, while reference numeral 61 denotes the unit upper portion.

By operating the treated water pump 6, the treated water and the concentrate are separated from each other by the submerged membrane 5. This treated water is introduced by the treated water pump 6 through a pipe 7 into an arsenic- and phosphorus-removing unit 78, which constitutes the next process and in which arsenic and phosphorus are removed. The treated water from which arsenic and phosphorus have been removed is recycled by being introduced sequentially via an activated carbon absorption unit 63, a reverse osmosis membrane separation unit 64 and an electric deionization unit 65 into an ultrapure water generating system 66.

On the other hand, a back washing water from the activated carbon absorption unit 63 contains a suspended matter. Therefore, the water is introduced through the pipe 68 into the reaction section 2 and recycled as a treated water.

The concentrate brine obtained from the reverse osmosis membrane unit 64 and the electric deionization unit 65 is introduced into the reaction section 2 via pipes 69 and 70. This concentrate brine contains sodium ions attributed to sodium hydroxide as a pH adjuster added to the reaction section 2. Therefore, water and sodium ions are recycled by being introduced into the reaction section 2.

By utilizing the three-dimensional structure of the submerged membrane separation tank 1, this embodiment (1) causes a reaction in the reaction section 2 located in the upper portion, (2) carries out submerged membrane concentration in the submerged membrane section 3 located in the middle portion and (3) carries out precipitation and concentration by the specific gravity possessed by the hydroxide in the precipitation section 4 located in the lower portion.

(Eighteenth Embodiment)

Figure 19:
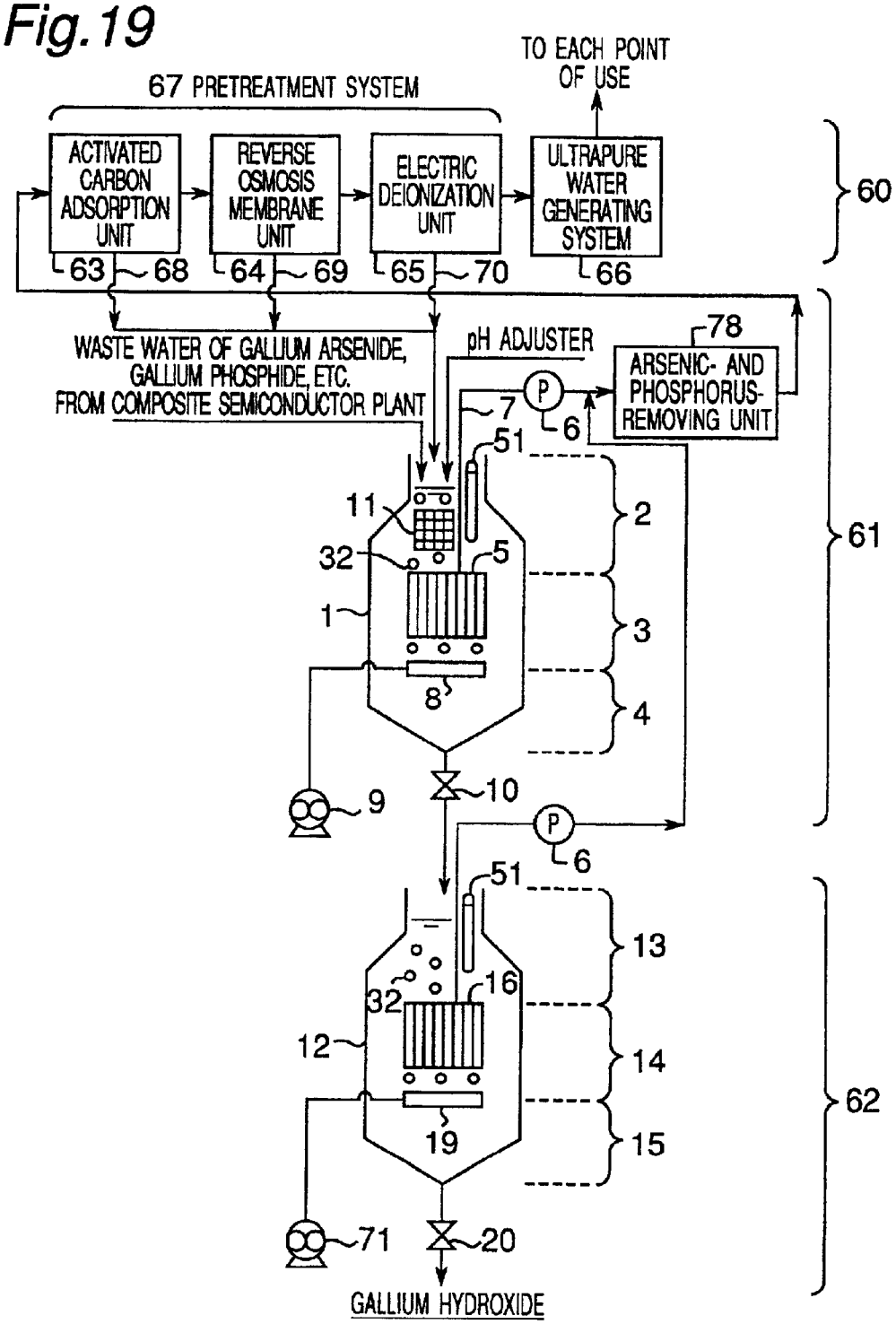
FIG. 19 is a view for explaining the eighteenth embodiment of this invention.

Next, FIG. 19 shows the construction of a waste water treatment system for carrying out the eighteenth embodiment of the metal containing waste water treatment method of this invention.

This eighteenth embodiment differs from the system for carrying out the aforementioned seventeenth embodiment only in that a second submerged membrane separation unit 12 is arranged below the submerged membrane separation tank 1 of FIG. 19 and the reaction section 2 of the submerged membrane separation tank 1 is filled with a filler 11. Therefore, in this eighteenth embodiment, the same components as those of the system for carrying out the aforementioned seventeenth embodiment are denoted by same reference numerals, and no detailed description is provided therefor.

In this eighteenth embodiment, a waste water treatment system in which a second submerged membrane separation tank 12 is arranged below the first membrane submerged separation tank 1 is employed. This second submerged membrane separation tank 12 is constructed of a reaction section 13, a second submerged membrane section 14 and a precipitation section 15 arranged in order from top to bottom. Reference numeral 62 indicates the second submerged membrane separation tank 12 and the lower portion of the waste water treatment unit.

In this eighteenth embodiment, gallium hydroxide as a concentrate brine concentrated and precipitated in the submerged membrane separation tank 1 can further be physically concentrated in the second submerged membrane separation tank 12. The second submerged membrane separation tank 12 is provided with a reaction section 13 where a pH meter 51 is placed. The role of this reaction section 13 is to effectively carry out the concentration and separation in the second submerged membrane 16 by stirring gallium hydroxide by aeration.

Moreover, by virtue of the fact that the reaction section 2 of the submerged membrane separation tank 1 is filled with the filler 11, a turbulence is caused inside the reaction section 2 where the pH meter 12 is placed, as a consequence of which the efficiency of reaction of the pH adjuster with the waste water can be improved in the reaction section 2.

The filler 11 is not specifically limited so long as the filler improves the efficiency of reaction in the reaction section 2, and it is proper to select a material that has a chemical resistance. In concrete, a Tellerette and the like are available.

It is to be noted that the pH meter 51 placed in the reaction section 13 is intended merely for monitoring the pH in the reaction section 13.

(Nineteenth Embodiment)

Figure 20:
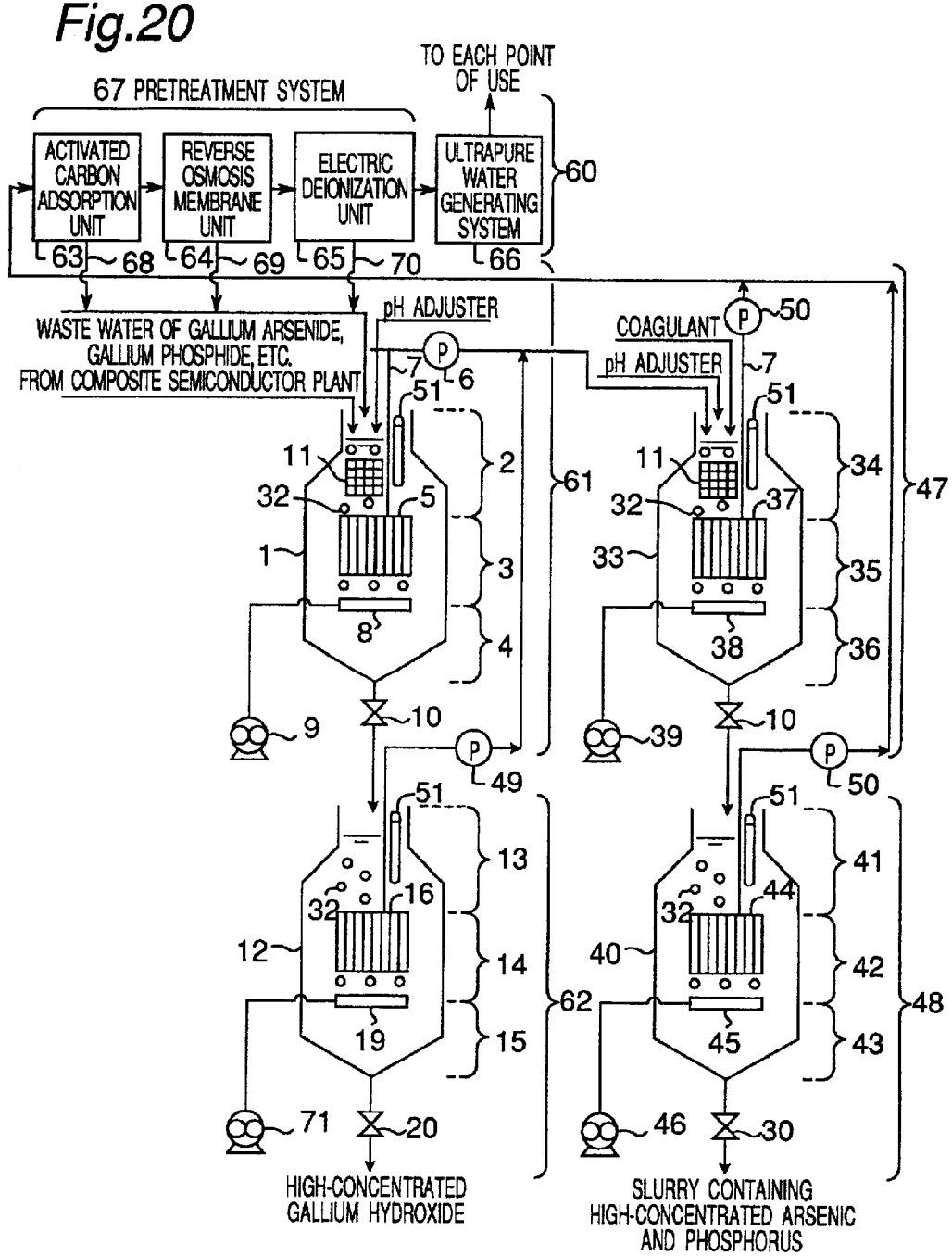
FIG. 20 is a view for explaining the nineteenth embodiment of this invention.

Next, FIG. 20 shows the construction of a waste water treatment system for carrying out the nineteenth embodiment of the metal containing waste water treatment method of this invention.

This nineteenth embodiment is carried out by a waste water treatment system different from the waste water treatment system employed in the aforementioned eighteenth embodiment with regard to the following points (1) and (2).

(1) Besides the submerged membrane separation tank 1 and the second membrane separation tank 12 shown in FIG. 19, the separated water from the submerged membrane 5 and the second submerged membrane 16 is introduced into the third submerged membrane separation tank 33 in which the reaction section 34 is filled with a filler 11.

(2) A fourth submerged membrane separation tank 40 for further concentrating the concentrate brine from the third submerged membrane separation tank 33 is provided.

Therefore, according to the waste water treatment method of this nineteenth embodiment, the same components as those of the system employed in the aforementioned eighteenth embodiment are denoted by same reference numerals, and no detailed description is provided therefor.

In this nineteenth embodiment, the separated water from the submerged membrane 5 and the submerged membrane 16 of the eighteenth embodiment of FIG. 19 is introduced into the reaction section 34 of the third submerged membrane separation tank 33. This reaction section 34 is filled with the filler 11. In the reaction section 34 of this third submerged membrane separation tank 33, arsenic and phosphorus dissolved in the treated water are made to react with the pH adjuster and the coagulant of ferric chloride or the like so as to be put into a flock state and then separated from water as a concentrate brine by the third submerged membrane 37.

The water separated by this third submerged membrane 37 is introduced into the activated carbon absorption unit 63 by a pump 50, treated by the pretreatment system 67 and recycled as a raw water for the ultrapure water generating system 66 similarly to the eighteenth embodiment.

On the other hand, the concentrate brine separated by the third submerged membrane 37 is precipitated and concentrated in a third precipitation section 36 of the third submerged membrane separation tank 33. This concentrate brine, which has been precipitated and concentrated, is introduced by gravity into a fourth submerged membrane separation tank 40 and further concentrated by a fourth submerged membrane 44 and a fourth precipitation section 43 so as to become a high-concentration arsenic and phosphorus containing slurry.

Then, the water separated by the fourth submerged membrane 44 is introduced into the activated carbon absorption unit 63 by a pump 50 and recycled as a raw water for the ultrapure water generating system 66 similarly to the eighteenth embodiment.

(Twentieth Embodiment)

Figure 21:
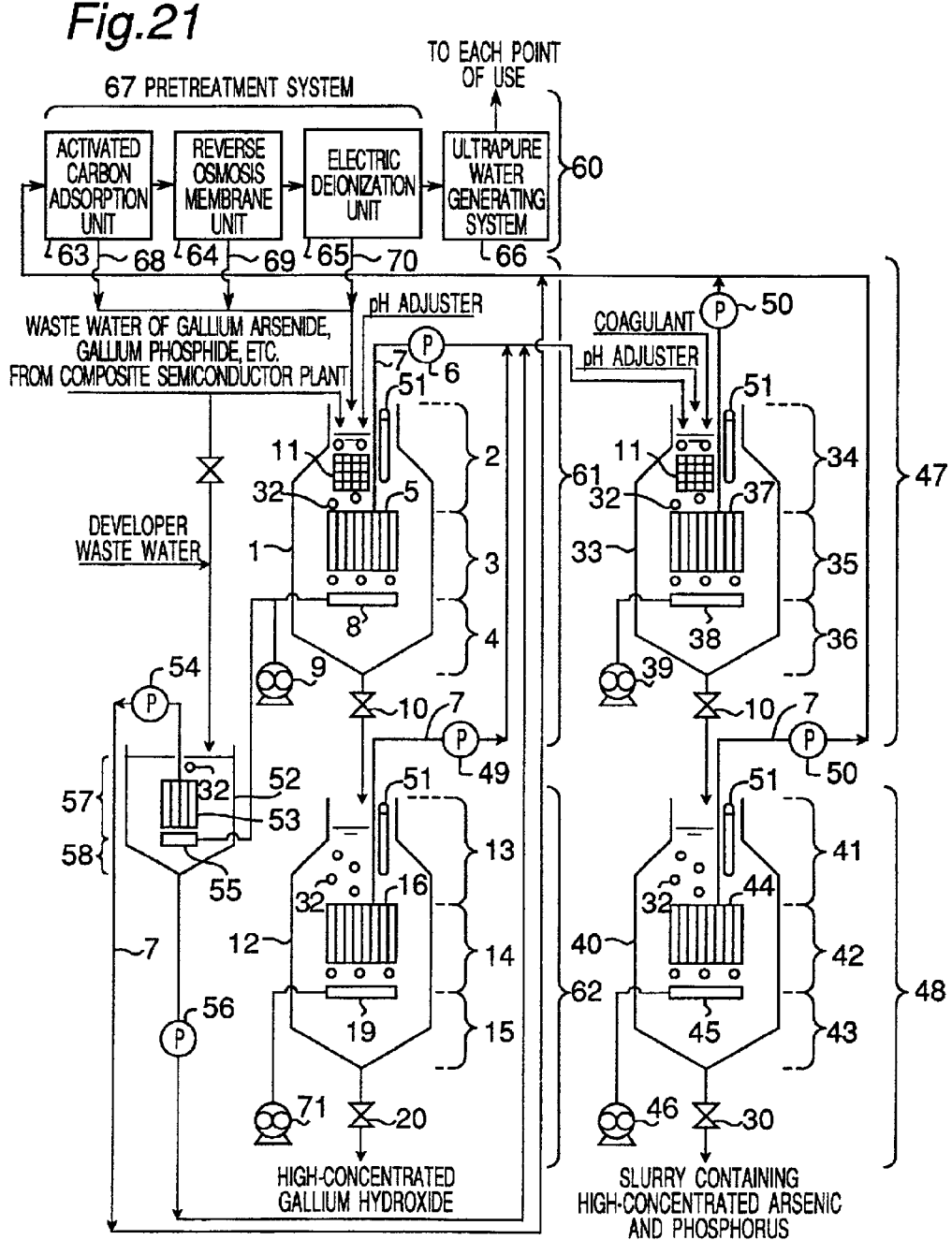
FIG. 21 is a view for explaining the twentieth embodiment of this invention.

Next, FIG. 21 shows the construction of a waste water treatment system for carrying out the twentieth embodiment of the metal containing waste water treatment method of this invention.

This twentieth embodiment differs from the aforementioned nineteenth embodiment only in that a waste water treatment system in which a fifth submerged membrane separation tank 52 shown in FIG. 21 is additionally provided is employed.

Therefore, in this twentieth embodiment, the same components as those of the waste water treatment system of the nineteenth embodiment are denoted by same reference numerals, and no detailed description is provided therefor.

This twentieth embodiment is provided with the fifth submerged membrane separation tank 52, and a fifth submerged membrane 53 is placed in this fifth submerged membrane separation tank 52. Moreover, reference numeral 58 denotes a fifth precipitation section, and reference numeral 57 denotes a fifth submerged membrane section.

Part of a waste water containing gallium arsenide and so on and a waste water containing developer are introduced into this fifth submerged membrane separation tank 52. This fifth submerged membrane separation tank 52 is aerated by air discharged from an air diffusion pipe 55, and therefore, microorganism propagates with a lapse of time using the organic matter in the developer contained in the developer contained in the waste water as a nutrient. Then, with the introduction of part of the waste water containing gallium arsenide and so on, the arsenic oxidizing bacterium is generated based on the arsenic in the waste water.

When starting up the waste water treatment equipment employed in this twentieth embodiment in a short time, it is also possible to preparatorily culture and breed the arsenic oxidizing bacterium in another place and then load this arsenic oxidizing bacterium into the fifth submerged membrane separation tank 52, allowing the bacterium to propagate in an early stage.

Then, the arsenic oxidizing bacterium bred in this fifth submerged membrane separation tank 52 is introduced into the third submerged membrane separation tank 33 and mixed with the separated water from the submerged membrane 5 of the submerged membrane separation tank 1, oxidizing trivalent arsenic to pentavalent arsenic by the arsenic oxidizing bacterium, for the achievement of stabilization.

In this third submerged membrane separation tank, arsenic can be concentrated and separated as stable pentavalent arsenic. Moreover, since no oxidizer is used as a chemical, the running cost can be reduced.

(Twenty-First Embodiment)

Figure 22:
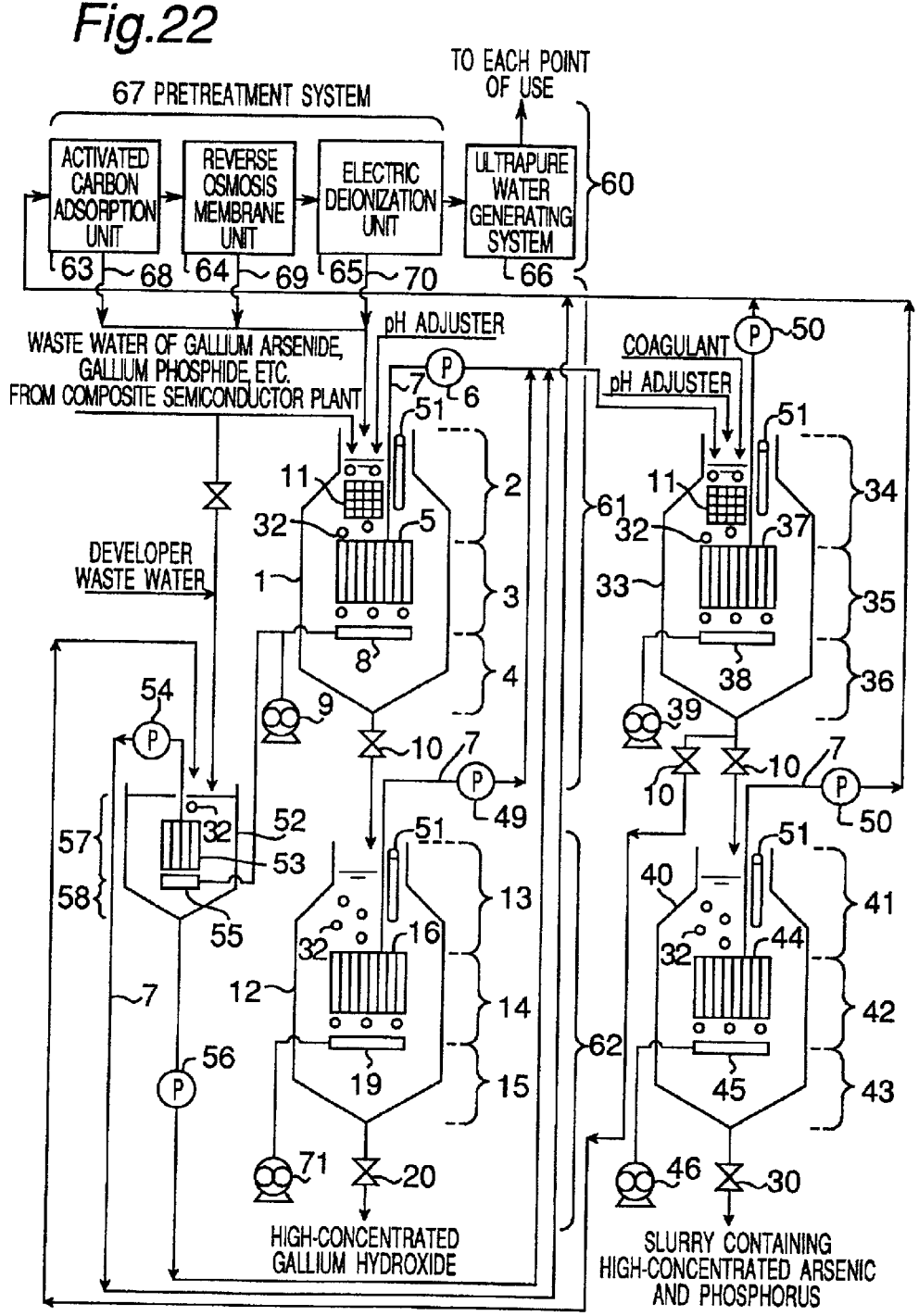
FIG. 22 is a view for explaining the twenty-first embodiment of this invention.

Next, FIG. 22 shows the construction of a waste water treatment system for carrying out the twenty-first embodiment of the metal containing waste water treatment method of this invention.

This twenty-first embodiment differs from the twentieth embodiment only in that the precipitated concentrate brine in the third precipitation section 36 of FIG. 21 is partially sent back to the fifth submerged membrane separation tank 52. Therefore, in this twenty-first embodiment, the same components as those of the waste water treatment system of FIG. 21 are denoted by same reference numerals, and no detailed description is provided therefor.

In this twenty-first embodiment, part of the precipitated concentrate brine in the third precipitation section 36 is sent back to the fifth submerged membrane separation tank 52. Through this process, the arsenic oxidizing bacterium is recycled, and the arsenic oxidizing bacterium is effectively utilized. Consequently, the arsenic oxidizing bacterium can be maintained at a constant concentration within the system of the twenty-first embodiment. Moreover, the rate of culturing the arsenic oxidizing bacterium inside the fifth submerged membrane separation tank 52 can be increased.

FIG. 28A shows a timing chart when the concentrations of gallium and arsenic in the waste water are normal concentrations in this twenty-first embodiment. FIG. 28B shows a timing chart when the concentrations of gallium and arsenic in the waste water are low concentrations in this twenty-first embodiment. As is apparent by referring to FIGS. 28A and 28B, the residence times in the submerged membrane separation tank and the second submerged membrane separation tank are reduced to a half in the case of low concentration in comparison with the case of normal concentration.

(Twenty-Second Embodiment)

Figure 23:
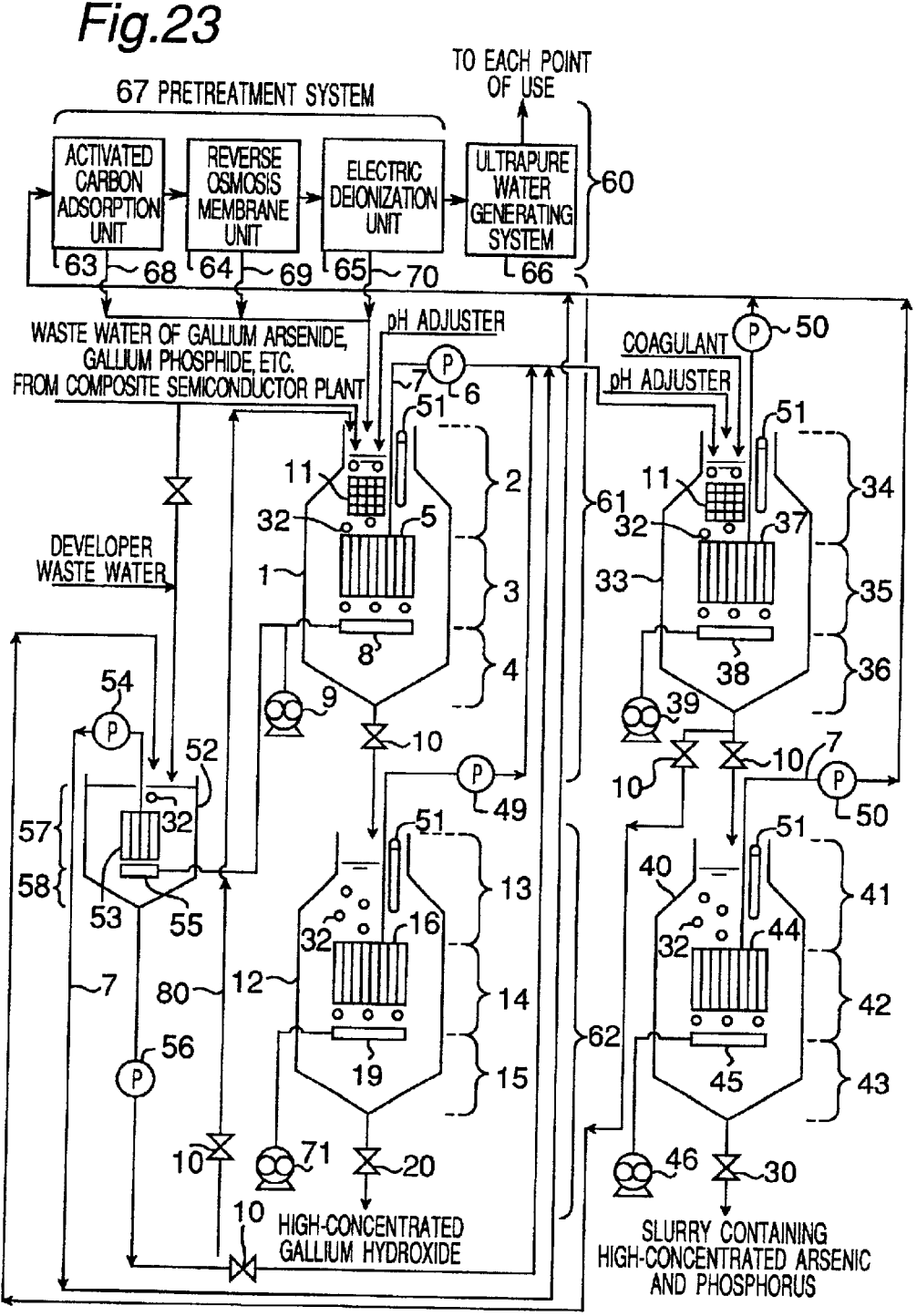
FIG. 23 is a view for explaining the twenty-second embodiment of this invention.

Next, FIG. 23 shows the construction of a waste water treatment system employed in the twenty-second embodiment of the metal containing waste water treatment method of this invention.

This twenty-second embodiment differs from the aforementioned twenty-first embodiment only in that the liquid precipitated and concentrated in the fifth precipitation section 58 of the fifth submerged membrane separation tank 52 shown in FIG. 22 is sent back to the submerged membrane separation tank 1 by way of a pipe 80. Therefore, in this twenty-second embodiment, the same components as those of the waste water treatment system of the aforementioned twenty-first embodiment are denoted by same reference numerals, and no detailed description is provided therefor.

In this twenty-second embodiment, the liquid precipitated and concentrated in the fifth precipitation section 58 of the fifth submerged membrane separation tank 52 is sent back to the submerged membrane separation tank 1 by way of the pipe 80, and the organic matter in the waste water is treated by means of the arsenic oxidizing bacterium in the liquid. This arsenic oxidizing bacterium, of course, oxidizes arsenic and is also able to resolve and treat the organic matter in the waste water because it is a microorganism.

FIG. 27A shows a timing chart when the concentrations of gallium and arsenic in the waste water are normal concentrations in this twenty-second embodiment. FIG. 27B shows a timing chart when the concentrations of gallium and arsenic in the waste water are low concentrations in this twenty-second embodiment. As is apparent by comparing FIG. 27A with FIG. 27B, the residence times in the third and fourth submerged membrane separation tanks are reduced by one hour in the case of low concentration in comparison with the case of normal concentration.

(Twenty-Third Embodiment)

Figure 24:
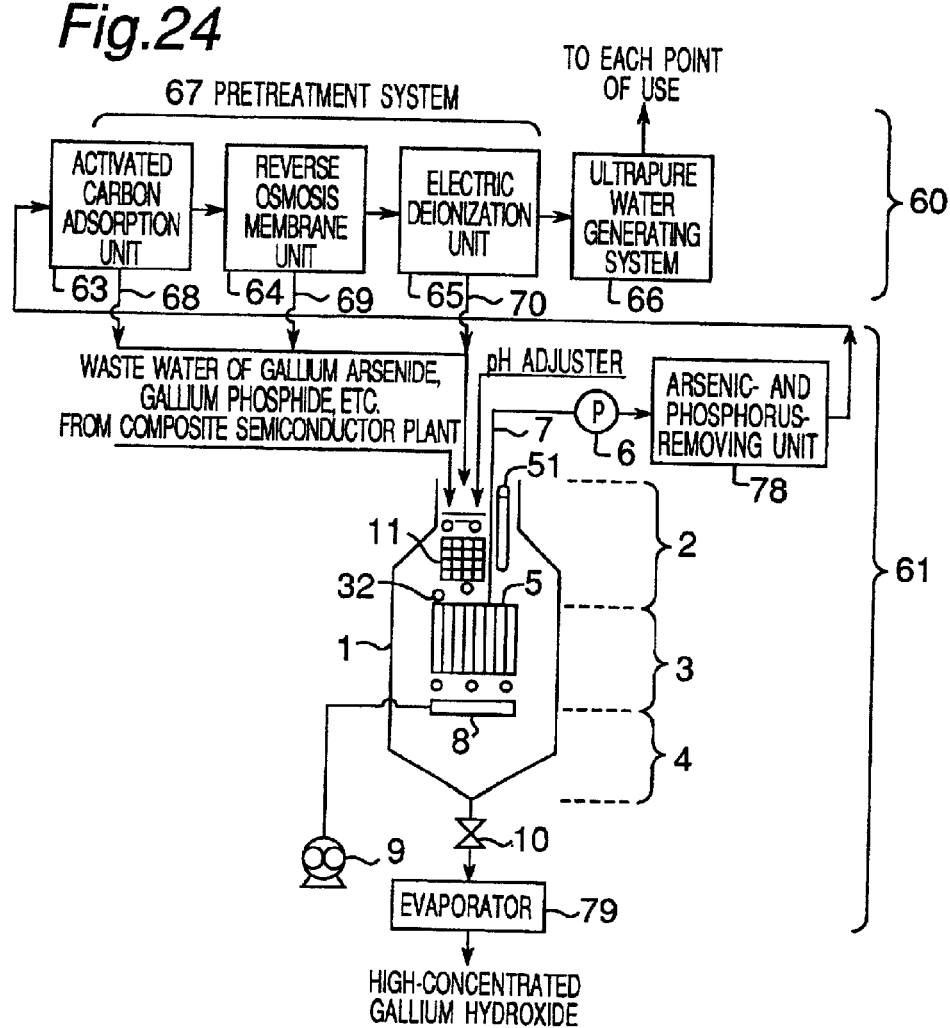
FIG. 24 is a view for explaining the twenty-third embodiment of this invention.

Next, FIG. 24 shows the construction of a waste water treatment system for carrying out the twenty-third embodiment of the metal containing waste water treatment method of this invention.

This twenty-third embodiment differs from the waste water treatment system of the seventeenth embodiment shown in FIG. 18 only in that an evaporator 79 is arranged below the submerged membrane separation tank 1 of FIG. 18. Therefore, in this twenty-third embodiment, the same components as those of the system of the aforementioned seventeenth embodiment are denoted by same reference numerals, and no detailed description is provided therefor.

In this twenty-third embodiment, the precipitated concentrate brine, i.e., gallium hydroxide obtained from the submerged membrane separation tank 1 of the seventeenth embodiment can be concentrated to the desired concentration by the evaporator 79 in a short time.

(Twenty-Fourth Embodiment)

Figure 25:
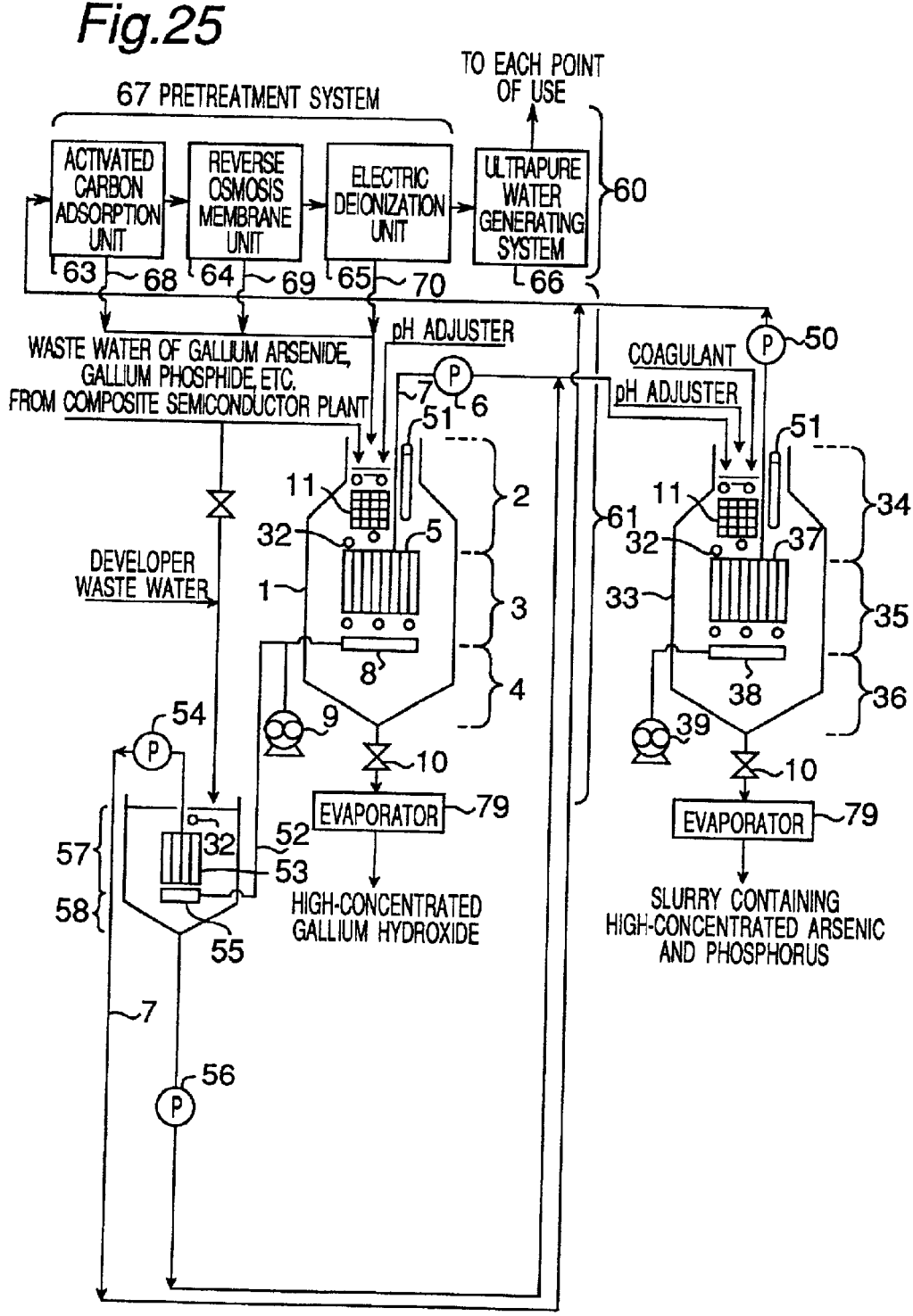
FIG. 25 is a view for explaining the twenty-fourth embodiment of this invention.

Next, FIG. 25 shows the construction of a waste water treatment system for carrying out the twenty-fourth embodiment of the metal containing waste water treatment method of this invention.

This twenty-fourth embodiment differs from the twentieth embodiment only in that a waste water treatment system provided with evaporators 79 and 79 as alternative equipment of the second submerged membrane separation tank 12 and the fourth submerged membrane separation tank 40 in FIG. 21 (twentieth embodiment) is employed. Therefore, in this twenty-fourth embodiment, the same components as those of the system of the aforementioned twentieth embodiment are denoted by same reference numerals, and no detailed description is provided therefor.

In this twenty-fourth embodiment, the precipitated concentrate brine, i.e., gallium hydroxide obtained from the submerged membrane separation tank 1 can be concentrated to the desired concentration by the evaporator 79 in a short time. Moreover, an arsenic- and phosphorus-containing slurry, which is a precipitated concentrate brine obtained from the third submerged membrane separation tank 33, can be concentrated to the desired concentration by the evaporator 79 in a short time.

(Twenty-Fifth Embodiment)

Next, FIG. 26 shows the construction of a waste water treatment system for carrying out the twenty-fifth embodiment of the metal containing waste water treatment method of this invention.

This twenty-fifth embodiment differs from the aforementioned twenty-second embodiment only in that an influent water is a waste water containing hydrogen peroxide (hydroperoxide), gallium arsenide, gallium phosphide and so on. As shown in FIG. 23, the influent water is a waste water of gallium arsenide, gallium phosphide and so on containing hydrogen peroxide (hydro-peroxide). Therefore, in this twenty-fifth embodiment, the same components as those of the system of the aforementioned twenty-second embodiment are denoted by same reference numerals, and no detailed description is provided therefor.

Since the influent water is the waste water of gallium arsenide, gallium phosphide and so on containing hydrogen peroxide (hydro-peroxide), hydrogen peroxide (hydro-peroxide) is included in the waste water.

Moreover, in this twenty-fifth embodiment, the arsenic oxidizing bacterium is introduced into the submerged membrane separation tank 1 and the second submerged membrane separation tank 24. Therefore, the microorganism concentration increases with a lapse of time, and an anaerobic microorganism also propagates in part. Then, by the reducibility possessed by the anaerobic microorganism, the hydrogen peroxide (hydro-peroxide) as an oxidizer is resolved.

When the hydrogen peroxide in the waste water is resolved, it is easy to recycle the waste water as a raw water for the ultrapure water generating system. The water quality, which allow the waste water to be easily recycled as a raw water for the ultrapure water generating system, means that all the water quality items of ions, organic matter, minute particles and so on other than hydrogen peroxide are treated.

(Third Experimental Example)

Next, as a concrete experimental example, an experimental example with an experimental apparatus of the same structure as that of the seventeenth embodiment shown in FIG. 18 will be described.

In this third experimental example, the capacity of the submerged membrane separation tank 1 was set to 160 liters. Then, the experiment was carried out by using ten A4-size submerged membranes of Kubota Corp.

At this time, the concentration of gallium in the influent waste water from compound semiconductor plant considerably changed within a range of about 100 ppm to 2000 ppm. However, by treatment in the submerged membrane separation tank 1, gallium was able to be obtained at a concentration of 50000 ppm in the form of a slurry.

Then, the separated water obtained from the submerged membrane 5 was treated by being introduced into the arsenic- and phosphorus-removing unit and a series of pretreatment systems and recycled as a raw water for the ultrapure water generating system.

(Fourth Experimental Example)

Next, as a concrete experimental example, an experimental example with an experimental apparatus of the same structure as that of the eighteenth embodiment shown in FIG. 19 will be described.

In this fourth experimental example, the capacities of the first submerged membrane separation tank 1 and the second submerged membrane separation tank 12 were each set to 160 liters. Then, experiments were carried out by using a total of twenty A4-size submerged membranes of Kubota Corp., or ten submerged membranes for each of the submerged membrane separation tanks.

At this time, the concentration of the influent gallium considerably changed within a range of about 100 ppm to about 2000 ppm. However, by treatment in the submerged membrane separation tank 1 and the second submerged membrane separation tank 12, a slurry containing gallium at a concentration of about 80000 ppm was able to be obtained.

(Twenty-Sixth Embodiment)

Figure 29:
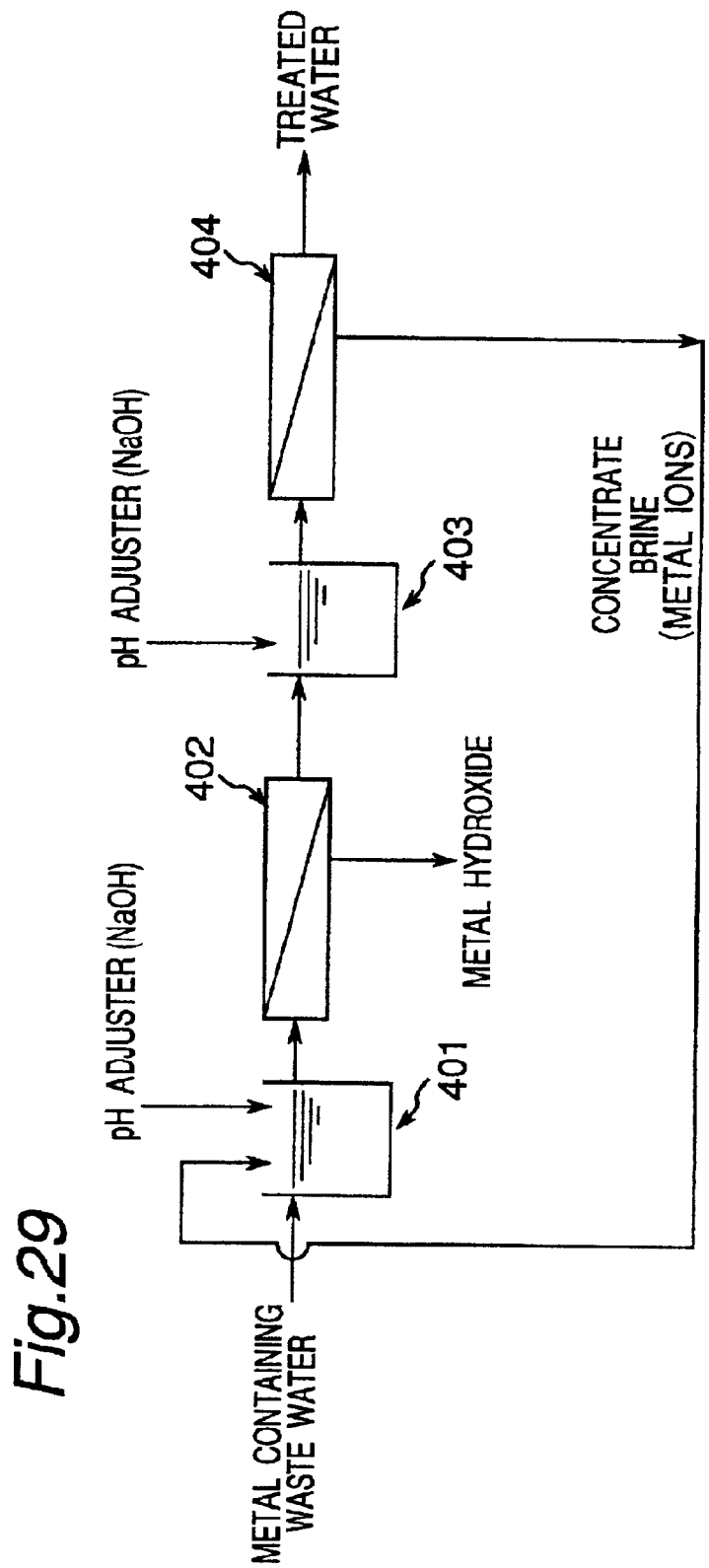
FIG. 29 is a schematic view showing the twenty-sixth embodiment of this invention.

FIG. 29 shows the construction of a waste water treatment system for carrying out the twenty-sixth embodiment of the metal containing waste water treatment method of this invention.

This twenty-sixth embodiment is a method for treating the metal containing waste water from a compound semiconductor plant. More concretely, this embodiment is a gallium waste water treatment method and a method for collecting gallium (gallium hydroxide) and sodium ions that serve as a pH adjuster.

As a gallium waste water in a compound semiconductor plant, there are (1) dicing waste water, (2) dense etching waste water and (3) washing water.

The waste water of a mixture of the aforementioned substances (1), (2) and (3), i.e., a metal containing waste water as an acid gallium waste water is introduced into a first pH adjustment tank 401. Sodium hydroxide is added as a pH adjuster to cause a reaction, forming a hydroxide of gallium hydroxide. This gallium hydroxide is concentrated in a multistage type submerged membrane separation unit 402 that has an adhesional precipitation section and a diaphragm and discharged as a metalhydroxide (gallium hydroxide).

This multistage type submerged membrane separation unit 402 has the same structure as that of a multistage type submerged membrane separation tank 81 shown in FIG. 33 described later in connection with the thirtieth embodiment. The structure of this multistage type submerged membrane separation tank 81, which will be described in detail later in connection with the thirtieth embodiment, has submerged membranes arranged vertically in a plurality of tiers, an adhesional precipitation section that is placed below the submerged membranes and makes the hydroxide of gallium hydroxide obtained through the reaction adhere to the filler and precipitate and a diaphragm for vibrating the submerged membranes.

According to this multistage type submerged membrane separation unit 402, as described later in connection with the thirtieth embodiment (FIG. 33), the treatment capability can be improved by efficiently concentrating a large amount of hydroxide of gallium hydroxide.

The treated water separated by the multistage type submerged membrane separation unit 402 is introduced into a second pH adjustment tank 403. In this second pH adjustment tank 403, sodium hydroxide as a pH adjuster is added to carry out pH adjustment. Next, the treated water that has undergone pH adjustment in this second pH adjustment tank 403 is treated by being introduced into a reverse osmosis membrane separation unit 404.

In this reverse osmosis membrane separation unit 404, the concentrated sodium ions are sent back to the first pH adjustment tank 401 and recycled for the pH adjustment of the gallium waste water as an acid metal containing waste water. Through this process, the sodium ions attributed to the pH adjuster can be recycled, and the amount of use of the pH adjuster can be reduced.

(Twenty-Seventh Embodiment)

Figure 30:
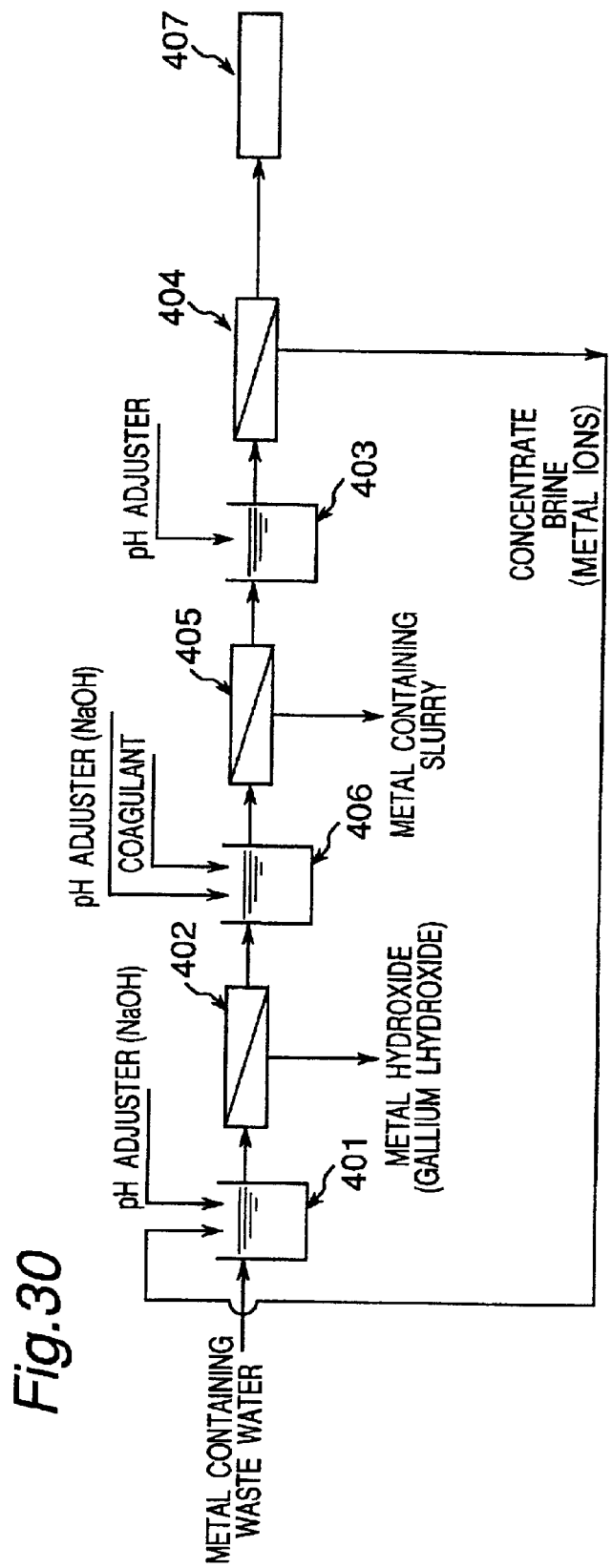
FIG. 30 is a schematic view showing the twenty-seventh embodiment of this invention.

Next, FIG. 30 shows the construction of a waste water treatment system for carrying out the twenty-seventh embodiment of the metal containing waste water treatment method of this invention.

This twenty-seventh embodiment differs from the aforementioned twenty-sixth embodiment only in the following points (1) and (2).

(1) Behind the multistage type submerged membrane separation unit 402 of FIG. 29, a reaction tank 406 to which a pH adjuster and a coagulant are added and a second multistage type submerged membrane separation unit 405 that has an adhesional precipitation section and a diaphragm are arranged. This second multistage type submerged membrane separation unit 405 has the same structure as that of a multistage type submerged membrane separation tank 80 shown in FIG. 35 described later in connection with the thirty-second embodiment. The structure of the multistage type submerged membrane separation tank 80, which will be described in detail later in connection with the thirty-second embodiment, has submerged membranes arranged vertically in a plurality of tiers, an adhesional precipitation section that is placed below the submerged membranes and makes the hydroxide of gallium hydroxide obtained through the reaction adhere to the filler and precipitate and a diaphragm for vibrating the submerged membranes.

(2) Behind the reverse osmosis membrane separation unit 404, an ultrapure water generating system 407 is arranged.

Therefore, the same components as those of the aforementioned twenty-sixth embodiment are denoted by same reference numerals, and no detailed description is provided therefor.

In a compound semiconductor plant, a compound semiconductor represented by gallium arsenide is used, and a gallium arsenide waste water is discharged. This twenty-seventh embodiment of FIG. 30 recycles the water obtained by securely treating the gallium arsenide waste water as a raw water for the ultrapure water generating system 407.

In this twenty-seventh embodiment, first of all, gallium in the metal containing waste water, or the gallium arsenide waste water is separated as gallium hydroxide by the first multistage type submerged membrane separation unit 402. Next, the arsenic containing treated water obtained by the multistage type submerged membrane separation unit 402 that has the adhesional precipitation section and the diaphragm is introduced into the reaction tank 406. In this reaction tank 406, sodium hydroxide as a pH adjuster and ferric chloride as a coagulant are added to cause a reaction.

Next, the treated water from the reaction tank 406 is separated into arsenic and water by the second multistage type submerged membrane separation unit 405 that has the adhesional precipitation section and the diaphragm. This arsenic is separated to a concentrate brine side in the second multistage type submerged membrane separation unit 405 and becomes an arsenic containing slurry as a metal containing slurry.

Moreover, the water obtained by separating arsenic in the second multistage type submerged membrane separation unit 405 is introduced into the second pH adjustment tank 403. In this second pH adjustment tank 403, sodium hydroxide as a pH adjuster is added to carry out pH adjustment and introduced into the reverse osmosis membrane separation unit 404. Then, the water obtained by being introduced into this reverse osmosis membrane separation unit 404 is recycled in the ultrapure water generating system 107.

The sodium ions included in the concentrate brine obtained by the reverse osmosis membrane separation unit 404 are sent back to the first pH adjustment tank 401 and recycled as a pH adjuster. That is, the sodium ions can be recycled as a pH adjuster.

(Twenty-Eighth Embodiment)

Figure 31:
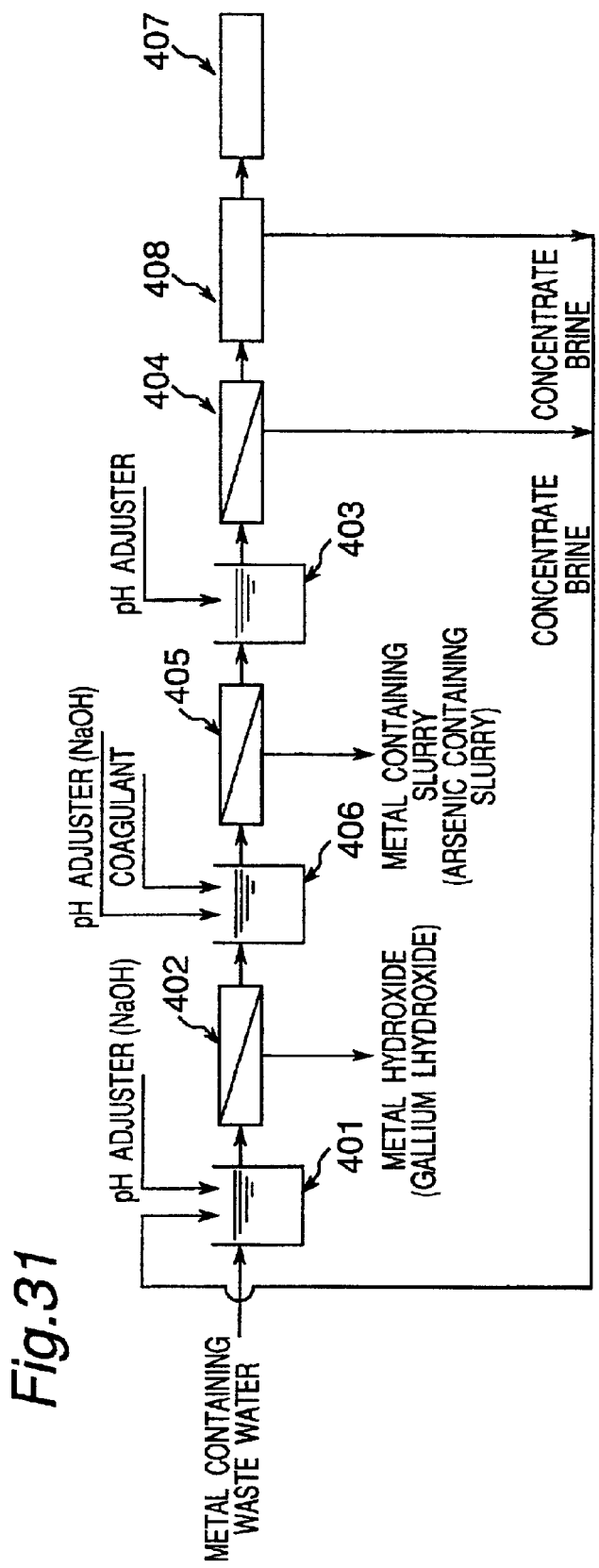
FIG. 31 is a schematic view showing the twenty-eighth embodiment of this invention.

Next, FIG. 31 shows the construction of a waste water treatment system for carrying out the twenty-eighth embodiment of the metal containing waste water treatment method of this invention.

This twenty-eighth embodiment differs from the aforementioned twenty-seventh embodiment only in that an electric deionization unit 408 is arranged behind the reverse osmosis membrane separation unit 404 of FIG. 30. Therefore, in this twenty-eighth embodiment, the same components as those of the treatment system employed in the aforementioned twenty-seventh embodiment are denoted by same reference numerals, and no detailed description is provided therefor.

In this twenty-eighth embodiment, the electric deionization unit 408 is arranged behind the reverse osmosis membrane separation unit 404 and electrically removes ions dissolved in the water by means of an ion exchange membrane and an ion exchange resin.

Accordingly, the ionic load on the ultrapure water generating system 407 is reduced. Therefore, the water quality of the ultrapure water generating system 407 is improved and the running cost of the ultrapure water generating system 407 is concurrently reduced. On the other hand, the concentrate brine in the reverse osmosis membrane separation unit 404 and the electric deionization unit 408 contains sodium ions. Therefore, the concentrate brine is sent back to the first reaction section 401 so as to recycle the sodium ions, and the amount of use of sodium hydroxide as a new pH adjuster is reduced.

(Twenty-Ninth Embodiment)

Figure 32:
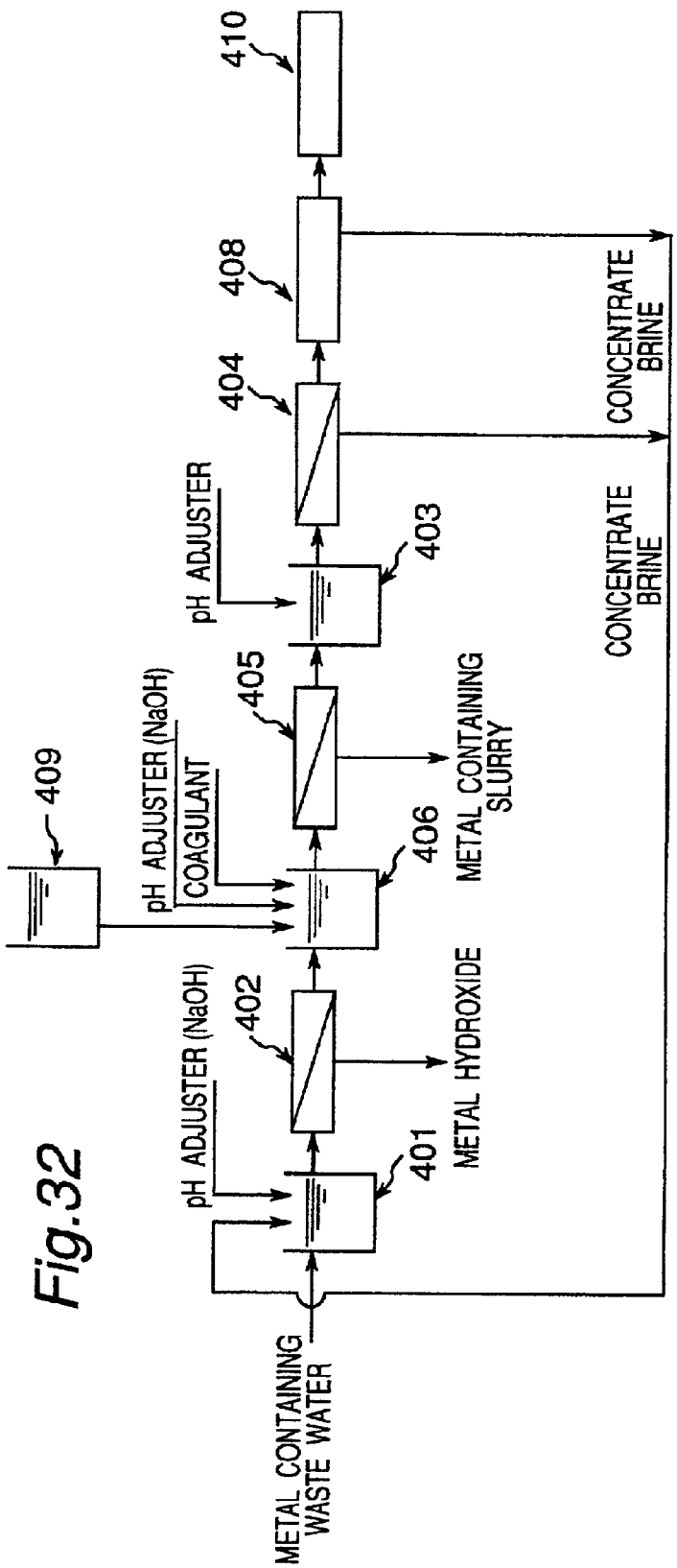
FIG. 32 is a schematic view showing the twenty-ninth embodiment of this invention.

Next, FIG. 32 shows the construction of a waste water treatment system for carrying out the twenty-ninth embodiment of the metal containing waste water treatment method of this invention.

This twenty-ninth embodiment differs from the aforementioned twenty-eighth embodiment in that a metal oxidizing bacterium is loaded into the third reaction tank 406 of FIG. 31 from a metal oxidizing bacterium culturing tank 409 and that the treated water from the electric deionization unit 408 is introduced into an ultrapure water generating system 410. Therefore, in this twenty-ninth embodiment, the same components as those of the aforementioned twenty-eighth embodiment are denoted by same reference numerals, and no detailed description is provided therefor.

In this twenty-ninth embodiment, an arsenic oxidizing bacterium is loaded as a metal oxidizing bacterium from the metal oxidizing bacterium culturing tank 409 to the third reaction section 406. This constitutes an oxidizing process. When the metal containing waste water is the gallium arsenide waste water, the third reaction tank 406 can detoxify and stabilize arsenic by changing trivalent arsenic to pentavalent arsenic.

Although there is also a method for using an oxidizer in the oxidizing process, the running cost can be reduced by loading the metal oxidizing bacterium into the third reaction tank 406.

(Thirtieth Embodiment)

Figure 33:
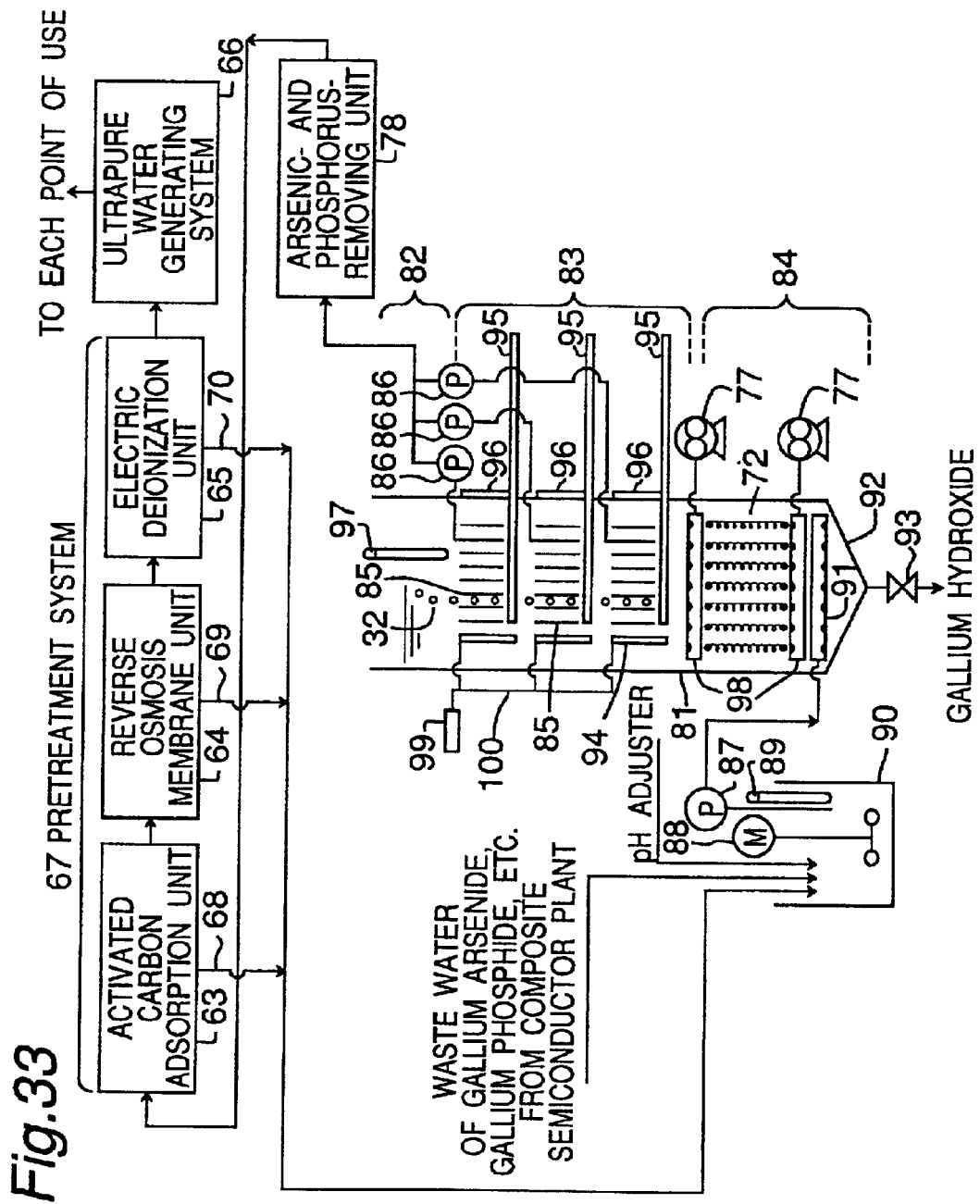
FIG. 33 is a schematic view showing the thirtieth embodiment of this invention.

Next, FIG. 33 shows the construction of a waste water treatment system for carrying out the thirtieth embodiment of the metal containing waste water treatment method of this invention.

In this thirtieth embodiment, the waste water of gallium arsenide, gallium phosphide and the like from compound semiconductor plant are introduced into a pH adjustment tank 90, and a pH adjuster of sodium hydroxide or the like is added. This pH adjustment tank 90 is provided with a stirrer 88, which forms gallium hydroxide by mechanical stirring. The formed gallium hydroxide becomes easily precipitate and is put into a flock that easily adheres to the filler because it is a hydroxide.

The waste water containing gallium hydroxide in this pH adjustment tank 90 is introduced from an inflow pipe 91 into an adhesional precipitation section 84 located below a multistage submerged membrane separation tank 81 by a pH adjustment tank pump 87. In the adhesional precipitation section 84, a filler 72 is arranged in an upper portion, and an air diffusion pipe 98 for periodically clean by air gallium hydroxide as a metalhydroxide that adheres to the filler 72 is placed below the filler. This air diffusion pipe 98 is connected to a blower 77 by an air pipe. For this blower 77, it is proper to select a general Roots blower.

The lowermost portion of this adhesional precipitation section 84 is constructed of a precipitation section 92 for precipitating gallium hydroxide. The gallium hydroxide, which precipitates in this precipitation section 92, can be taken out of a valve 93.

In this thirtieth embodiment, the waste water primarily treated in the adhesional precipitation section 84 is next moved to a submerged membrane section 83 and separated into water and a concentrate brine by a submerged membrane 85. As for the submerged membrane 85, a multistage submerged membrane section 83 in which submerged membranes were arranged vertically in three tiers was employed as shown in FIG. 33 in order to improve the treatment capability.

This submerged membranes 85, which are cleaned by air discharged from the air diffusion pipe 98, come to have a reduced capability with a lapse of time. In the above case, the submerged membranes 85 accommodated in a unit can each be replaced by a new submerged membrane 85 by being horizontally moved and unloaded from a submerged membrane unloading opening 96.

The reason why the submerged membranes 85 are arranged in a plurality of tiers is that, when the multistage submerged membrane separation tank 81 is required to be placed inside of a plant, the required area of the tank in the building of the plant is minimized by improving the treatment capability per area.

Moreover, diaphragms 94 are arranged vertically in three tiers in the submerged membrane section 83, and the diaphragms 94 are vibrated by signals inputted from a variable frequency oscillator 99 via a signal line 100. This vibration vibrates the submerged membranes 85 by way of the waste water, thereby improving the treatment capability of the submerged membranes 85.

The variable frequency oscillator 99 vibrates the diaphragms 94 by inputting a signal of a predetermined frequency to a drive section (not shown) of the diaphragms 94 connected by way of the signal line 100. The variable frequency oscillator 99 can control the amplitude of vibration of the diaphragms 101 by varying the output signal, thereby enabling the treatment capability of the submerged membrane 85 to be varied.

Moreover, all of the submerged membranes 5 provided vertically in three tiers can be efficiently cleaned by air, i.e., by bubbles discharged from the air diffusion pipe 98 placed in the submerged membrane section 83.

The bubbles discharged from the air diffusion pipe 98 placed below the submerged membranes 85 consistently clean the membrane surface of the submerged membranes 85. Therefore, the membranes are not blocked up by minute solid matter. For the submerged membranes 85, it is proper to select the submerged membranes produced by Kubota Corp., Yuasa Corp., Kurita Water Industries Ltd., Mitsubishi Rayon Co., Ltd. and so on.

Then, it is proper to measure the pH in the multistage submerged membrane separation tank 81 by a pH meter 97 placed in an upper portion 82 and control the amount of the pH adjuster added to the pH adjustment tank 90. The operating conditions of this pH adjustment tank 90 are controlled (control line is not shown) by a pH meter 89, and it is preferable to control the conditions within a range of pH 4 to pH 5 in the tank. However, this is not the absolute way.

The submerged membranes 85 placed in the submerged membrane section 83 are connected to a treated water pump 86 by way of pipes and tubes, and water separated by the membranes can be obtained from this treated water pump 86. By operating this treated water pump 86, water and a concentrate are separated from each other by the submerged membranes 85. The water is introduced into an arsenic- and phosphorus-removing unit 78 of the next process by a treated water pump 86 through pipes and tubes, and arsenic and phosphorus are removed.

The water obtained by removing arsenic and phosphorus from the treated water in this arsenic- and phosphorus-removing unit 78 is recycled by being introduced into the ultrapure water generating system 66 sequentially via the activated carbon absorption unit 63, the reverse osmosis membrane separation unit 64 and the electric deionization unit 65 that constitute the pretreatment system 67.

On the other hand, the back washing water from the activated carbon absorption unit 63 contains a suspended matter. In order to recycle the water, the back washing water is recycled by being sent back and introduced into the pH adjustment tank 90 by way of the pipe 68.

The concentrate brine from the reverse osmosis membrane separation unit 64 and the electric deionization unit 65 contains sodium ions due to sodium hydroxide as a pH adjuster added to the pH adjustment tank 90. Therefore, the concentrate brine is introduced from the pipes 69 and 70 into the pH adjustment tank 90 for the recycling of water and sodium ions.

FIG. 42A shows a timing chart, which represents the residence times in the submerged membrane separation tank 81 and the second submerged membrane separation tank 124 when the concentrations of gallium and arsenic in the waste water are normal concentrations in this thirtieth embodiment. FIG. 42B shows a timing chart, which represents the residence times in the submerged membrane separation tank 81 and the second submerged membrane separation tank 124 when the concentrations of gallium and arsenic in the waste water are low concentrations in this thirtieth embodiment. As apparent with reference to FIGS. 42A and 42B by comparison, the residence times in the submerged membrane separation tanks 81 and 124 were reduced to a half in the case of low concentration.

(Thirty-First Embodiment)

Figure 34:
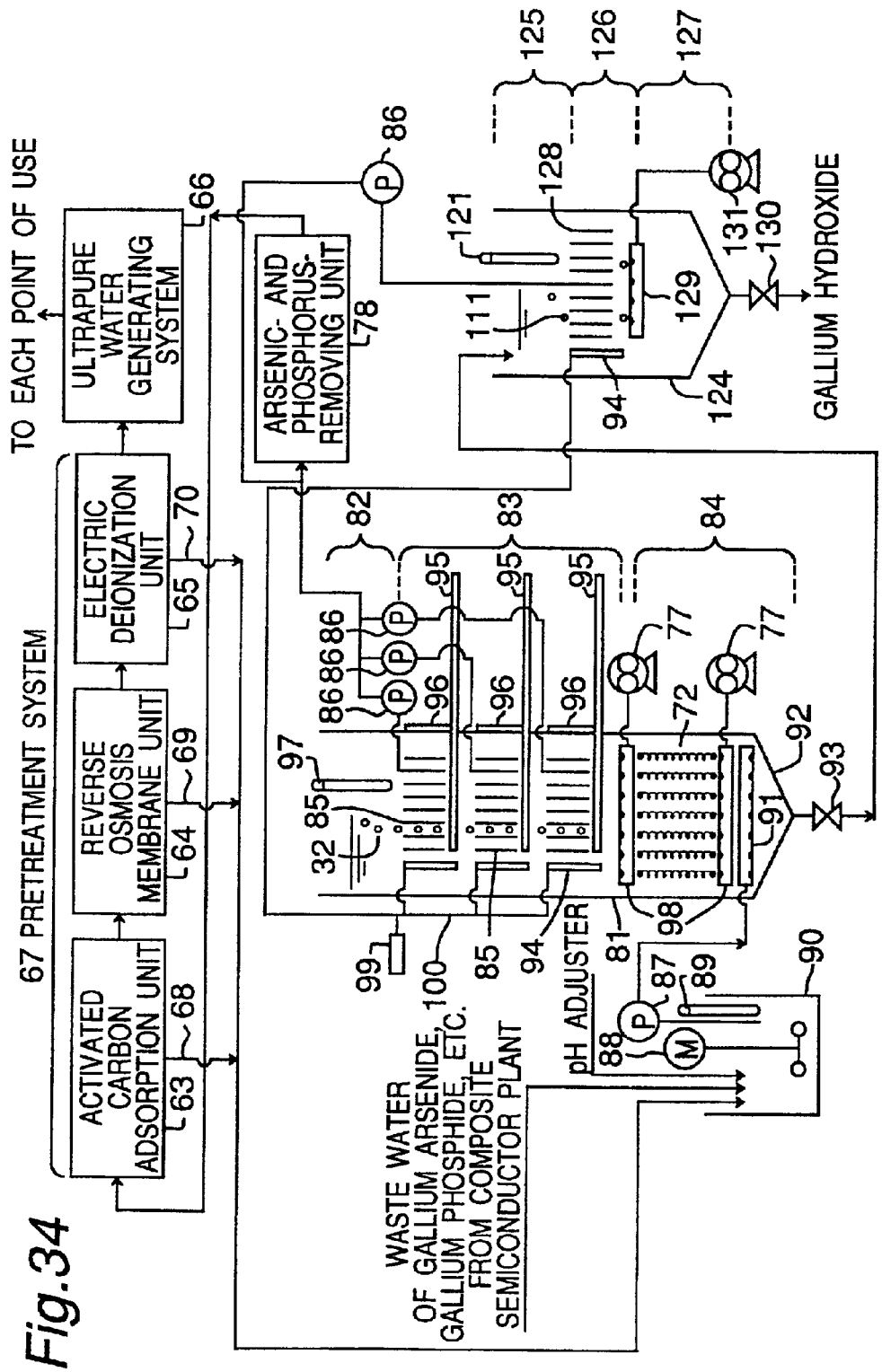
FIG. 34 is a schematic view showing the thirty-first embodiment of this invention.

Next, FIG. 34 shows the construction of a waste water treatment system for carrying out the thirty-first embodiment of the metal containing waste water treatment method of this invention.

This thirty-first embodiment differs from the aforementioned thirteenth embodiment only in that it has a system in which a second submerged membrane separation tank 124 is arranged below the multistage submerged membrane separation tank 81 of FIG. 33. Therefore, in this thirty-first embodiment, the same components as those of the aforementioned thirtieth embodiment are denoted by same reference numerals, and no detailed description is provided therefor.

In this thirty-first embodiment, the system in which the second submerged membrane separation tank 124 is arranged below the multistage submerged membrane separation tank 81 is employed. This second submerged membrane separation tank 124 is constructed of a second upper portion 125, a second submerged membrane section 126 and a second precipitation section 127, which are arranged in order from top to bottom.

This second submerged membrane separation tank 124 is able to further physically concentrate gallium hydroxide as a concentrate brine concentrated and precipitated in the multistage submerged membrane separation tank 81.

This second submerged membrane separation tank 124 has a second upper portion 125 where a pH meter 121 is placed, and this second upper portion 125 plays the role of adjusting the pH inside the second submerged membrane separation tank 124. A second submerged membrane 128 is placed in the second submerged membrane section 126 inside the second submerged membrane separation tank 124 and stirs gallium hydroxide by aeration to effectively carry out the concentration and separation of water and the concentrate brine. This aeration is carried out by discharging air generated by a blower 131 from an air diffusion pipe 129.

Moreover, a second precipitation section 127 is a precipitation section for merely precipitating and concentrating gallium hydroxide. The gallium hydroxide precipitated in this second precipitation section 127 can be taken out of a valve 130.

The water separated inside the second submerged membrane separation tank 124 is made to join the water separated in the submerged membrane section 3 by a treated water pump 86 and treated by being introduced into the arsenic- and phosphorus-removing unit 78.

(Thirty-Second Embodiment)

Figure 35:
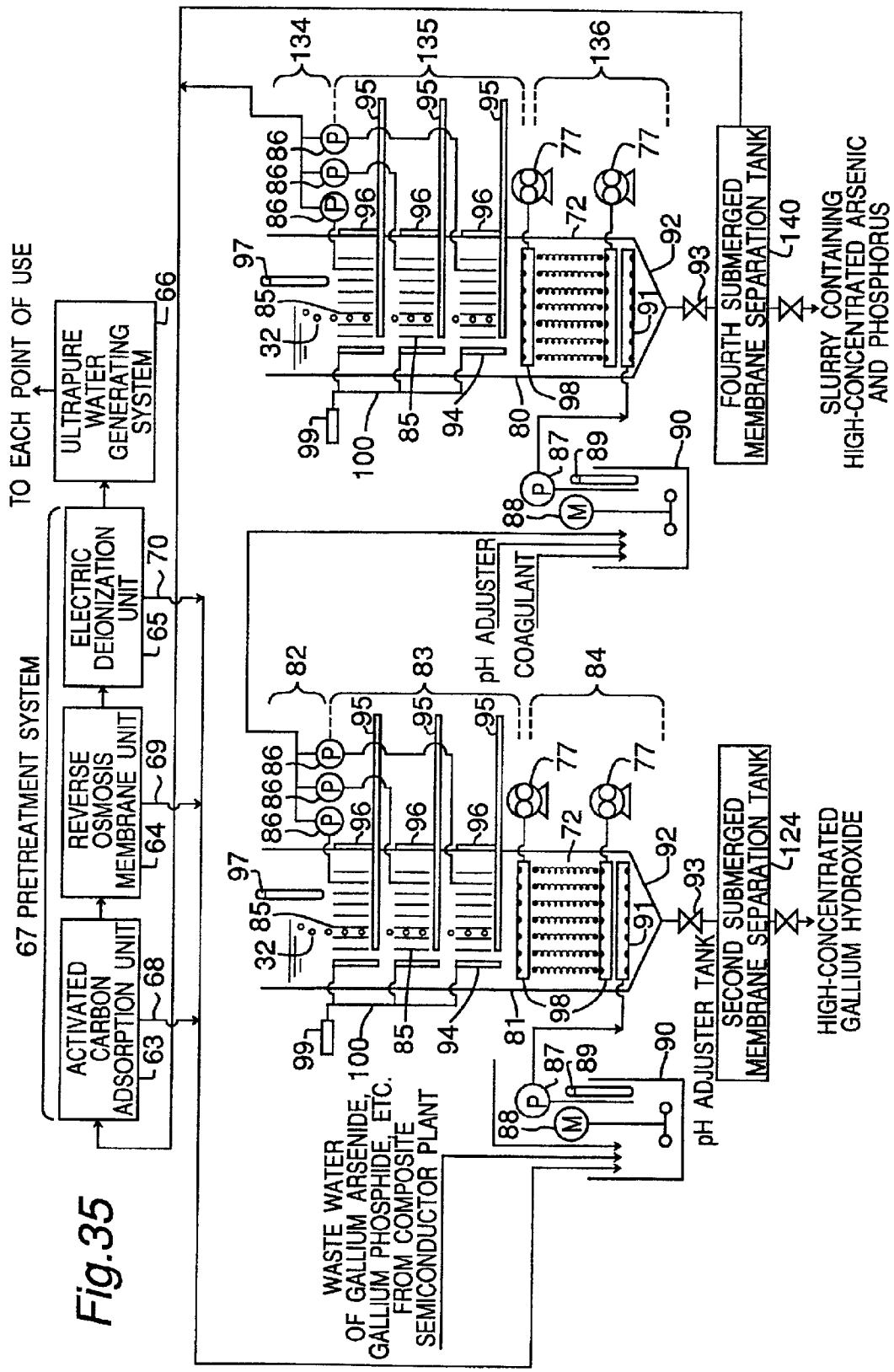
FIG. 35 is a schematic view showing the thirty-second embodiment of this invention.

Next, FIG. 35 shows the construction of a waste water treatment system for carrying out the thirty-second embodiment of the metal containing waste water treatment method of this invention.

In this thirty-second embodiment, differing from the multistage submerged membrane separation tank 81 and the second submerged membrane separation tank 124 of the aforementioned thirty-first embodiment, the separated water from the submerged membranes 85 and the second submerged membrane separation tank 124 (not shown in detail) is introduced into the second pH adjustment tank 90 to which a pH adjuster and a coagulant are added and thereafter introduced into the third submerged membrane separation tank 80 and a fourth submerged membrane separation tank 140. This thirty-second embodiment differs from the aforementioned thirty-first embodiment only in this point. Therefore, in this thirty-second embodiment, the same components as those of the aforementioned thirty-first embodiment are denoted by same reference numerals, and no detailed description is provided therefor.

According to this thirty-second embodiment, a stirrer 88, a pH meter 89 and a pH adjustment tank pump 87 are placed in the second pH adjustment tank 90. While adjusting the pH of the separated water that contains arsenic and phosphorus, a flock of iron hydroxide is formed by adding ferric chloride as a coagulant.

Then, the arsenic and phosphorus are introduced into a third adhesional precipitation section 136 of the third multistage submerged membrane separation tank 80 together with the flock of iron hydroxide by a pH adjustment tank pump 87. Then, the arsenic and phosphorus precipitate together (coprecipitate) when the flock of iron hydroxide precipitates and are introduced as a precipitate into the fourth submerged membrane separation tank 140.

On the other hand, the flock of iron hydroxide containing arsenic and phosphorus that are not precipitated is treated in the third multistage submerged membrane separation tank 80 similarly to the gallium hydroxide in the first multistage submerged membrane separation tank 81.

That is, according to this thirty-second embodiment, arsenic and phosphorus are made to react with the pH adjuster and the coagulant of ferric chloride or the like in the pH adjustment tank 90 so as to be put into a flock state and introduced into the third multistage submerged membrane separation tank 80 so as to be separated into water and a concentrate brine by the submerged membranes 85. The water, separated by the submerged membranes 85 of the third multistage submerged membrane separation tank 80, is introduced into the activated carbon absorption unit 63 by the treated water pump 86 and recycled as a raw water for the ultrapure water generating system 16 similarly to the thirty-first embodiment.

On the other hand, the flock of iron hydroxide, which contains arsenic and phosphorus and has been introduced as a precipitate into the fourth submerged membrane separation tank 140, is further concentrated to become a slurry that contains high-concentration arsenic and phosphorus. The structure of this fourth submerged membrane separation tank 140 is similar to that of the second submerged membrane separation tank 124, although not shown in detail.

Then, the water separated in this fourth submerged membrane separation tank 140 is introduced into the activated carbon absorption unit 63 and recycled as a raw water for the ultrapure water generating system 16 similarly to the thirty-first embodiment.

According to this thirty-second embodiment, the waste water treatment capability can be improved by the first through fourth submerged membrane separation tanks 81, 124, 80 and 140. At the same time, two kinds of metals (gallium and arsenic) are separated by the first and third multistage submerged membrane separation tanks 81 and 80. Thereafter, the two kinds of metals (gallium and arsenic)

can also be concentrated in the two-stage submerged membrane separation tanks (second submerged membrane separation tank 124 and fourth submerged membrane separation tank 140), respectively. Thus, according to this embodiment, the two kinds of metals can be concentrated while saving energy as far as possible.

(Thirty-Third Embodiment)

Figure 36:
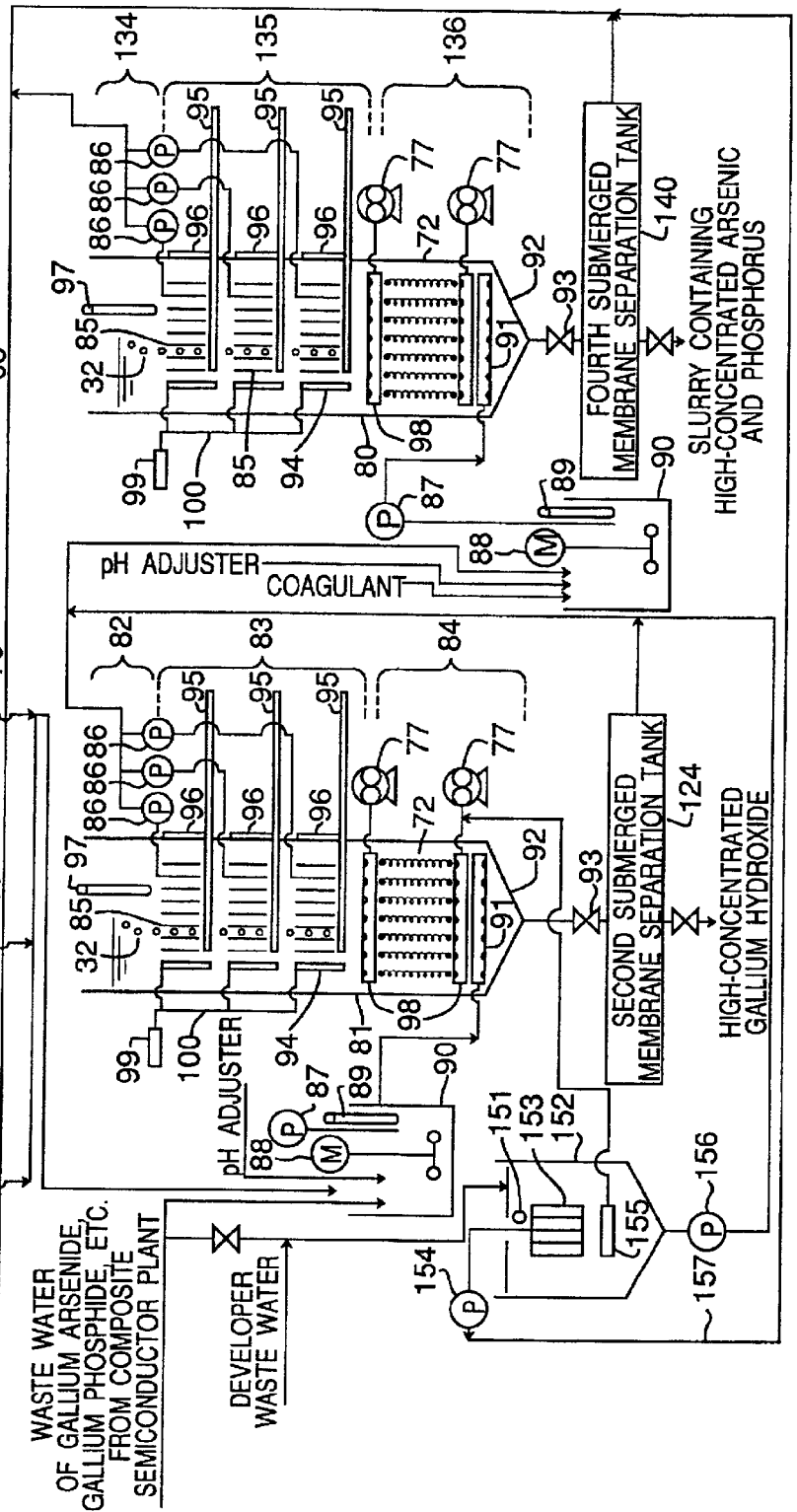
FIG. 36 is a schematic view showing the thirty-third embodiment of this invention.

Next, FIG. 36 shows the construction of a waste water treatment system for carrying out the thirty-third embodiment of the metal containing waste water treatment method of this invention.

This thirty-third embodiment differs from the system construction of the aforementioned thirty-second embodiment only in that a fifth submerged membrane separation tank 152 is provided in addition to the construction of FIG. 35. Therefore, in this thirty-third embodiment, the same components as those of the aforementioned thirty-second embodiment are denoted by same reference numerals, and no detailed description is provided therefor.

In this thirty-third embodiment, the fifth submerged membrane separation tank 152 in which the fifth submerged membrane 153 is placed is added to the waste water treatment system of the thirty-second embodiment.

The developer waste water and part of the waste water of gallium arsenide and so on from compound semiconductor plant are introduced into this fifth submerged membrane separation tank 152. Moreover, the fifth submerged membrane separation tank 152 is aerated by air discharged from an air diffusion pipe 155. Therefore, microorganism propagates with a lapse of time using the organic matter in the developer waste water as a nutrient.

Then, part of the waste water of gallium arsenide and so on from compound semiconductor plant is introduced into this fifth submerged membrane separation tank 152. Therefore, the arsenic oxidizing bacterium is generated on the basis of the arsenic in the waste water.

When starting up the waste water treatment equipment employed in this thirty-third embodiment in a short time, it is also possible to preparatorily culture and breed the arsenic oxidizing bacterium in another place and then load the same into the fifth submerged membrane separation tank 152, allowing the bacterium to propagate in an early stage.

Then, by introducing the arsenic oxidizing bacterium bred in the fifth submerged membrane separation tank 152 into the third multistage submerged membrane separation tank 80 via the pH adjustment tank 90 to mix the water with the separated water from the submerged membranes 85 of the multistage submerged membrane separation tank 81, trivalent arsenic can be stabilized by being oxidized into pentavalent arsenic by the arsenic oxidizing bacterium. The arsenic, which has been oxidized into pentavalent arsenic and stabilized, is subsequently treated similarly to the aforementioned thirty-second embodiment.

According to this thirty-third embodiment, the arsenic oxidizing bacterium, which has been cultured and condensed, is introduced into the third submerged membrane separation tank 80. Therefore, trivalent arsenic can be concentrated and separated as stable pentavalent arsenic by the arsenic oxidizing bacterium in this third multistage submerged membrane separation tank 80. Moreover, since no oxidizer is used as a chemical, the running cost can be reduced.

The arsenic oxidizing bacterium propagates in the fifth submerged membrane separation tank 152 using, for example, the organic matter in the developer waste water discharged from the compound semiconductor fabricating process and is bred on the basis of the arsenic contained in the waste water. Therefore, the running cost can be reduced without using the costing nutrient for the culturing.

(Thirty-Fourth Embodiment)

Figure 37:
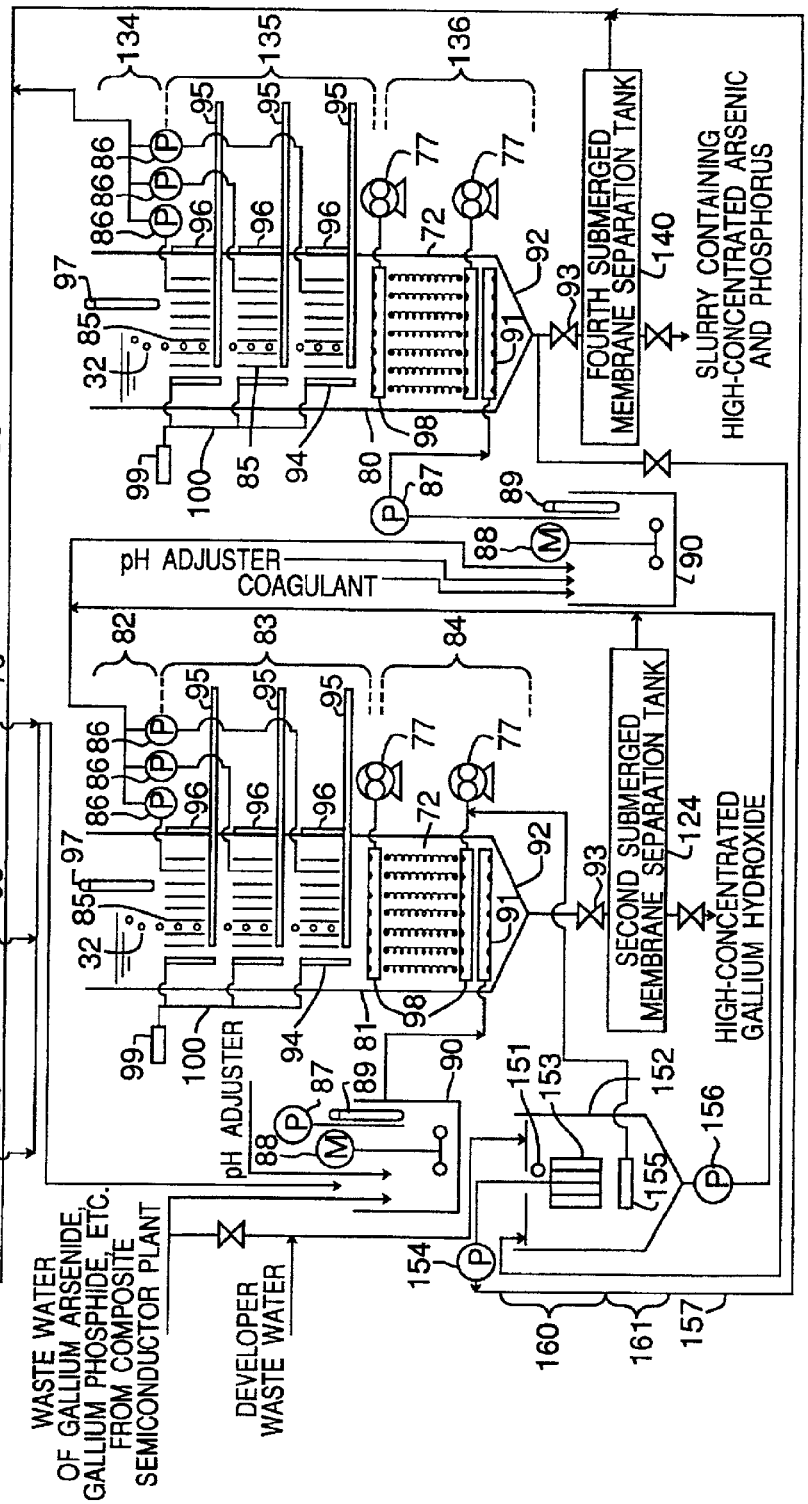
FIG. 37 is a schematic view showing the thirty-fourth embodiment of this invention.

Next, FIG. 37 shows the construction of a waste water treatment system for carrying out the thirty-fourth embodiment of the metal containing waste water treatment method of this invention.

This thirty-fourth embodiment differs from the aforementioned thirty-third embodiment only in that a system in which part of the precipitated concentrate brine in the third precipitation section 136 of FIG. 36 is sent back to the fifth submerged membrane separation tank 152 is employed. Therefore, in this thirty-fourth embodiment, the same components as those of the aforementioned thirty-third embodiment are denoted by same reference numerals, and no detailed description is provided therefor.

In this thirty-fourth embodiment, the arsenic oxidizing bacterium is recycled by sending part of the precipitated concentrate brine in the third precipitation section 136 back to the fifth submerged membrane separation tank 152. Through this process, the arsenic oxidizing bacterium is effectively utilized. Consequently, the arsenic oxidizing bacterium can be maintained at a constant concentration within the system of this thirty-fourth embodiment.

(Thirty-Fifth Embodiment)

Figure 38:
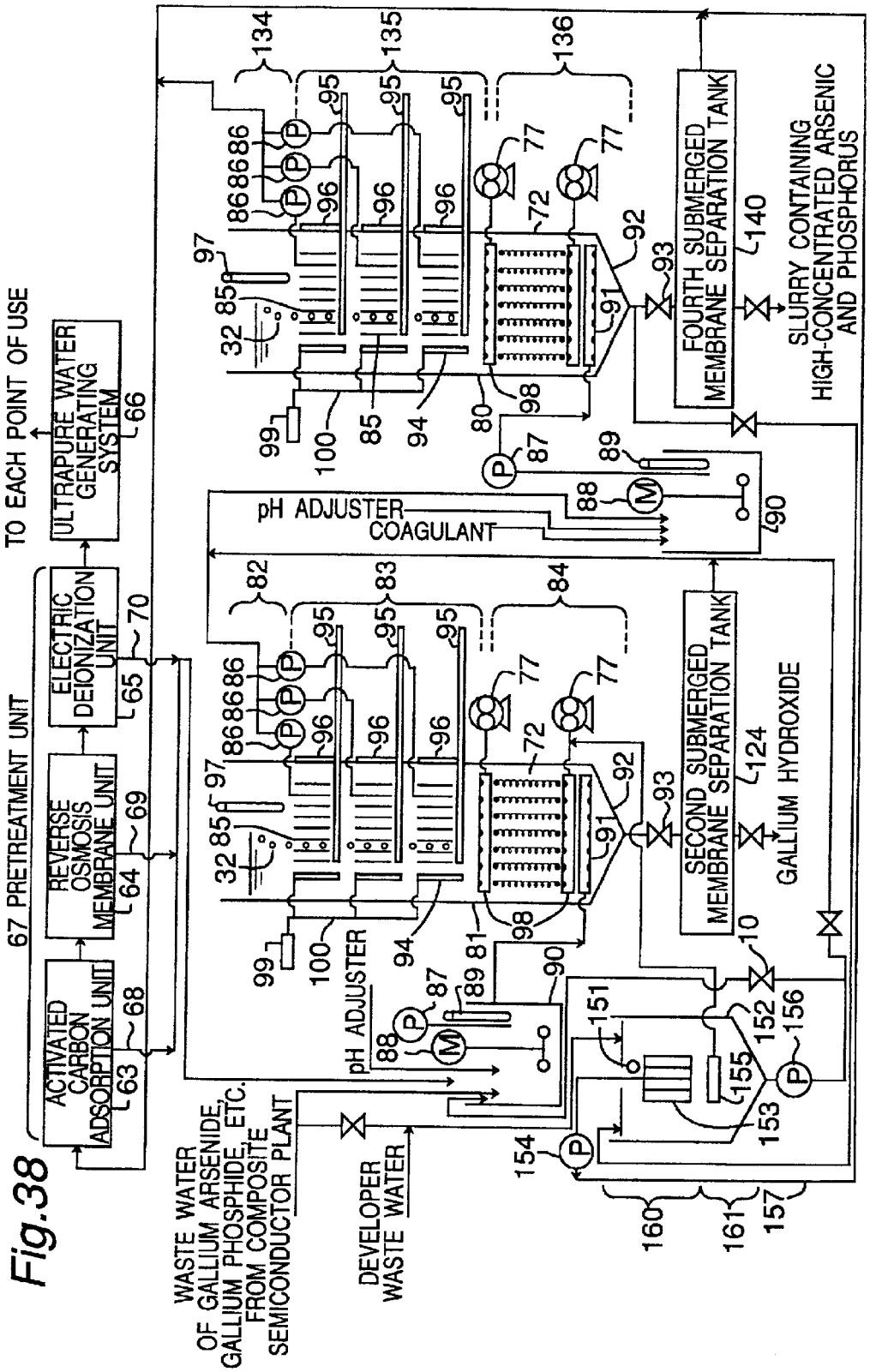
FIG. 38 is a schematic view showing the thirty-fifth embodiment of this invention.

Next, FIG. 38 shows the construction of a waste water treatment system for carrying out the thirty-fifth embodiment of the metal containing waste water treatment method of this invention.

This thirty-fifth embodiment differs from the aforementioned thirty-fourth embodiment only in that the liquid precipitated and concentrated in the fifth precipitation section 161 of the fifth submerged membrane separation tank 152 of FIG. 37 is sent back to the first multistage submerged membrane separation tank 81. Therefore, in this thirty-fifth embodiment, the same components as those of the aforementioned thirty-fourth embodiment are denoted by same reference numerals, and no detailed description is provided therefor.

In this thirty-fifth embodiment, the organic matter in the waste water from compound semiconductor plant is treated by sending the liquid precipitated and concentrated in the fifth precipitation section 161 of the fifth submerged membrane separation tank 152 back to the first multistage submerged membrane separation tank 81 via the first pH regulation tank 90 and using the arsenic oxidizing bacterium in the liquid. The arsenic oxidizing bacterium, of course, oxidizes arsenic and also resolves and treats the organic matter in the waste water because it is a microorganism.

According to this thirty-fifth embodiment, the arsenic oxidizing bacterium is introduced into the first submerged membrane separation tank 81 and the third submerged membrane separation tank 80. It is enabled to not only change trivalent arsenic into stable pentavalent arsenic by utilizing the organic matter resolving power possessed by the arsenic oxidizing bacterium but also further reduce the organic load on the water quality of the ultrapure water generating system by also resolving the organic matter in the waste water.

(Thirty-Sixth Embodiment)

Figure 39:
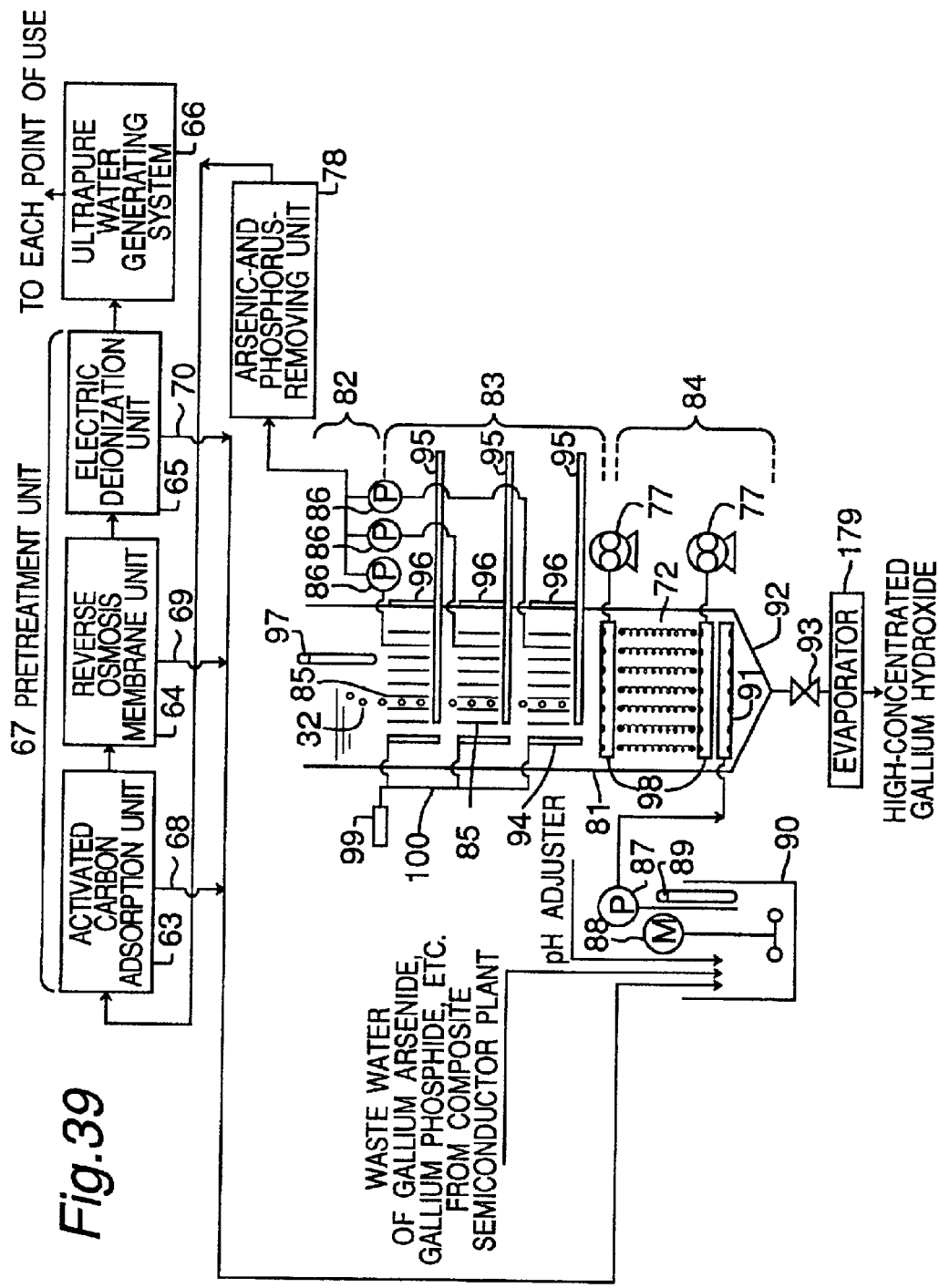
FIG. 39 is a schematic view showing the thirty-sixth embodiment of this invention.

Next, FIG. 39 shows the construction of a waste water treatment system for carrying out the thirty-sixth embodiment of the metal containing waste water treatment method of this invention.

This thirty-sixth embodiment differs from the thirtieth embodiment only in that a system in which an evaporator 179 is arranged below the multistage submerged membrane separation tank 81 in FIG. 33 is employed. Therefore, in this thirty-sixth embodiment, the same components as those of the aforementioned thirtieth embodiment are denoted by same reference numerals, and no detailed description is provided therefor.

In this thirty-sixth embodiment, the precipitated concentrate brine obtained from the submerged membrane separation tank 81 of the thirtieth embodiment, i.e., gallium hydroxide can be concentrated to the desired concentration by the evaporator 179 in a short time.

(Thirty-Seventh Embodiment)

Figure 40:
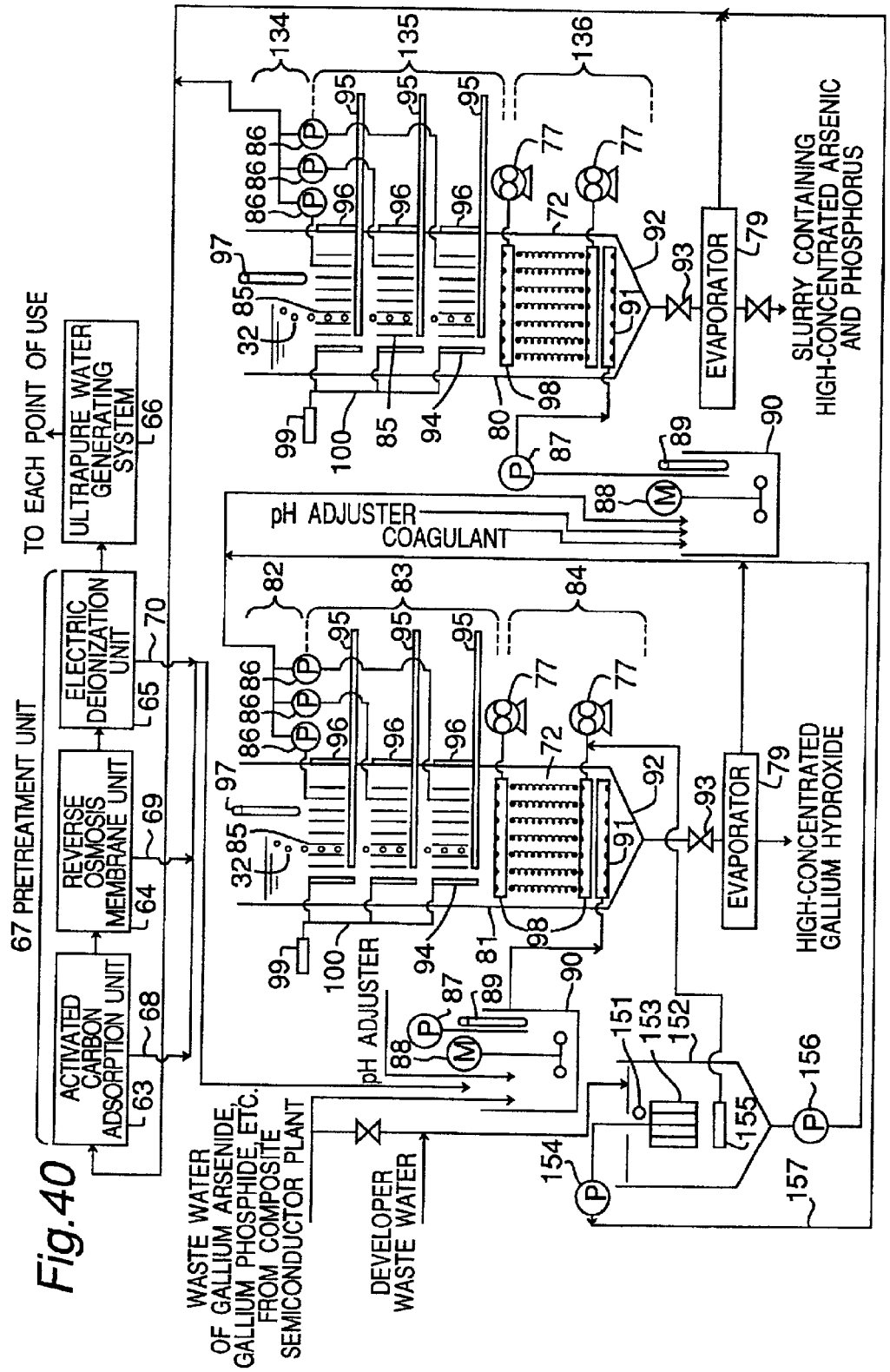
FIG. 40 is a schematic view showing the thirty-seventh embodiment of this invention.

Next, FIG. 40 shows the construction of a waste water treatment system for carrying out the thirty-seventh embodiment of the metal containing waste water treatment method of this invention.

This thirty-seventh embodiment differs from the aforementioned thirty-third embodiment only in that a waste water treatment system in which an evaporator 79 is arranged as alternative equipment of the second submerged membrane separation tank 124 and the fourth submerged membrane separation tank 140 of FIG. 36 (thirty-third embodiment) is employed. Therefore, in this thirty-seventh embodiment, the same components as those of the system of the aforementioned thirty-third embodiment are denoted by same reference numerals, and no detailed description is provided therefor.

In this thirty-seventh embodiment, the precipitated concentrate brine obtained from the first submerged membrane separation tank 81 and the third submerged membrane separation tank 80, i.e., the slurry that contains gallium hydroxide, phosphorus and arsenic can be concentrated to the desired concentration by the evaporators 79 and 79 in a short time.

(Thirty-Eighth Embodiment)

Figure 41:
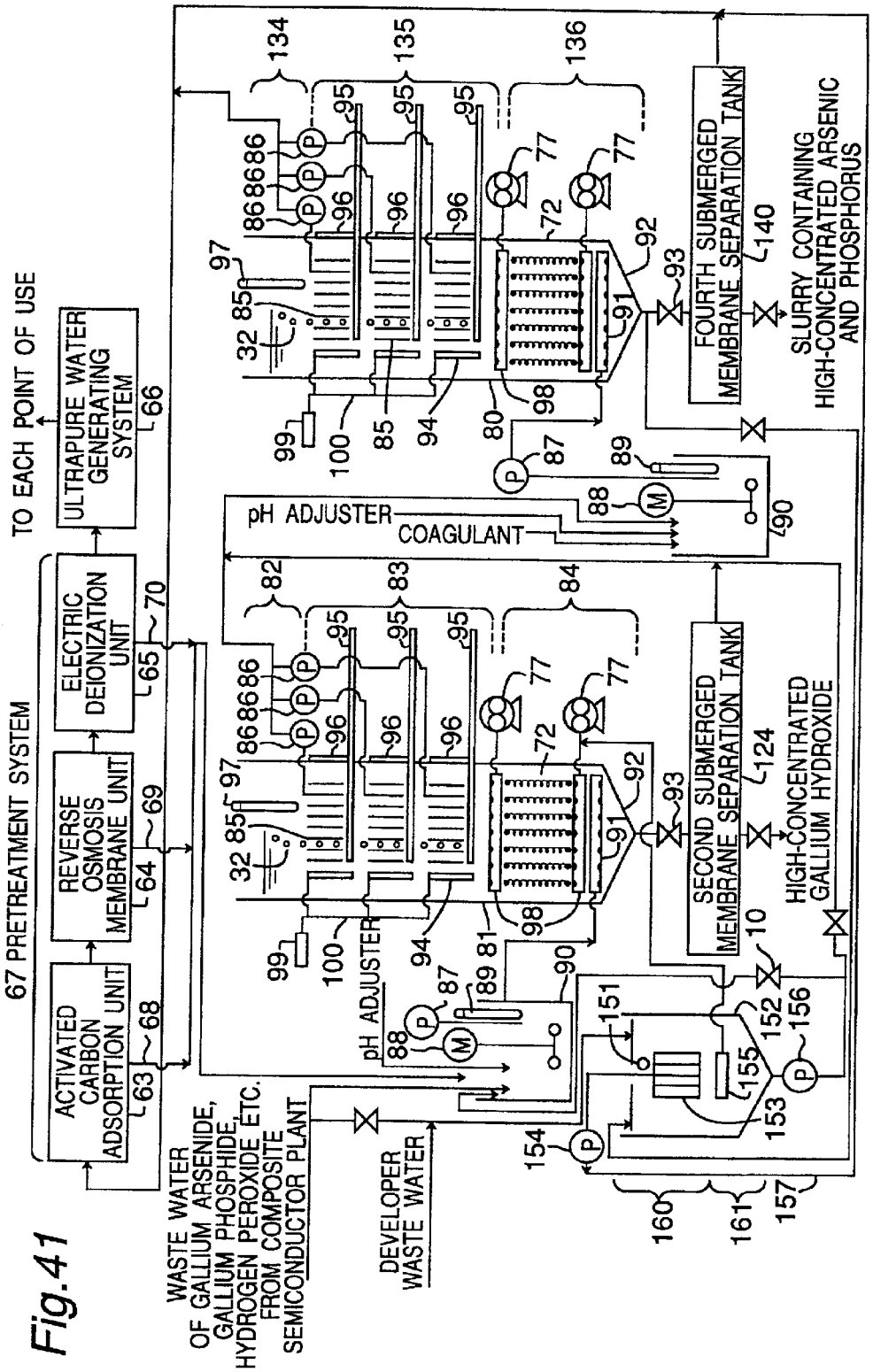
FIG. 41 is a schematic view showing the thirty-eighth embodiment of this invention.

Next, FIG. 41 shows the construction of the thirty-eighth embodiment of the metal containing waste water treatment method of this invention.

In the thirty-fifth embodiment described with reference to FIG. 38, the influent water is the waste water from compound semiconductor plant that contains gallium arsenide, gallium phosphide and so on. In contrast to this, the thirty-eighth embodiment differs from the thirty-fifth embodiment only in that the influent water is the waste water from compound semiconductor plant that contains hydrogen peroxide (hydro-peroxide) containing gallium arsenide, gallium phosphide and so on. Therefore, in this thirty-eighth embodiment, the same components as those of the system of the thirty-fifth embodiment are denoted by same reference numerals, and no detailed description is provided therefor.

In this thirty-eighth embodiment, the influent water is the waste water from compound semiconductor plant that contains hydrogen peroxide (hydro-peroxide) containing gallium arsenide, gallium phosphide and so on. Therefore, hydrogen peroxide (hydro-peroxide) is included in the waste water.

In this thirty-eighth embodiment, the arsenic oxidizing bacterium is introduced into the first submerged membrane separation tank 81 and the second submerged membrane separation tank 124. Therefore, the microorganism concentration increases with a lapse of time, and the anaerobic microorganism also propagates in part. Then, due to the reducibility possessed by this anaerobic microorganism, the hydrogen peroxide (hydro-peroxide) as an oxidizer is resolved.

When the hydrogen peroxide in the waste water is thus resolved, it is easy to recycle the waste water as a raw water for the ultrapure water generating system 66. The water quality, which allows the waste water to be easily recycled as a raw water for the ultrapure water generating system 16, means that all the water quality items of ions, organic matter, minute particles and so on other than hydrogen peroxide ions are treated.

(Fifth Experimental Example)

Next, as a concrete experimental example, an experimental example with an experimental apparatus of the same structure as that of the thirtieth embodiment shown in FIG. 33 will be described.

In this fifth experimental example, the capacity of the multistage submerged membrane separation tank 81 was set to 160 liters. Then, the experiment was carried out by using ten A4-size submerged membranes of Kubota Corp.

At this time, the concentration of gallium in the influent waste water from compound semiconductor plant considerably changed within a range of about 100 ppm to 2000 ppm. However, by treatment in the multistage submerged membrane separation tank 81, gallium was able to be obtained at a concentration of 50000 ppm in the form of a slurry.

Then, the separated water obtained from the submerged membranes 85 was treated by being introduced into the arsenic- and phosphorus-removing unit 78 and a series of pretreatment systems 67 and recycled as a raw water for the ultrapure water generating system.

(Sixth Experimental Example)

Next, as a concrete experimental example, an experimental example with an experimental apparatus of the same structure as that of the thirty-first embodiment shown in FIG. 34 will be described.

In this sixth experimental example, the capacities of the multistage submerged membrane separation tank 81 and the second submerged membrane separation tank 124 were each set to 160 liters.

Then, experiments were carried out by using a total of twenty A4-size submerged membranes of Kubota Corp., or ten submerged membranes for each of the submerged membrane separation tanks.

At this time, the concentration of the influent gallium considerably changed within a range of about 100 ppm to about 2000 ppm. However, by treatment in the first submerged membrane separation tank 81 and the second submerged membrane separation tank 124, a slurry containing gallium at a concentration of about 80000 ppm was able to be obtained.

(Thirty-Ninth Embodiment)

Figure 43:
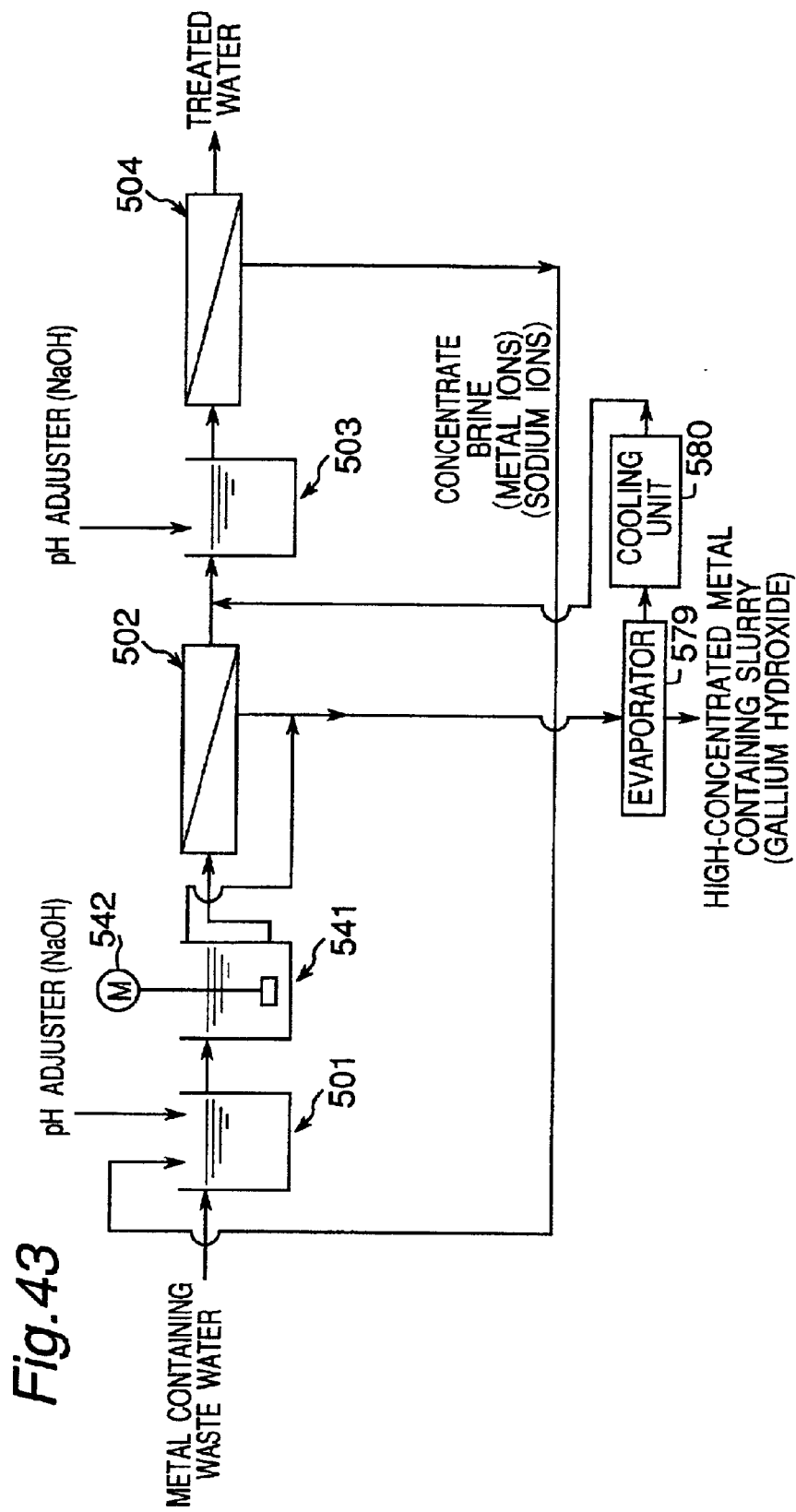
FIG. 43 is a schematic view showing the thirty-ninth embodiment of this invention.

FIG. 43 shows the construction of a waste water treatment system for carrying out the thirty-ninth embodiment of the metal containing waste water treatment method of this invention.

This thirty-ninth embodiment is a treatment method of a metal containing waste water (gallium waste water, in more concrete) from a compound semiconductor plant and is a waste water treatment method capable of collecting gallium (gallium hydroxide) and sodium ions as a pH adjuster.

As a gallium waste water in a compound semiconductor plant, there are (1) dicing waste water, (2) dense etching waste water and (3) washing water.

The waste water of a mixture of the aforementioned substances (1), (2) and (3), i.e., a metal containing waste water as an acid gallium waste water is introduced into a first pH adjustment tank 501. Sodium hydroxide is added as a pH adjuster to cause a reaction, forming a gallium hydroxide flock of gallium hydroxide.

Then, the waste water, which contains the gallium hydroxide flock, is introduced from the first pH adjustment tank 501 into a foam separation tank 541, and the gallium hydroxide flock surfaces with minute bubbles stuck to the flock. These minute bubbles are generated from a foam separation unit 542 placed inside the foam separation tank 541.

Then, the gallium hydroxide flock, which has surfaced in this foam separation tank 541, is introduced into an evaporator 579 and concentrated.

Figure 57:
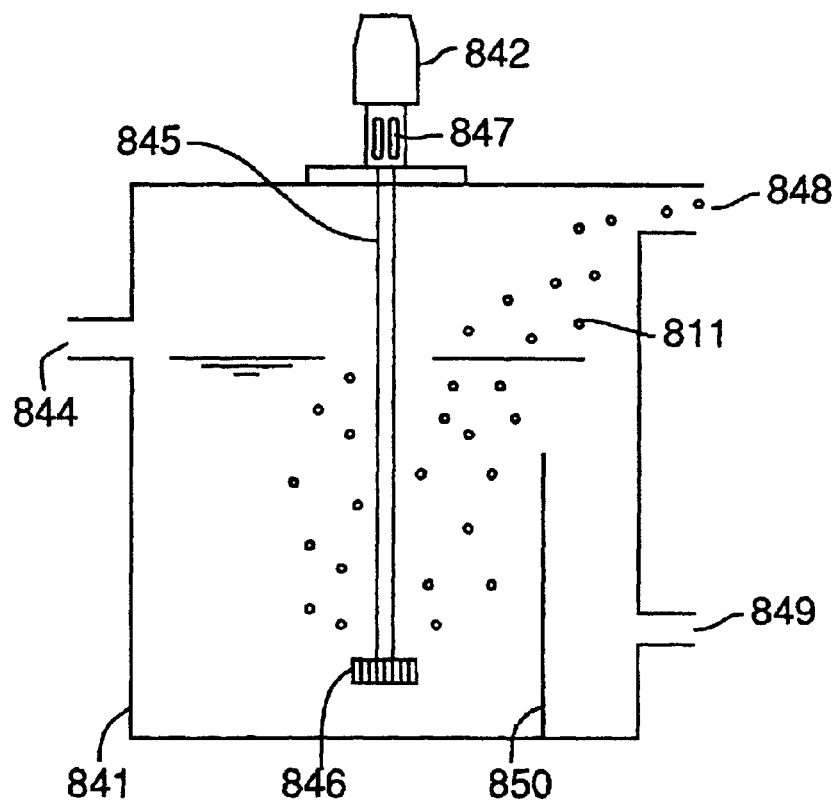
FIG. 57 is a schematic view of the foam separation tank of this invention.
Figure 58:
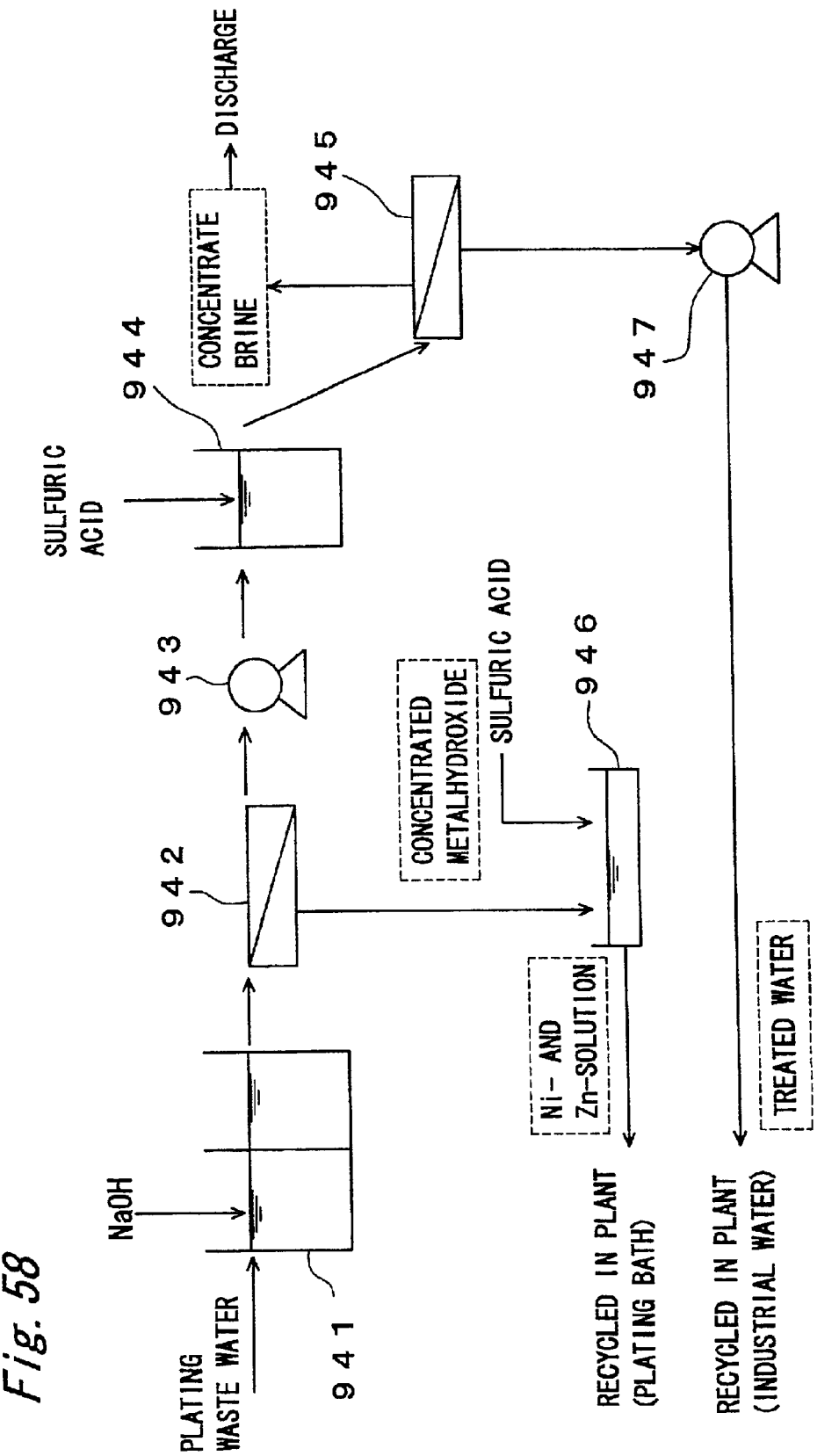
FIG. 58 is a schematic view showing the first prior art.
Figure 59:
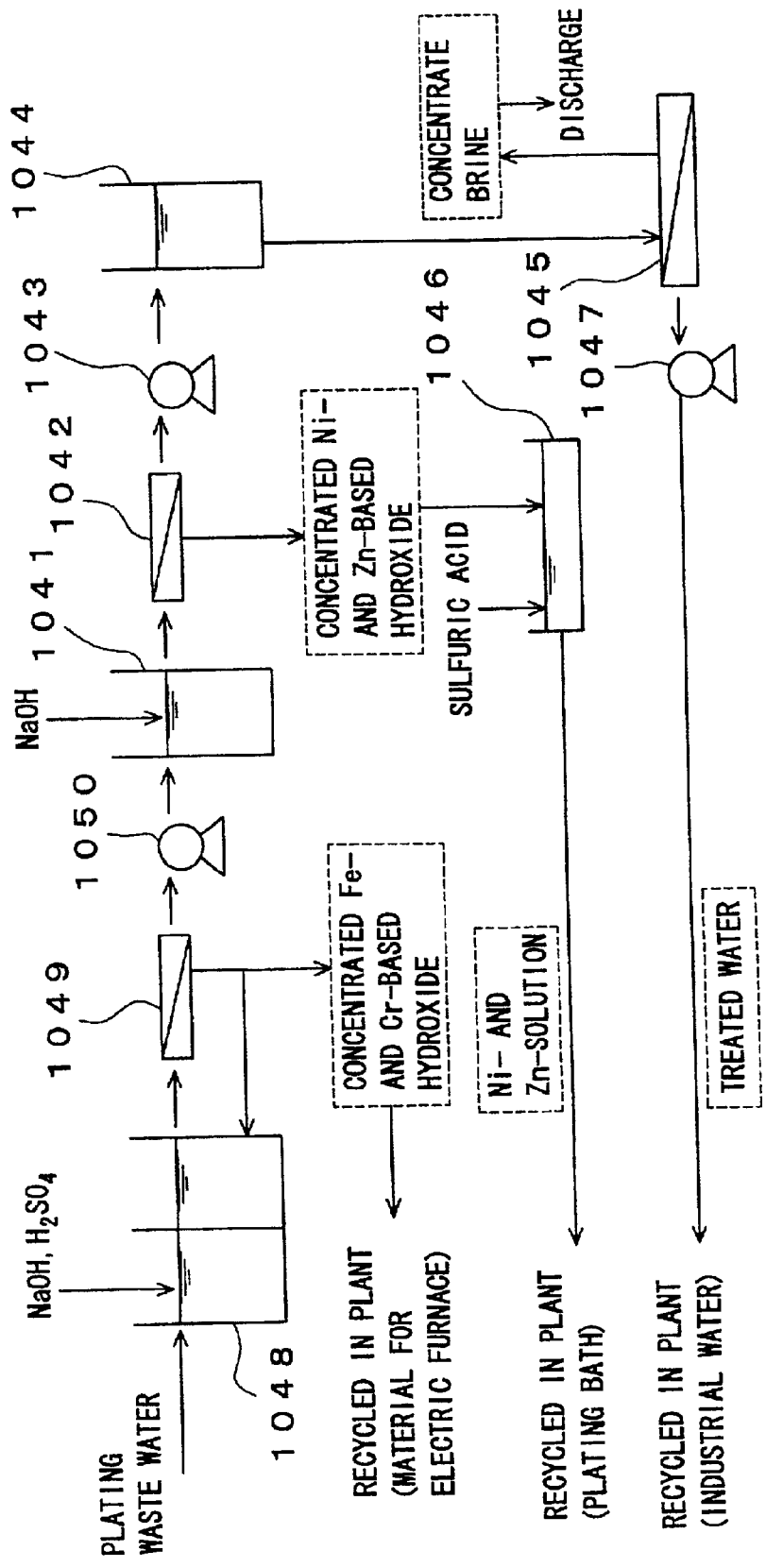
FIG. 59 is a schematic view showing the second prior art.
Figure 60:
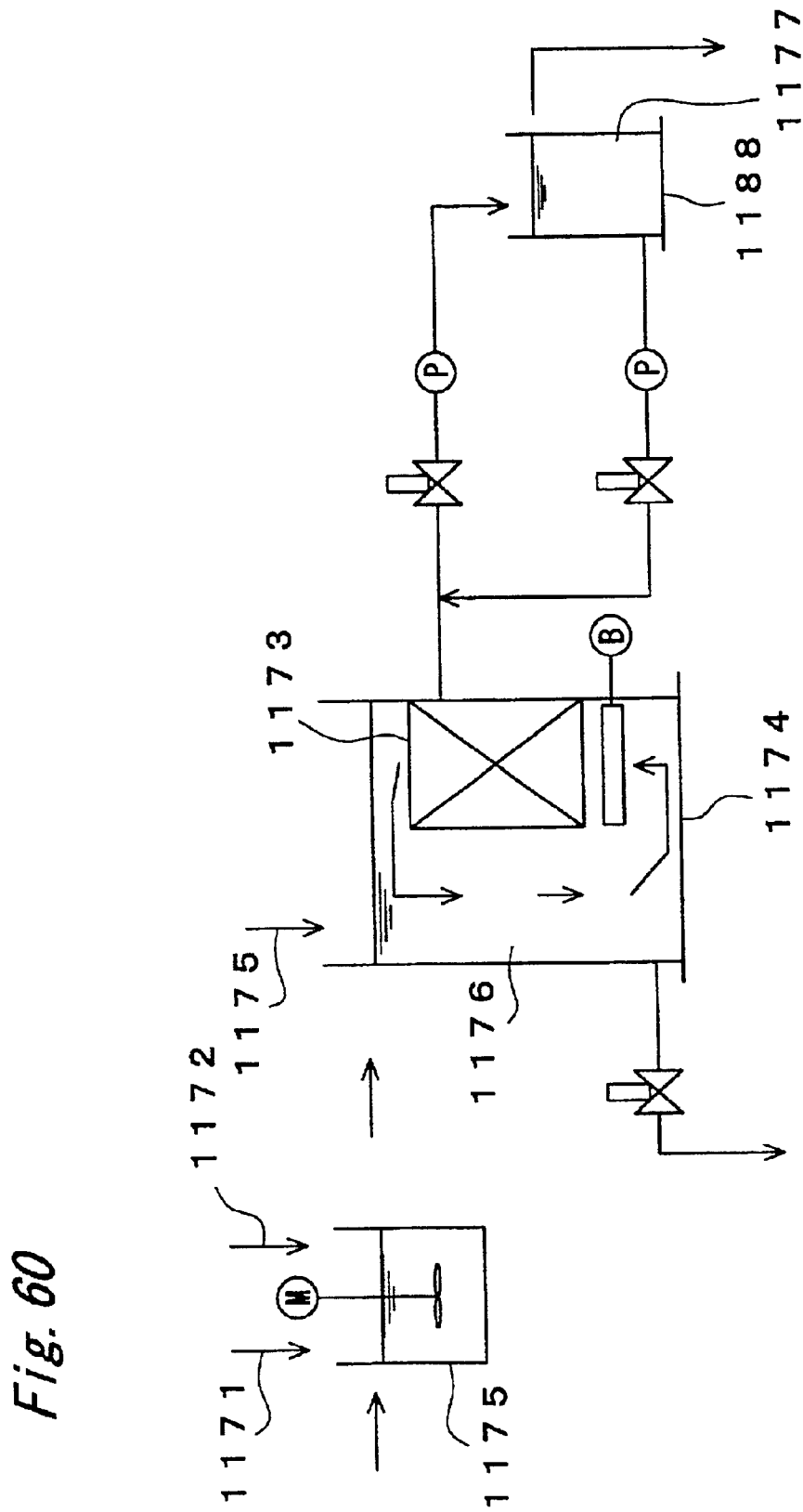
FIG. 60 is a schematic view showing the third prior art.

FIG. 57 shows the detailed structure of this foam separation tank 541. In FIG. 57, reference numeral 841 denotes the foam separation tank 541. A foam separation unit 842 is placed in this foam separation tank 841 (541). The foam separation unit 842 has an inlet 847 for taking air into an upper portion. The intake air passes through a hollow shaft 845 and is discharged as small pieces of air, i.e., minute bubbles 811 from an impeller 846 located in a lowermost portion. The waste water, which contains a gallium hydroxide flock, flows from a waste water inlet pipe 844 into this foam separation tank 841, and the gallium hydroxide flock surfaces with minute bubbles 811 stuck to the flock.

The gallium hydroxide flock, which has surfaced with bubbles 811 stuck thereto, flows out of a foam outlet pipe 848 located in the upper portion of the foam separation tank 841. A treated water outlet pipe 849 is located in the lower portion of the foam separation tank 841, and the treated water, from which the gallium hydroxide flock has been separated and removed, flows out. A baffle 850 is placed in a position near the treated water outlet pipe 849 so that this gallium hydroxide flock should not flow directly out of the treated water outlet pipe 849.

On the other hand, in the foam separation tank 541, the treated water, from which the gallium hydroxide flock has been separated, includes a somewhat minute gallium hydroxide flock. Then, the water, which contains the somewhat minute gallium hydroxide flock, is introduced from the treated water outlet pipe 849 into a multistage type submerged membrane separation unit 502 shown in FIG. 43 that has an adhesional precipitation section and a diaphragm and separated into water and a concentrate brine. The concentrated concentrate brine is further concentrated by being introduced into the evaporator 579 and becomes a high-concentration metal containing slurry.

Moreover, steam generated from the evaporator 579 is cooled by being introduced into a cooling unit 580, formed into water and subjected to pH adjustment by being introduced into a second pH adjustment tank 503.

On the other hand, the water separated in the multistage type submerged membrane separation unit 502 is subjected to pH adjustment with sodium hydroxide as a pH adjuster added to the second pH adjustment tank 503 and thereafter treated by being introduced into a reverse osmosis membrane separation unit 504. The treated water becomes a treated water and is discharged.

Moreover, sodium ions concentrated by the reverse osmosis membrane separation unit 504 is sent back and introduced into the first pH adjustment tank 501 and recycled for the pH adjustment of the gallium waste water as an acid metal containing waste water.

According to this thirty-eighth embodiment, the treated water can be obtained by treating the metal (gallium) containing waste water in the first pH adjustment tank 501, the foam separation tank 541, the multistage type submerged membrane separation unit 502 and the reverse osmosis membrane separation unit 504. The metalhydroxide (gallium hydroxide flock) as a floating substance that has surfaced and separated in the foam separation tank 541 and the concentrate (gallium hydroxide) precipitated and concentrated in the multistage type submerged membrane separation unit 502 are directly introduced into the evaporator 579, and a metal containing slurry can be obtained in a short time.

Figure 47:
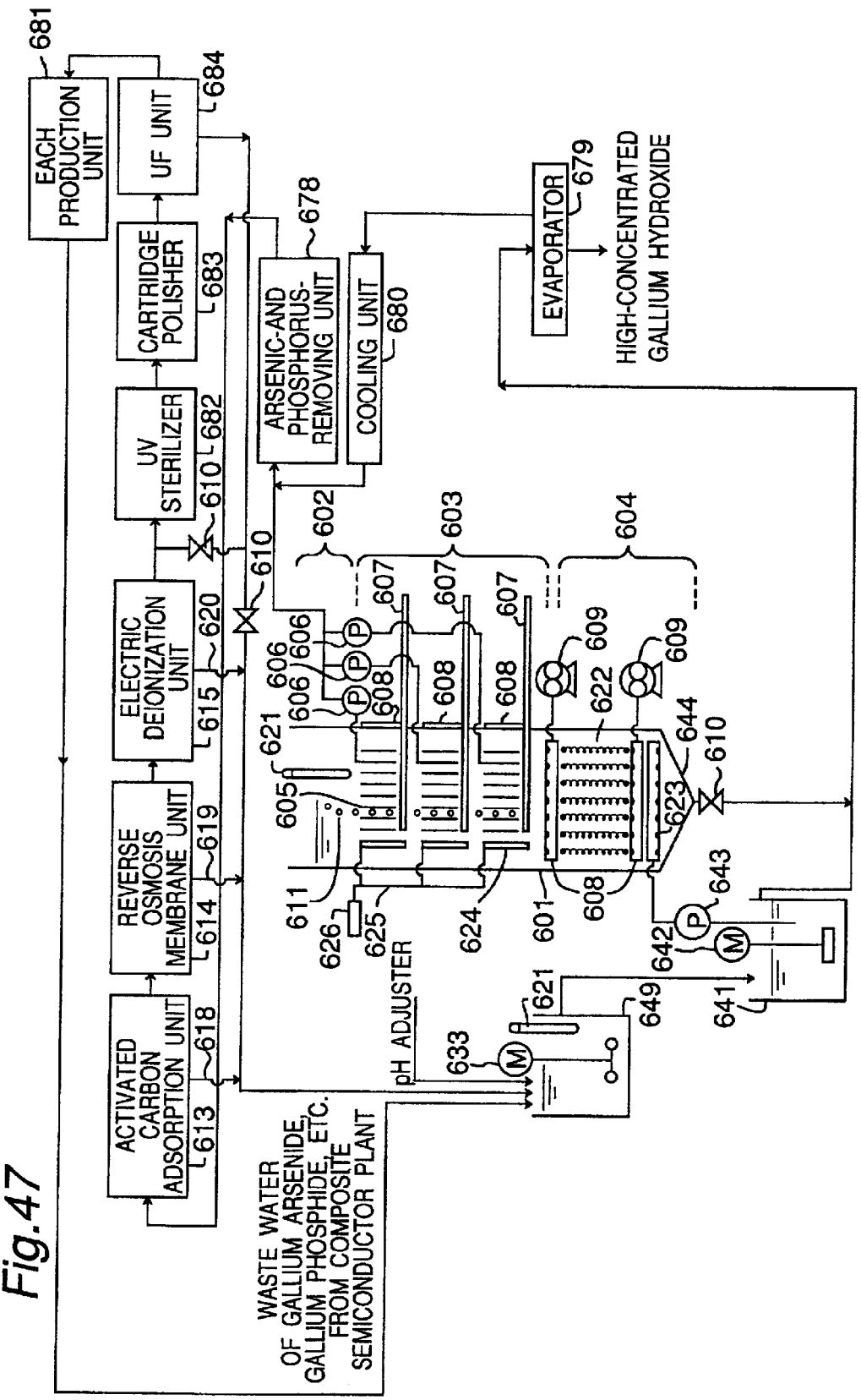
FIG. 47 is a schematic view showing the forty-third embodiment of this invention.

It is to be noted that the multistage type submerged membrane separation unit 502 has the same structure as that of a multistage type submerged membrane separation unit 601 described in detail later in connection with the forty-third embodiment (FIG. 47).

(Fortieth Embodiment)

Figure 44:
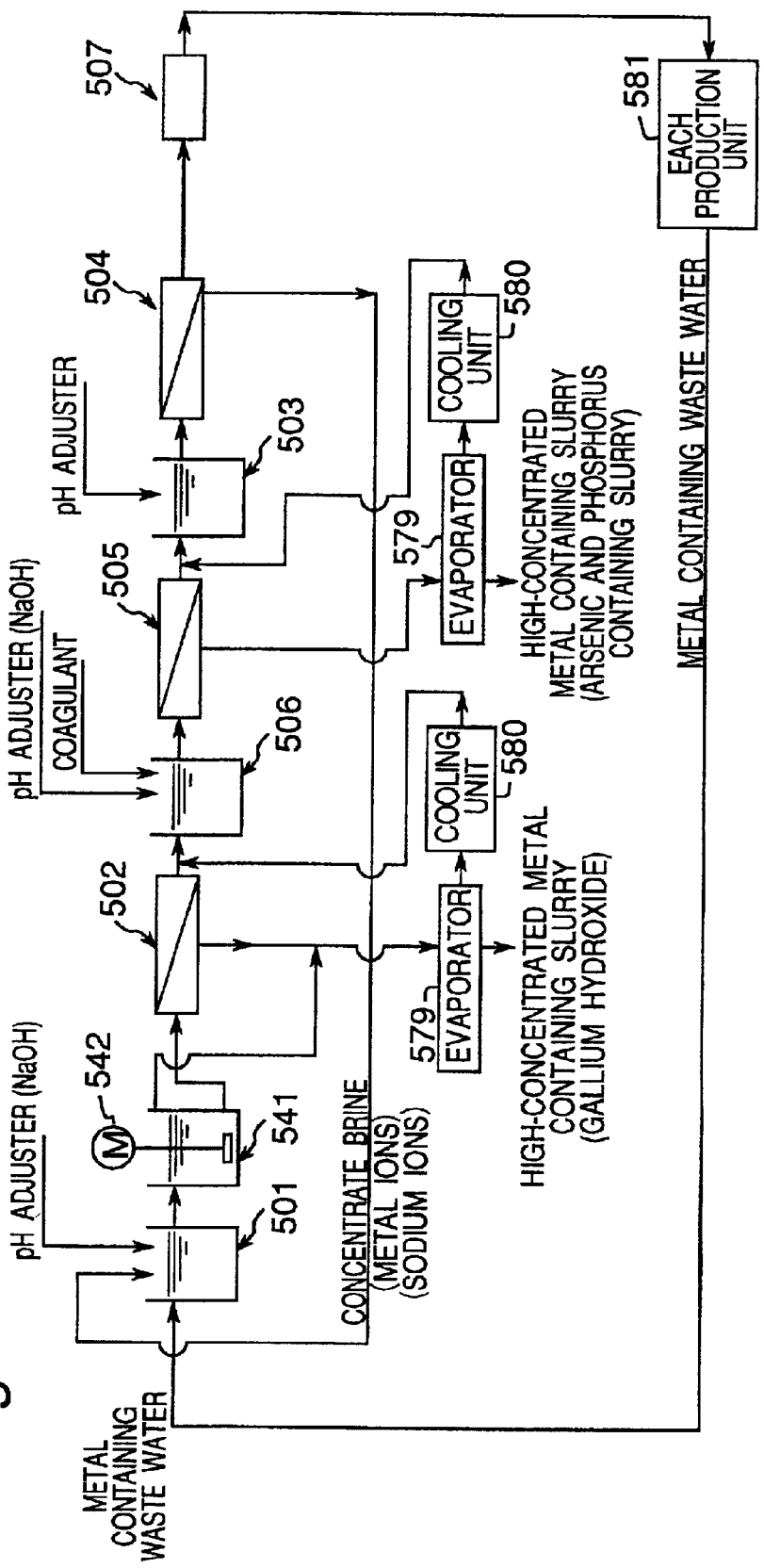
FIG. 44 is a schematic view showing the fortieth embodiment of this invention.

Next, FIG. 44 shows the construction of a waste water treatment system for carrying out the fortieth embodiment of the metal containing waste water treatment method of this invention.

This fortieth embodiment differs from the aforementioned thirty-ninth embodiment in that (1) a reaction tank 506 to which a pH adjuster and a coagulant are added and a second multistage type submerged membrane separation unit 505 having an adhesional precipitation section and a diaphragm are arranged behind the multistage type submerged membrane separation unit 502 of FIG. 43 (thirty-ninth embodiment) and that (2) an ultrapure water generating system 507 is arranged behind the reverse osmosis membrane separation unit 504.

Moreover, this fortieth embodiment differs from the aforementioned thirty-ninth embodiment in that the concentrate brine of the second multistage type submerged membrane separation unit 505 is concentrated by being introduced into the evaporator 579 and that steam generated from the evaporator 579 is introduced into a cooling unit 580 and the obtained water is introduced into the second pH adjustment tank 503. Therefore, in this fortieth embodiment, the same components as those of the system employed in the aforementioned thirty-ninth embodiment are denoted by same reference numerals, and no detailed description is provided therefor.

In a compound semiconductor plant, a compound semiconductor, represented by gallium arsenide, is used, and a gallium arsenide waste water is discharged. This fortieth embodiment explained with reference to FIG. 44 is a metal containing waste water treatment method for recycling the water obtained by securely treating the gallium arsenide waste water as a raw water for the ultrapure water generating system 507.

First of all, by adding sodium hydroxide as a pH adjuster to the first pH adjustment tank 501, gallium in the metal containing waste water, or the gallium arsenide waste water is separated as a gallium hydroxide flock in the foam separation tank 541 and the multistage type submerged membrane separation unit 502. Next, the arsenic containing treated water obtained in the multistage type submerged membrane separation unit 502 that has the adhesional precipitation section and the diaphragm is made to react with sodium hydroxide as a pH adjuster and ferric chloride as a coagulant added to the reaction tank 506. Then, the resulting liquid is separated into an arsenic concentrate and water by the second multistage type submerged membrane separation unit 505 that has the adhesional precipitation section and the diaphragm.

This second multistage type submerged membrane separation unit 505, which has the same structure as that of a multistage type submerged membrane separation tank 669 of the forty-fifth embodiment (FIG. 49) described later, will be described in detail in connection with the forty-fifth embodiment.

Arsenic in the treated water is separated to a concentrate brine side in the second multistage type submerged membrane separation unit 505 and becomes an arsenic containing slurry as a metal containing slurry. On the other hand, the treated water obtained by separating arsenic is subjected to pH adjustment with sodium hydroxide as a pH adjuster added to the second pH adjustment tank 503 and further introduced into the reverse osmosis membrane separation unit 504. The treated water obtained by being introduced into this reverse osmosis membrane separation unit 504 is introduced into the ultrapure water generating system 507.

Then, the ultrapure water produced by this ultrapure water generating system 507 is used in each production unit 581.

The metal containing waste water from each production unit 581 is introduced again into the first pH adjustment tank 501, completing a completely closed treatment system without generating waste water at all.

The sodium ions included in the concentrate brine obtained by the reverse osmosis membrane separation unit 504 are recycled as a pH adjuster by being sent back to the first pH adjustment tank 501, reducing the amount of use of a new pH adjuster.

As described above, according to this fortieth embodiment, the metal containing waste water is treated in the first pH adjustment tank 501, the foam separation tank 541, the multistage type submerged membrane separation unit 502, the reaction tank 506, the second multistage type submerged membrane separation unit 505, the second pH adjustment tank 503 and the reverse osmosis membrane separation unit 504. The treated water is introduced into the ultrapure water generating system 507 to produce the ultrapure water, and the ultrapure water can be recycled by being supplied to each production unit 581.

Moreover, the metalhydroxide as a floating substance that has surfaced and separated in the foam separation tank 541 and the concentrate that has been precipitated and concentrated in the multistage type submerged membrane separation tank 502 are introduced into the evaporator 579, by which a first metal containing slurry (gallium hydroxide) can be obtained. Also, the concentrate, which has been precipitated and concentrated in the second multistage type submerged membrane separation unit 505, is introduced into the evaporator 579, by which a second metal containing slurry (slurry containing arsenic and phosphorus) can be obtained. Through these processes, two kinds of high-concentration metal containing slurries can be obtained in a short time.

(Forty-First Embodiment)

Figure 45:
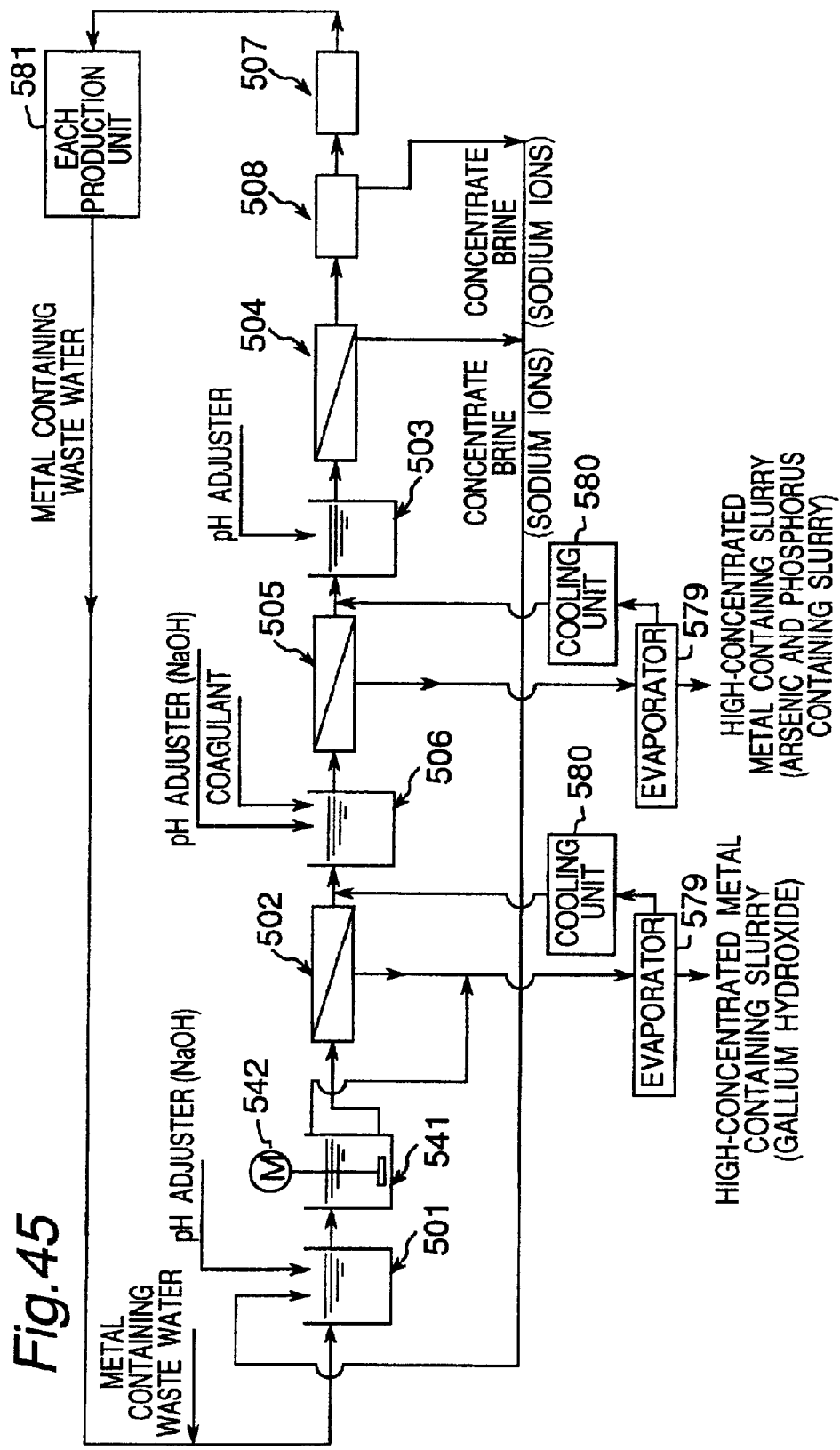
FIG. 45 is a schematic view showing the forty-first embodiment of this invention.

Next, FIG. 45 shows the construction of a waste water treatment system of the forty-first embodiment of the metal containing waste water treatment method of this invention.

This forty-first embodiment differs from the fortieth embodiment only in that an electric deionization unit 508 is arranged behind the reverse osmosis membrane separation unit 504 of the fortieth embodiment and that the concentrate brine from the electric deionization unit 508 is made to join another concentrate brine and introduced into the first pH adjustment tank 501 in comparison with the aforementioned FIG. 44 (fortieth embodiment).

Therefore, in this forty-first embodiment, the same components as those of the aforementioned fortieth embodiment are denoted by same reference numerals, and no detailed description is provided therefor.

The electric deionization unit 508 is arranged behind the reverse osmosis membrane separation unit 504 and electrically removes the ions dissolved in the water by means of an ion exchange membrane and an ion exchange resin.

Therefore, since the ionic load on the ultrapure water generating system 507 is reduced, the water quality of the ultrapure water generating system 507 is improved and the running cost of the ultrapure water generating system 507 is concurrently reduced. On the other hand, the concentrate brine of the reverse osmosis membrane separation unit 504 and the electric deionization unit 508 includes sodium ions. Therefore, the concentrate brine is sent back to the first reaction section 501 to recycle the sodium ions, by which the amount of use of sodium hydroxide as a new pH adjuster is reduced.

As described above, in this forty-first embodiment, the metal containing waste water is treated in the first pH adjustment tank 501, the foam separation tank 541, the first multistage type submerged membrane separation unit 502, the reaction tank 506, the second multistage type submerged membrane separation unit 505, the second pH adjustment tank 503, the reverse osmosis membrane separation unit 504 and the electric deionization unit 508. The treated water is introduced into the ultrapure water generating system 507 to produce an ultrapure water, and the ultrapure water is supplied to each production unit 581.

Moreover, the first metal containing slurry (gallium hydroxide) can be obtained by introducing the metalhydroxide as the floating substance that has surfaced and separated in the foam separation tank 541 and the concentrate that has been precipitated and concentrated in the multistage type submerged membrane separation unit 502 into the evaporator 579. Also, the second metal containing slurry (slurry containing arsenic and phosphorus) can be obtained by introducing the concentrate that has been precipitated and concentrated in the second multistage type submerged membrane separation unit 505 into the evaporator 579. Through these processes, two kinds of high-concentration metal containing slurries can be obtained in a short time. According to this forty-first embodiment, by virtue of the existence of the electric deionization unit 508, an ultrapure water can be produced without putting a load on the ultrapure water generating system 507.

(Forty-Second Embodiment)

Figure 46:
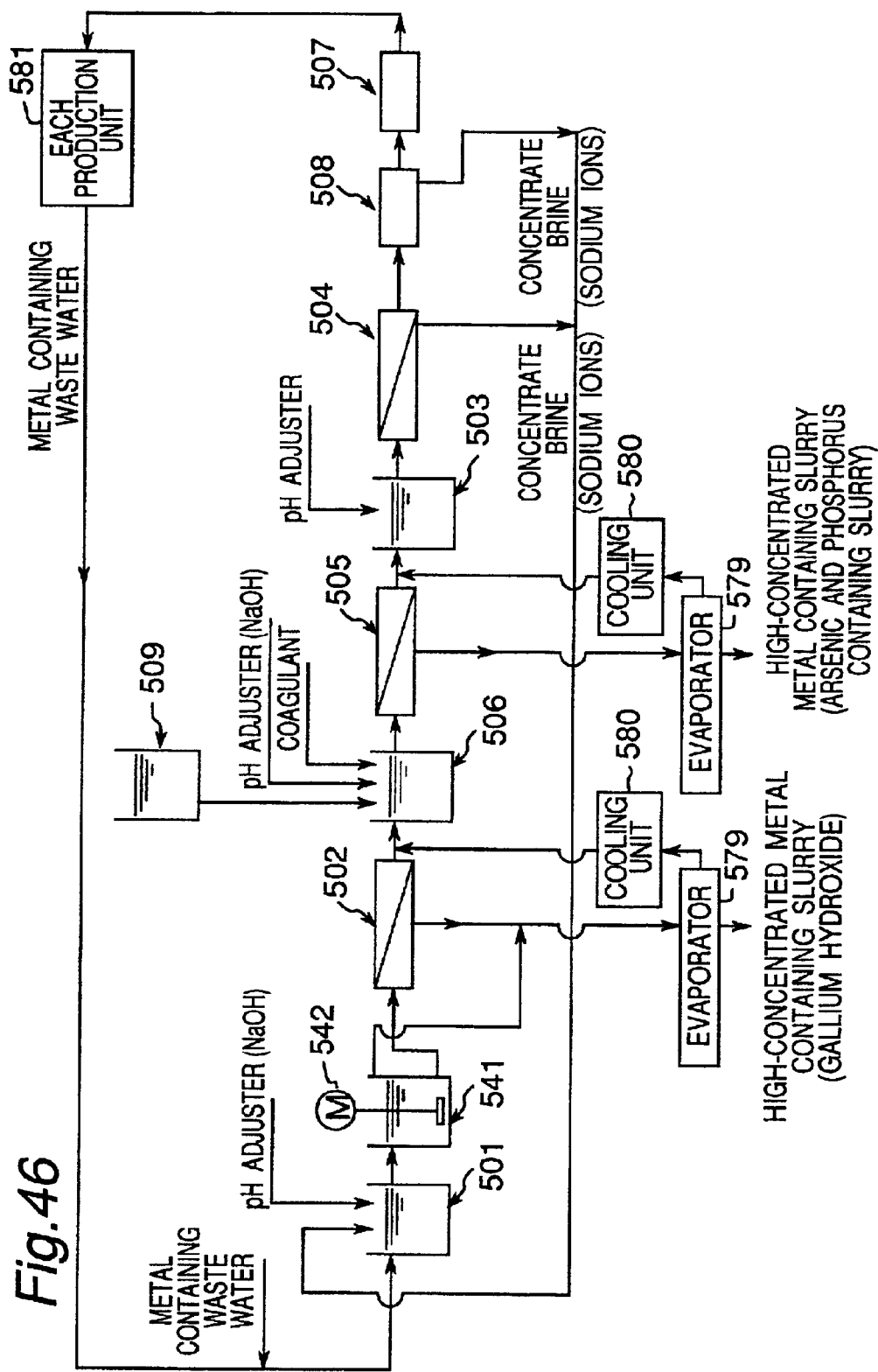
FIG. 46 is a schematic view showing the forty-second embodiment of this invention.

Next, FIG. 46 shows the construction of the forty-second embodiment of the metal containing waste water treatment and metal collecting method of this invention.

This forty-second embodiment differs from the forty-first embodiment only in that a metal oxidizing bacterium is loaded from a metal oxidizing bacterium culturing tank 509 to the reaction tank 506 of the aforementioned forty-first embodiment in FIG. 45 (forty-first embodiment). Therefore, in this forty-second embodiment, the same components as those of the system of the aforementioned forty-first embodiment are denoted by same reference numerals, and no detailed description is provided therefor.

In this forty-second embodiment, the metal oxidizing bacterium is loaded from the metal oxidizing bacterium culturing tank 509 to the third reaction section 506. Through this process, in concrete, when the metal containing waste water is a gallium arsenide waste water, there is carried out an oxidizing process for changing trivalent arsenic into pentavalent arsenic to detoxify and stabilize arsenic in the reaction tank 506.

There is also a method for using an oxidizer of sodium hypochlorite or the like in the oxidizing process. However, in relation to the running cost, it is preferable to use the metal oxidizing bacterium. In more concrete, the arsenic oxidizing bacterium is loaded as a metal oxidizing bacterium from the metal oxidizing bacterium culturing tank 509.

(Forty-Third Embodiment)

Next, FIG. 47 shows the construction of a waste water treatment system for carrying out the forty-third embodiment of the metal containing waste water treatment method of this invention.

In this forty-third embodiment, a waste water from compound semiconductor plant, which contains gallium arsenide, gallium phosphide and so on generated from each production unit 681, is introduced into a pH adjustment tank 649, and a pH adjuster of sodium hydroxide or the like is added. A stirrer 633 is placed in the pH adjustment tank 649, and a gallium hydroxide flock is formed by mechanical stirring.

The formed gallium hydroxide flock easily precipitates, easily receives bubbles stuck to it since it is a hydroxide and formed into a flock to which bubbles easily adhere and easily adheres also to a filler 622 described later.

The waste water, which contains the gallium hydroxide flock, is introduced into a foam separation tank 641, and the gallium hydroxide flock surfaces with minute bubbles stuck to it. The minute bubbles are generated from a foam separation unit 642 placed inside the foam separation tank 641.

Then, the gallium hydroxide flock, which has surfaced, flows out of the upper portion of the foam separation tank 641 and is introduced into an evaporator 679, where moisture evaporates, concentrating the flock. The waste water, from which the gallium hydroxide flock has been separated in this foam separation tank 641, is introduced by a foam separation tank pump 643 from an inflow pipe 623 into an adhesional precipitation section 604 located below the first multistage type submerged membrane separation tank 601.

In this adhesional precipitation section 604, a filler 622 is placed in an upper portion, and an air diffusion pipe 608 for periodically cleaning by air the gallium hydroxide as a metalhydroxide stuck to the filler 622 is placed below the filler. As the filler 622, a 100 mm radially looped cord of the product name called MOOR CORD produced by TBR Co., Ltd. was arranged in the whole so that no large gap occurs. A minute gallium hydroxide flock stuck to this filler 622 becomes a large mass of gallium hydroxide with a lapse of time and easily precipitates in the lower portion of the adhesional precipitation section 604.

The air diffusion pipe 608 is connected to a blower 609 by way of an air pipe. For the blower 609, it is proper to select a general Roots blower.

The lower portion of the adhesional precipitation section 604 is constructed of a precipitation section 644 for precipitating gallium hydroxide.

The primarily treated waste water in the adhesional precipitation section 604 is next moved to a submerged membrane section 603 and separated into water and a concentrate brine by submerged membranes 605. The submerged membranes 605 are arranged vertically in three tiers in this forty-third embodiment in order to improve the treatment capability.

Then, the submerged membranes 605, which are cleaned by air discharged from an air diffusion pipe 608, come to have a reduced capability with a lapse of time.

In the above case, the submerged membranes 605 accommodated in a unit (not shown) are each replaced by a new submerged membrane 605 by being horizontally moved and unloaded from a submerged membrane unloading opening 608 by means of a submerged membrane unloading jig 607. The reason why the submerged membranes 605 are arranged vertically in a plurality of tiers is that, when the multistage submerged membrane separation tank 601 is required to be placed inside a plant, the required area of the tank in the building of the plant is minimized by improving the treatment capability per area.

Moreover, diaphragms 624, which vibrate the submerged membranes 605 to improve the treatment capability of the submerged membranes 605 are arranged vertically in three tiers in the submerged membrane section 603. The diaphragms 624 are connected to a variable frequency oscillator 626 for varying the treatment capability by controlling the amplitude by way of a signal line 625. That is, the treatment capability of the submerged membranes 605 can be varied by freely controlling the amplitude of the diaphragms 624 by the variable frequency oscillator 626. It is to be noted that the vibrations of the diaphragms 624 are transferred to the submerged membranes 605 via the treated water.

Moreover, all the submerged membranes 605 placed vertically in three tiers can efficiently be cleaned by air, i.e., bubbles discharged from the air diffusion pipe 608 placed in the submerged membrane section 603. Since the bubbles discharged from the air diffusion pipe 608 placed below the submerged membranes 605 consistently clean the membrane surfaces of the submerged membranes 605, the membranes are not blocked up by minute solid matter.

For this submerged membrane 605, it is proper to select the submerged membranes produced by Kubota Corp., Yuasa Corp., Kurita Water Industries Ltd., Mitsubishi Rayon Co., Ltd. and so on.

Then, it is proper to measure the pH in the multistage submerged membrane separation tank 601 by a pH meter 621 placed in an upper portion 602 and control the amount of the pH adjuster added to the pH adjustment tank 649. The operating conditions are controlled (control line is not shown) by a pH meter 621, and it is preferable to control the conditions within a range of pH 4 to pH 5. However, this is not the absolute way.

The submerged membranes 605 placed in the submerged membrane section 603 are connected to a treated water pump 606 by way of pipes and tubes and able to obtain a waste water separated by the membranes. By operating this treated water pump 606, water and a concentrate are separated from each other by the submerged membranes 605. The water is introduced into an arsenic- and phosphorus-removing unit 678 of the next process by a treated water pump 606 through pipes and tubes, and arsenic and phosphorus are removed.

The treated water, from which arsenic and phosphorus have been removed, is introduced by way of an activated carbon absorption unit 613, a reverse osmosis membrane separation unit 614 and an electric deionization unit 615 into an ultraviolet sterilizer 682, a cartridge polisher 683 and an ultrafilter unit 684 that constitute an ultrapure water generating system to produce an ultrapure water.

On the other hand, the back washing water from the activated carbon absorption unit 613 and the concentrate brine from the ultrafilter unit 684 contain a suspended matter and minute particles. In order to recycle the water, they are sent back and introduced into a pH adjustment tank 649 to recycle the water.

Moreover, the concentrate brine from the reverse osmosis membrane separation unit 614 and the electric deionization unit 615 is introduced from pipes 619 and 620 into a pH adjustment tank 649. The concentrate brine contains sodium ions attributed to sodium hydroxide added as a pH adjuster to the pH adjustment tank 649. Therefore, water and sodium ions are recycled.

Since the concentrate brine from the ultrafilter unit 684 is the water that merely contains minute particles, it is often the case where the concentrate brine is sent back to the stage before the ultraviolet sterilizer 682 from the valve 610 instead of being sent back to the pH adjustment tank 649.

Moreover, the ultrapure water, which has been produced by being introduced into the ultraviolet sterilizer 682, the cartridge polisher 683 and the ultrafilter unit 684 that constitute the ultrapure water generating system, is sent to each production unit 681 and used according to the purposes. Consequently, a waste water from compound semiconductor plant, which contains gallium arsenide, gallium phosphide and so on, is discharged from each production unit 681. Then, the waste water, which contains gallium arsenide, gallium phosphide and so on, is introduced again into the pH adjustment tank 649, completing a completely closed treatment system.

(Forty-Fourth Embodiment)

Figure 48:
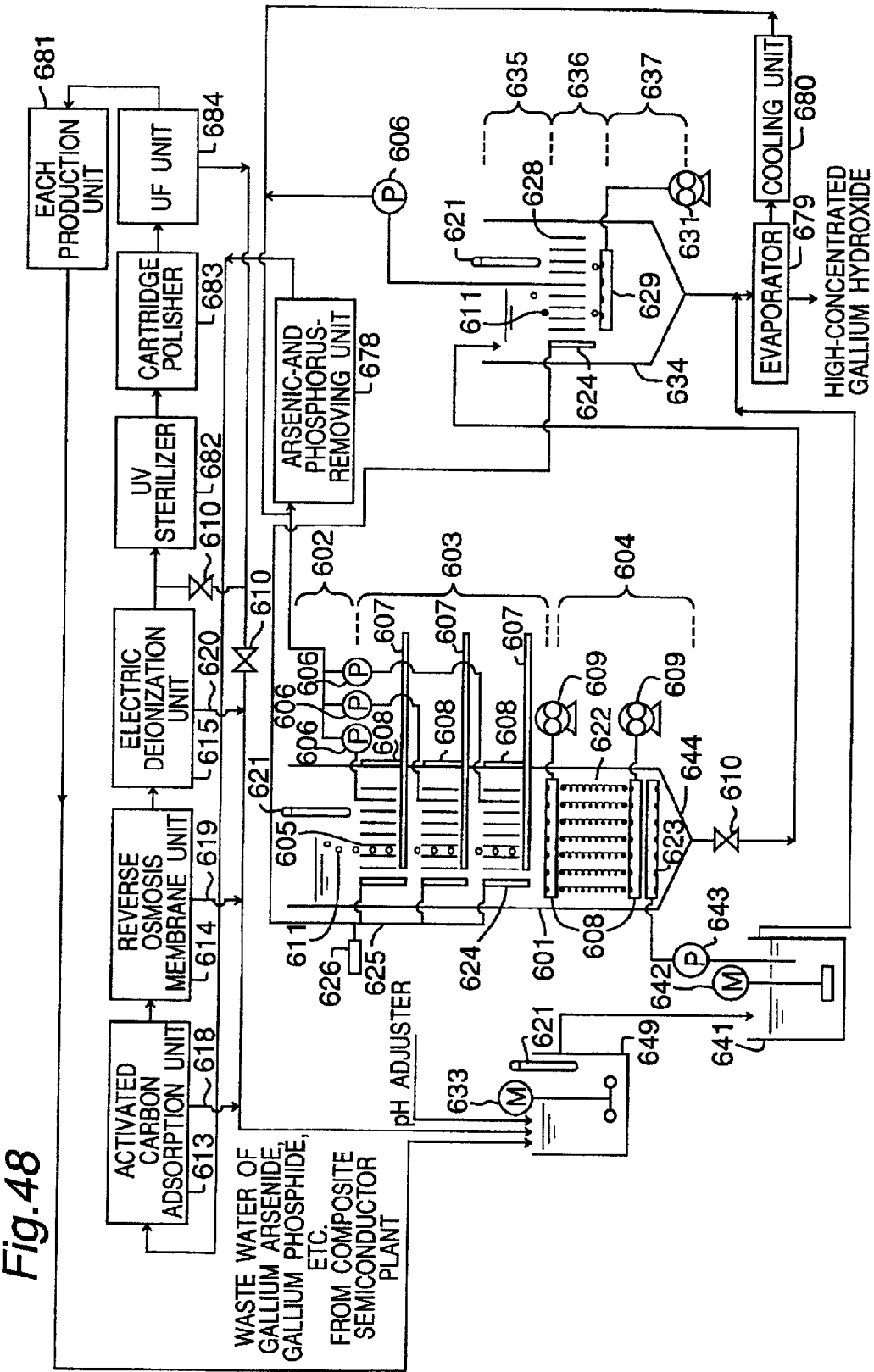
FIG. 48 is a schematic view showing the forty-fourth embodiment of this invention.

Next, FIG. 48 shows the construction of a waste water treatment system for carrying out the forty-fourth embodiment of the metal containing waste water treatment method of this invention.

This forty-fourth embodiment differs from the aforementioned forty-third embodiment only in that a second submerged membrane separation tank 634 is arranged below the multistage type submerged membrane separation tank 601 of FIG. 47 (forty-third embodiment). Therefore, in this forty-fourth embodiment, the same components as those of the aforementioned forty-third embodiment are denoted by same reference numerals, and no detailed description is provided therefor.

In this forty-fourth embodiment, the second submerged membrane separation tank 634 constructed of a second upper portion 635, a second submerged membrane section 636 and a precipitation section 637 arranged from top to bottom is arranged below (in the lower tier of) the multistage type submerged membrane separation tank 601.

Therefore, According to this forty-fourth embodiment, gallium hydroxide as a concentrate brine, which has been concentrated and precipitated in the multistage type submerged membrane separation tank 601, can further be physically concentrated in the second submerged membrane separation tank 634. This second submerged membrane separation tank 634 is provided with the second upper portion 635 where a pH meter 621 is placed. The second upper portion 635 plays the role of adjusting the pH inside the second submerged membrane separation tank 634.

A second submerged membrane 628 is placed in the second submerged membrane section 636 inside this second submerged membrane separation tank 634 and stirs gallium hydroxide by aeration to effectively carry out the concentration and separation of water from a concentrate brine. This aeration is carried out by discharging air generated from a blower 631 through an air diffusion pipe 629. Moreover, the second precipitation section 637 of this second submerged membrane separation tank 634 is a precipitation section merely for precipitating and concentrating gallium hydroxide.

The water separated inside this second submerged membrane separation tank 634 is made to join the water separated in the submerged membrane section 603 of the multistage type submerged membrane separation tank 601 by a treated water pump 606 and treated by being introduced into an arsenic- and phosphorus-removing unit 678.

Moreover, the gallium hydroxide concentrated in the second submerged membrane section 636 inside this second submerged membrane separation tank 634 is concentrated through evaporation by being introduced into an evaporator 679. This concentrate, which has been concentrated by evaporation, becomes a high-concentration gallium hydroxide and received by the manufacturer. On the other hand, steam evaporated by the evaporator 679 becomes water by being cooled by a cooling unit 680 and treated by being introduced into the arsenic- and phosphorus-removing unit 678.

As described above, according to this forty-fourth embodiment, the second submerged membrane separation tank 634 is arranged below the multistage type submerged membrane separation tank 601. Therefore, gallium hydroxide can be concentrated to a high concentration in two steps. Therefore, the load on the evaporator 679 can be reduced, and the energy consumed by the evaporator 679 can be reduced.

FIG. 56A shows a timing chart, which represents the residence times in the submerged membrane separation tank 601 and the second submerged membrane separation tank 634 when the concentrations of gallium and arsenic in the waste water are normal concentrations in this forty-fourth embodiment. FIG. 56B shows a timing chart, which represents the residence times in the submerged membrane separation tank 601 and the second submerged membrane separation tank 634 when the concentrations of gallium and arsenic in the waste water are low concentrations in this forty-fourth embodiment. As apparent with reference to FIGS. 56A and 56B by comparison, the residence times in the submerged membrane separation tanks were reduced to a half in the case of low concentration.

(Forty-Fifth Embodiment)

Figure 49:
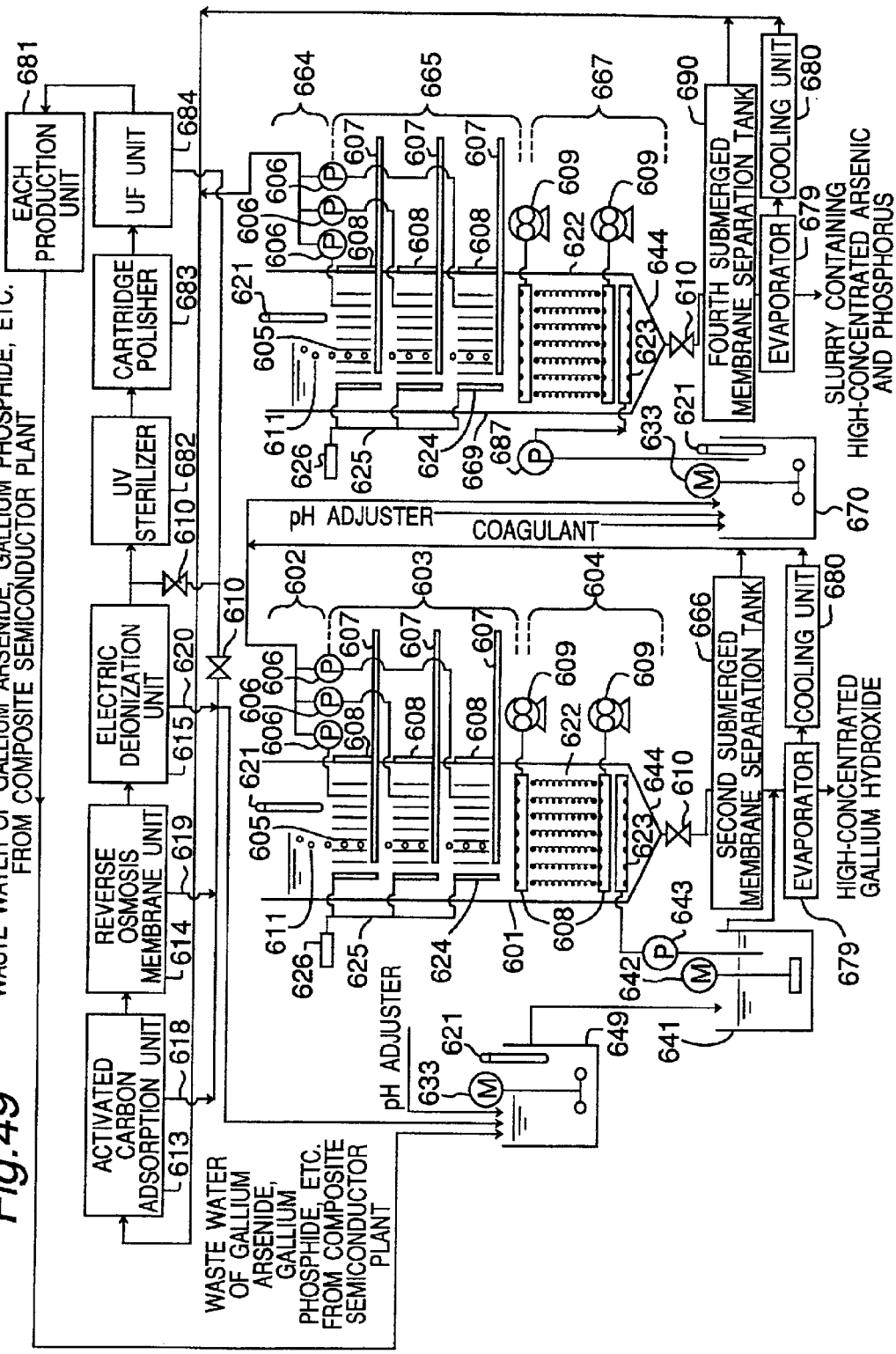
FIG. 49 is a schematic view showing the forty-fifth embodiment of this invention.

Next, FIG. 49 shows the construction of a waste water treatment system for carrying out the forty-fifth embodiment of the metal containing waste water treatment method of this invention.

In this forty-fifth embodiment, the separated water from the submerged membranes 605 and the second submerged membrane separation tank 666 (634) is introduced into a reaction tank 670 to which a pH adjuster and a coagulant are added aside from the multistage type submerged membrane separation tank 601 and the second submerged membrane separation tank 666 (634) and thereafter treated by being introduced into a third submerged membrane separation tank 669 and a fourth submerged membrane separation tank 690. This forty-fifth embodiment differs from the aforementioned forty-fourth embodiment in this point. Therefore, in this forty-fifth embodiment, no detailed description is provided for the same components as those of the aforementioned forty-fourth embodiment.

In this forty-fifth embodiment, a stirrer 633, a pH meters 621 and a reaction tank pump 687 are placed in the reaction tank 670. While adjusting the pH of the separated water from the second submerged membrane separation tank 666 that contains arsenic and phosphorus, ferric chloride as a coagulant is added to form a flock of iron hydroxide. Then, arsenic and phosphorus are introduced into a third adhesional precipitation section 667 of the third multistage type submerged membrane separation tank 669 together with the flock of iron hydroxide by the reaction tank pump 687.

Then, arsenic and phosphorus precipitate together (coprecipitate) when the flock of iron hydroxide precipitates and are introduced as a precipitate into a fourth submerged membrane separation tank 690.

On the other hand, the flock of iron hydroxide containing arsenic and phosphorus that are not precipitated is treated in the third multistage type submerged membrane separation tank 669 similarly to the gallium hydroxide in the multistage type submerged membrane separation tank 601.

That is, arsenic and phosphorus are made to react with a pH adjuster and a coagulant of ferric chloride or the like in the reaction tank 670 and separated into water and a concentrate brine by the submerged membrane 605 by being introduced into the third multistage type submerged membrane separation tank 669.

The water separated by the submerged membranes 605 of this third multistage type submerged membrane separation tank 669 is introduced into the activated carbon absorption unit 613 by a treated water pump 606 and recycled as a raw water for an ultrapure water generating system constructed of an ultraviolet sterilizer 682, a cartridge polisher 683 and an ultrafilter unit 684 similarly to forty-fourth embodiment.

On the other hand, the flock of iron hydroxide, which contains arsenic and phosphorus and has been introduced as a precipitate into the fourth submerged membrane separation tank 690 (not shown in detail), is further concentrated to become a slurry that contains high-concentration arsenic and phosphorus.

Then, the water separated in this fourth submerged membrane separation tank 690 is introduced into the activated carbon absorption unit 613 and recycled as a raw water for the ultrapure water generating system similarly to the forty-fourth embodiment. The concentrate of arsenic and phosphorus concentrated in this fourth submerged membrane separation tank 690 is concentrated through evaporation by being introduced into the evaporator 679. This concentrate, which has been concentrated through evaporation, becomes a slurry that contains high-concentration arsenic and phosphorus and received by the manufacturer.

Moreover, steam evaporated by the evaporator 679 becomes water by being cooled by a cooling unit 680. The water is introduced into the activated carbon absorption unit 613 and recycled as a raw water for the ultrapure water generating system similarly to the forty-fourth embodiment.

As described above, according to this forty-fifth embodiment, the metal contained in the metal containing waste water is separated into gallium and other metals (arsenic, phosphorus and so on) by the first and third multistage type submerged membrane separation tanks 601 and 669. Also, the second submerged membrane separation tank 666 is arranged below the first multistage type submerged membrane separation tank 601, and the fourth submerged membrane separation tank 690 is arranged below the third multistage type submerged membrane separation tank 669. Therefore, the submerged membrane separation tanks 666 and 690 are arranged in two tiers in the first and third multistage type submerged membrane separation tanks 601 and 669, respectively. The gallium hydroxide and the slurry that contains arsenic and phosphorus can be obtained at a high concentration and concentrated by the evaporator 679. Moreover, they are concentrated in the submerged membrane separation tanks 601, 666, 669 and 690, which have two-tier submerged membranes. Therefore, the load on the evaporators 679 and 679 in the subsequent stages can be reduced, and the energy consumed by the evaporators can be reduced.

(Forty-Sixth Embodiment)

Figure 50:
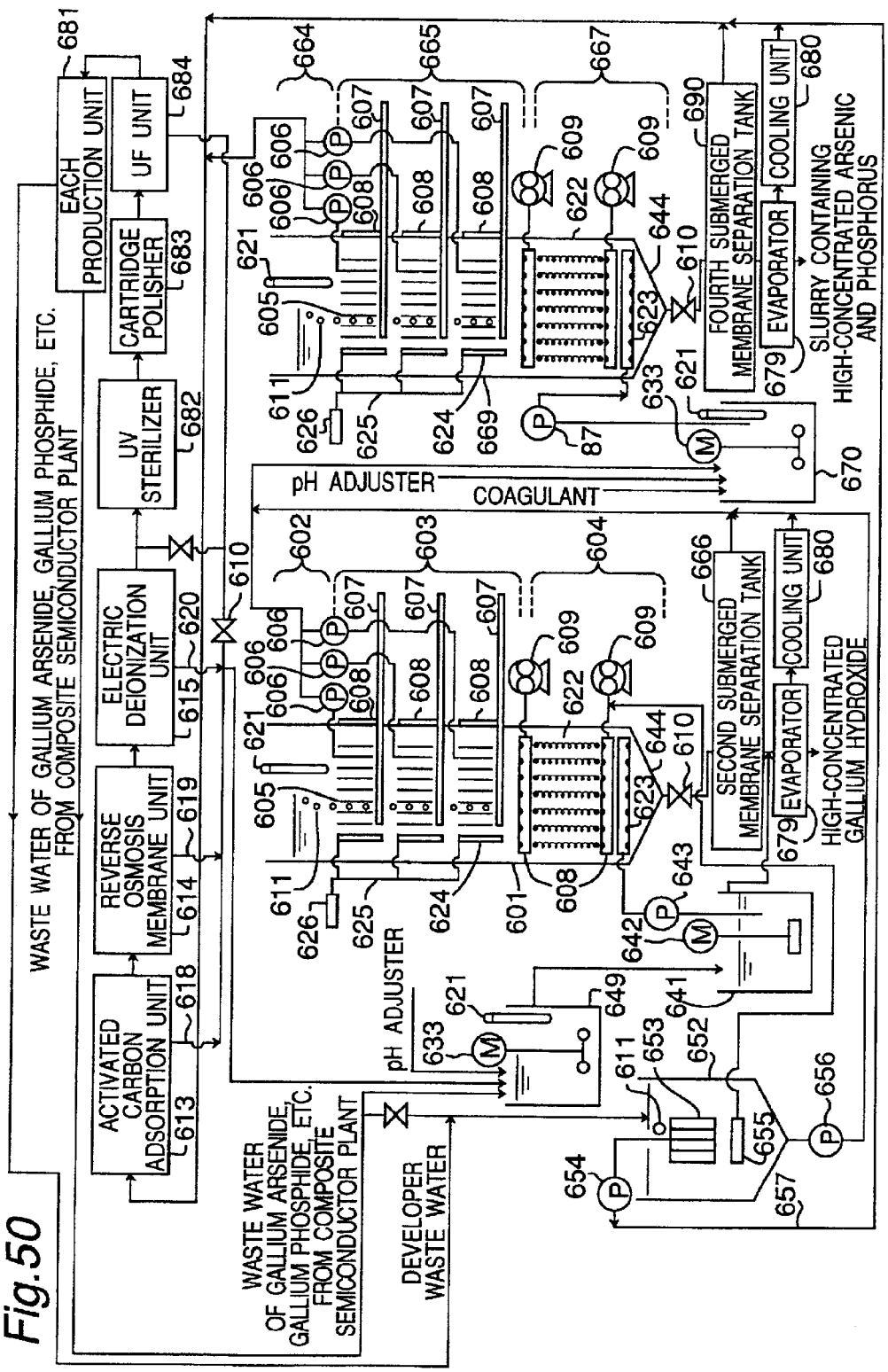
FIG. 50 is a schematic view showing the forty-sixth embodiment of this invention.

Next, FIG. 50 shows the construction of a waste water treatment system for carrying out the forty-sixth embodiment of the metal containing waste water treatment method of this invention.

This forty-sixth embodiment differs from the forty-fifth embodiment only in that a fifth submerged membrane separation tank 652 is additionally arranged in the forty-fifth embodiment of FIG. 49. Therefore, in this forty-sixth embodiment, the same components as those of the forty-fifth embodiment are denoted by same reference numerals, and no detailed description is provided therefor.

This forty-sixth embodiment employs a waste water treatment system in which the fifth submerged membrane separation tank 652 provided with a fifth submerged membrane 635 is arranged in the last stage.

A developer waste water and part of a waste water of gallium arsenide and so on from compound semiconductor plant are introduced into this fifth submerged membrane separation tank 652. Moreover, this fifth submerged membrane separation tank 652 is aerated by air discharged from an air diffusion pipe 655. Therefore, a microorganism propagates with a lapse of time using the organic matter in the developer waste water as a nutrient. Then, part of the waste water of gallium arsenide and so on is introduced into this fifth submerged membrane separation tank 652. Therefore, the arsenic oxidizing bacterium is generated on the basis of arsenic in the waste water.

When starting up the waste water treatment system in this forty-sixth embodiment in a short time, it is also possible to preparatorily culture and breed the arsenic oxidizing bacterium in another place and then load this arsenic oxidizing bacterium cultured and bred into the fifth submerged membrane separation tank 652, allowing the bacterium to propagate in an early stage.

Then, trivalent arsenic is biologically oxidized and stabilized to pentavalent arsenic by the arsenic oxidizing bacterium by introducing the arsenic oxidizing bacterium bred in this fifth submerged membrane separation tank 652 into the third multistage type submerged membrane separation tank 669 via the reaction tank 670 and mixing the bacterium with the separated water from the submerged membrane 605 of the multistage type submerged membrane separation tank 601. The pentavalent arsenic thus oxidized and stabilized is to be treated similarly to the aforementioned forty-fifth embodiment.

As described above, according to this forty-sixth embodiment, the arsenic oxidizing bacterium, cultured and concentrated in the fifth submerged membrane separation tank 652 into which the developer waste water and part of the metal containing waste water from compound semiconductor plant are introduced, is introduced into the third multistage type submerged membrane separation tank 669 via the reaction tank 670. Therefore, according to this forty-sixth embodiment, the arsenic oxidizing bacterium cultured and concentrated in the fifth submerged membrane separation tank 652 is introduced into the third multistage type submerged membrane separation tank 669. Therefore, the running cost can be reduced in comparison with the case of a chemical used as an oxidizer.

(Forty-Seventh Embodiment)

Figure 51:
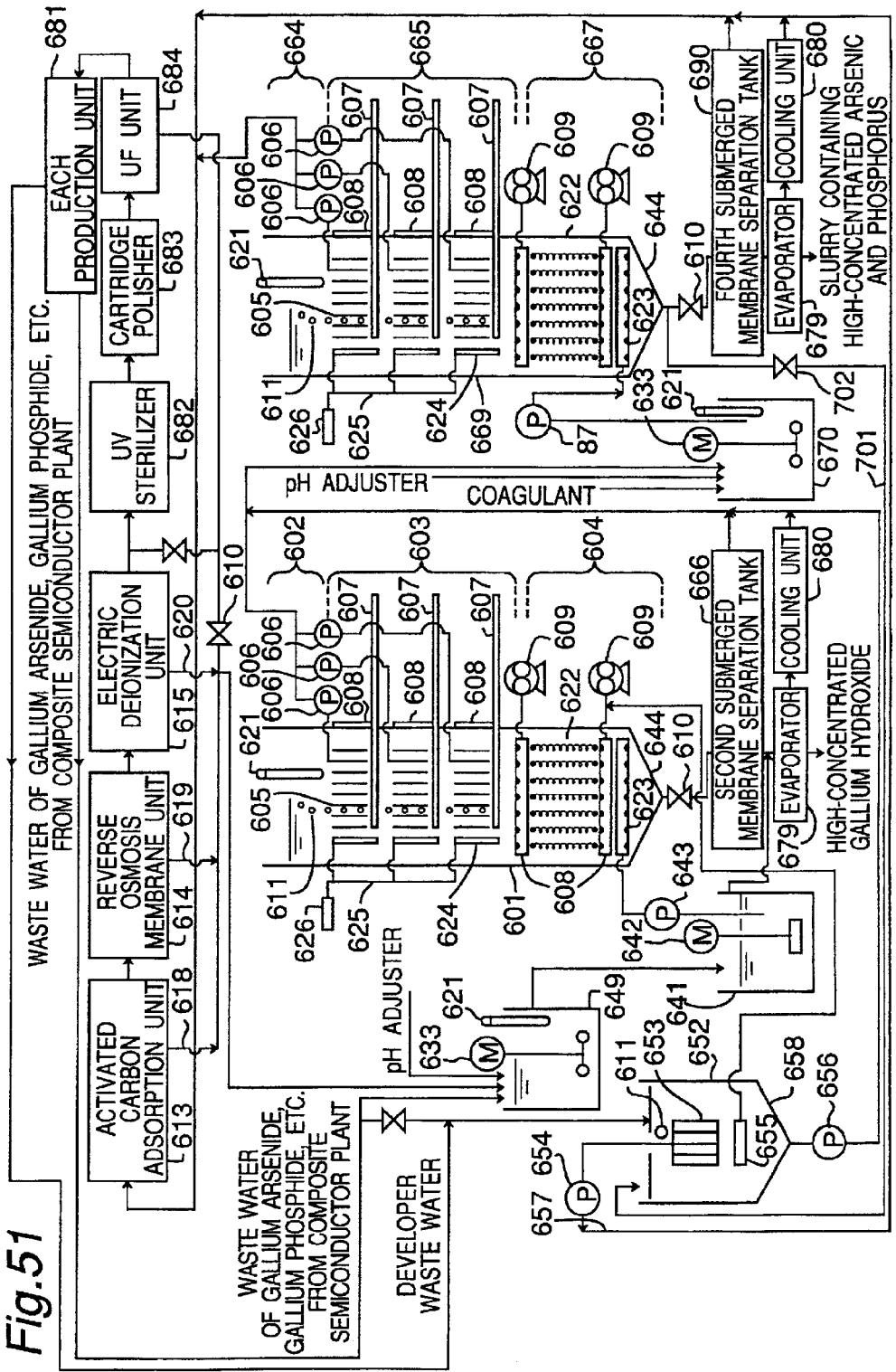
FIG. 51 is a schematic view showing the forty-seventh embodiment of this invention.

Next, FIG. 51 shows the construction of a waste water treatment system for carrying out the forty-seventh embodiment of the metal containing waste water treatment method of this invention.

This forty-seventh embodiment differs from the aforementioned forty-sixth embodiment only in that part of the precipitated concentrate brine of the third adhesional precipitation section 667 of the forty-sixth embodiment is sent back to the fifth submerged membrane separation tank 652. Therefore, in this forty-seventh embodiment, the same components as those of the forty-sixth embodiment are denoted by same reference numerals, and no detailed description is provided therefor.

In this forty-seventh embodiment, part of the precipitated concentrate brine in the third adhesional precipitation section 667 of the third multistage submerged membrane separation tank 669 is sent back to the fifth submerged membrane separation tank 652 via a pipe 701 and a valve 702, recycling the arsenic oxidizing bacterium and effectively utilizing the arsenic oxidizing bacterium. Consequently, the arsenic oxidizing bacterium can be maintained at a constant concentration within the system of this forty-seventh embodiment.

(Forty-Eighth Embodiment)

Figure 52:
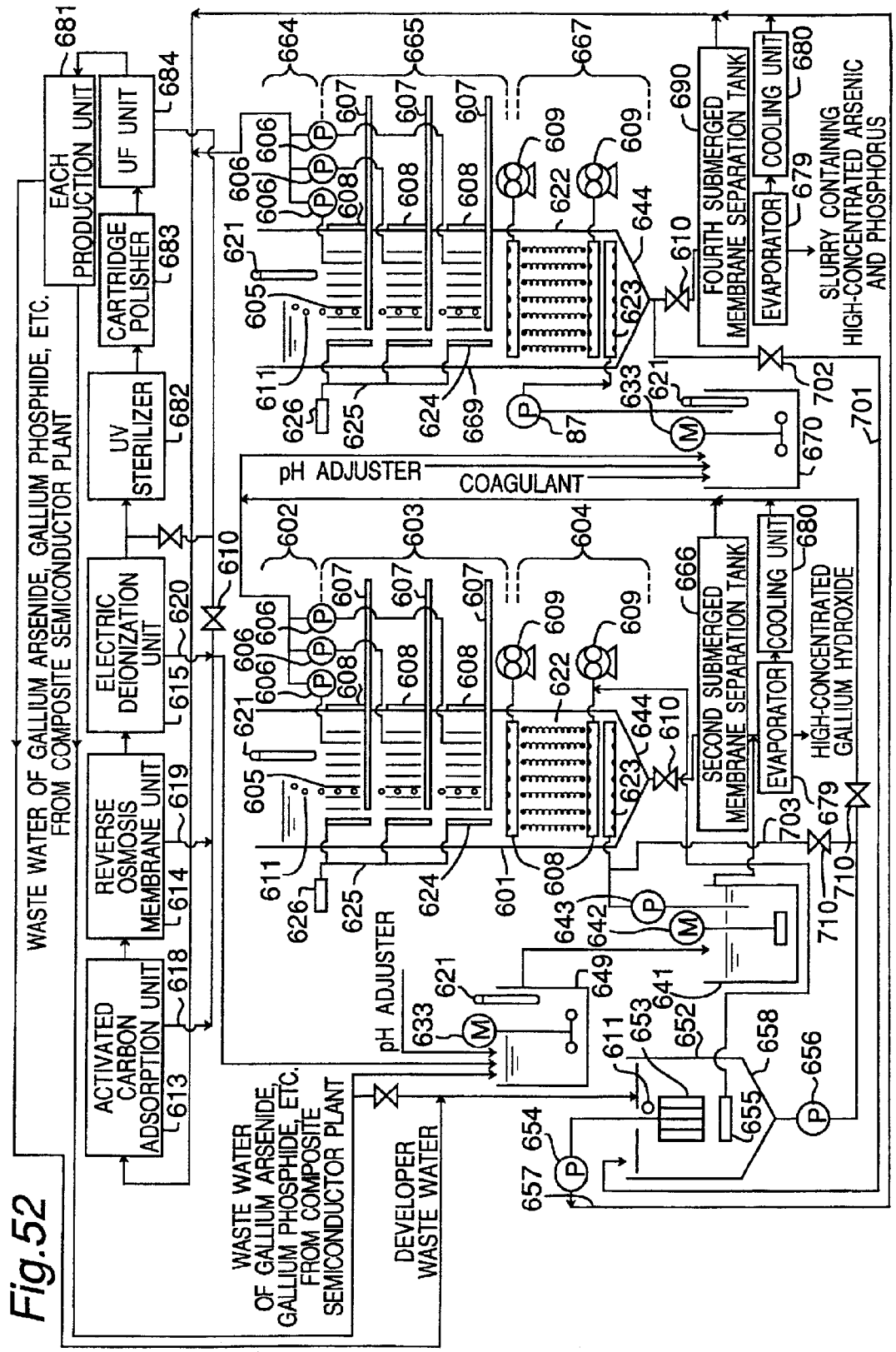
FIG. 52 is a schematic view showing the forty-eighth embodiment of this invention.

Next, FIG. 52 shows the construction of a waste water treatment system for carrying out the forty-eighth embodiment of the metal containing waste water treatment method of this invention.

This forty-eighth embodiment differs from the forty-seventh embodiment in that the liquid precipitated and concentrated in the fifth precipitation section 658 of the fifth submerged membrane separation tank 652 is sent back to the multistage type submerged membrane separation tank 601 via a pump 656, a valve 710 and a pipe 703 in the aforementioned FIG. 51 (forty-seventh embodiment). Therefore, in this forty-eighth embodiment, the same components as those of the system of the aforementioned forty-seventh embodiment are denoted by same reference numerals, and no detailed description is provided therefor.

In this forty-eighth embodiment, by sending the concentrate brine precipitated and concentrated in the fifth precipitation section 658 of the fifth submerged membrane separation tank 652 back to the multistage type submerged membrane separation tank 601, the organic matter in the waste water from compound semiconductor plant is treated by using the arsenic oxidizing bacterium in the liquid. The arsenic oxidizing bacterium, of course, oxidizes arsenic and also resolves and treats the organic matter in the waste water because it is a microorganism.

According to this forty-eighth embodiment, the arsenic oxidizing bacterium cultured in the fifth submerged membrane separation tank 652 is introduced into the first multistage type submerged membrane separation tank 601 and the third multistage type submerged membrane separation tank 669. Therefore, the arsenic oxidizing bacterium spreads throughout the entire system, allowing the treatment capability to be improved by the microorganism.

(Forty-Ninth Embodiment)

Figure 53:
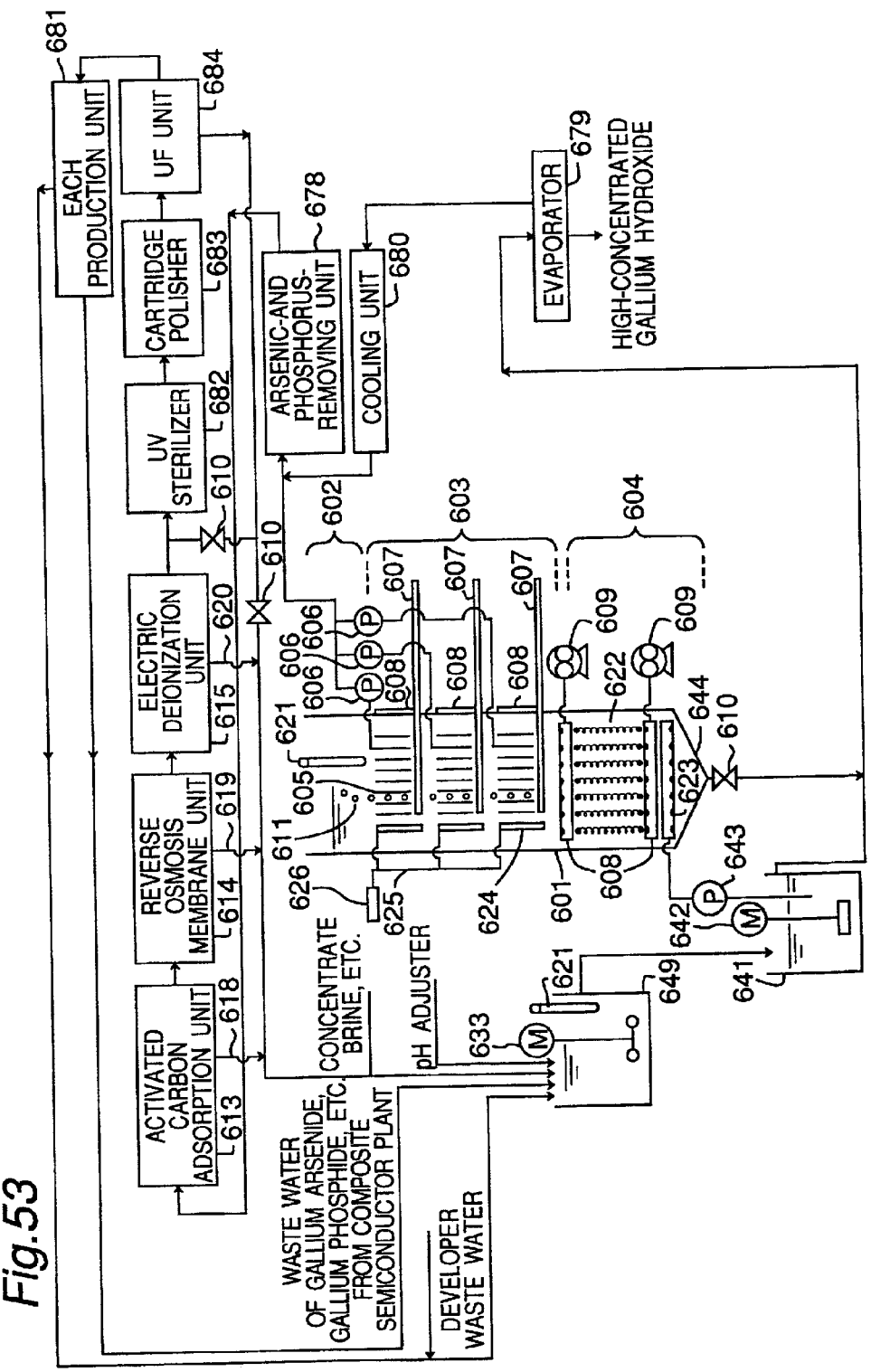
FIG. 53 is a schematic view showing the forty-ninth embodiment of this invention.

Next, FIG. 53 shows the construction of a waste water treatment system for carrying out the forty-ninth embodiment of the metal containing waste water treatment method of this invention.

This forty-ninth embodiment differs from the aforementioned forty-third embodiment only in that the developer waste water from each production unit 681 is introduced into the pH adjustment tank 649 in FIG. 47 (forty-third embodiment). Therefore, in this forty-ninth embodiment, the same components as those of the aforementioned forty-third embodiment are denoted by same reference numerals, and no detailed description is provided therefor.

In this forty-ninth embodiment, the developer waste water is introduced into the pH adjustment tank 649.

In a compound semiconductor plant, a small amount of developer waste water is generated. In this forty-ninth embodiment, this developer waste water is first subjected to pH adjustment by being introduced into the pH adjustment tank 649. Next, the resulting waste water is introduced into the multistage type submerged membrane separation tank 601 via the foam separation tank 641 so as to treat the developer waste water, or the organic matter by the microorganism that propagates in the multistage type submerged membrane separation tank 601. This multistage type submerged membrane separation tank 601 can also concentrate gallium hydroxide by the submerged membranes 605 concurrently with the treatment of the organic matter.

According to this forty-ninth embodiment, not only the waste water from compound semiconductor plant, which contains gallium arsenide, gallium phosphide and so on from each production unit 681, but also the developer waste water from each production unit 681 are treated by being introduced into the pH adjustment tank 649. Therefore, the system becomes simple, and the initial cost can be reduced. Moreover, the developer waste water is the waste water constructed mainly of the organic matter. Therefore, the microorganism can be bred by a great amount in the multistage type submerged membrane separation tank 601 and utilized for the treatment.

(Fiftieth Embodiment)

Figure 54:
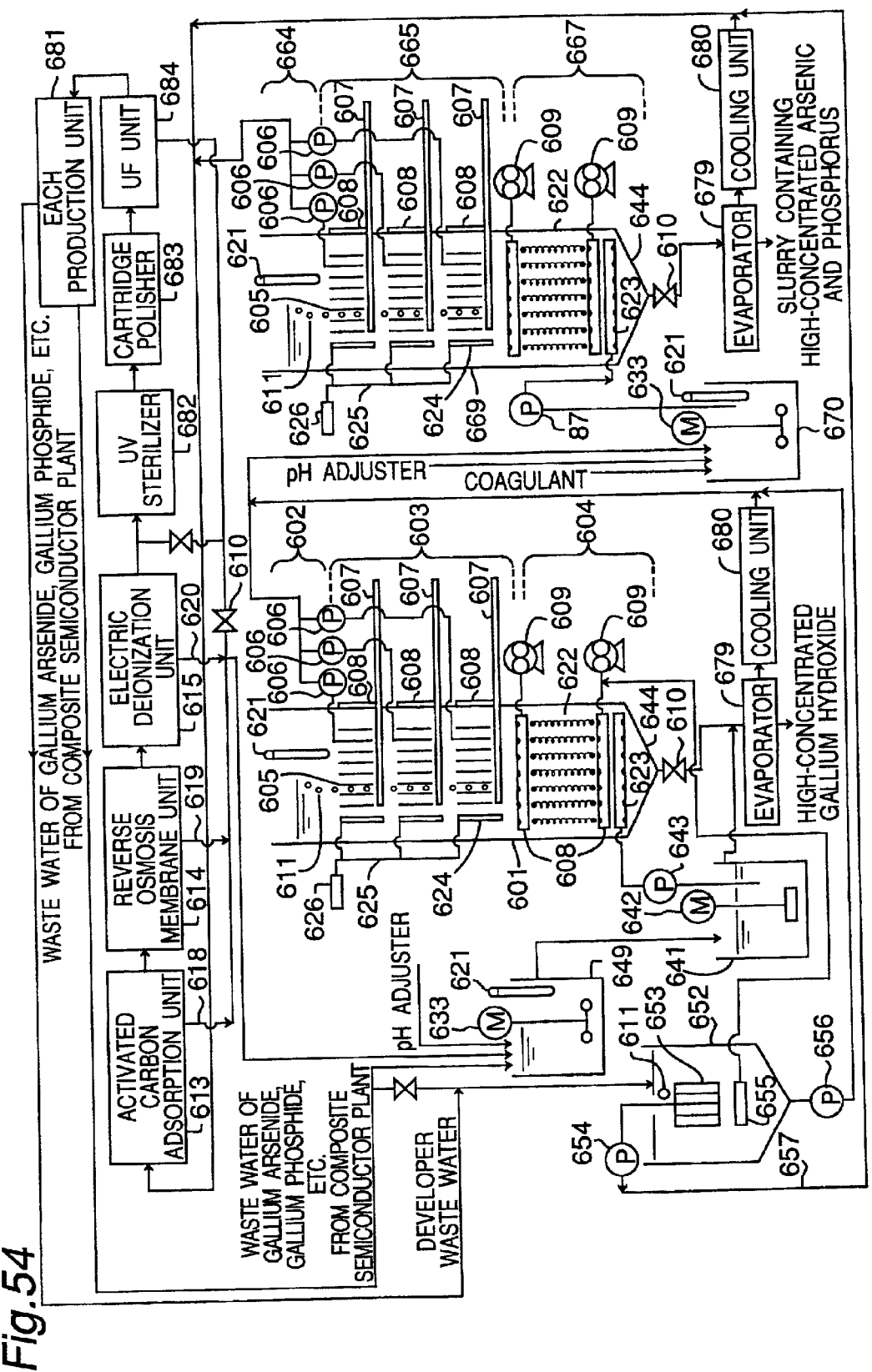
FIG. 54 is a schematic view showing the fiftieth embodiment of this invention.

Next, FIG. 54 shows the construction of a waste water treatment system for carrying out the fiftieth embodiment of the metal containing waste water treatment method of this invention.

In this fiftieth embodiment, the second submerged membrane separation tank 666 and the fourth submerged membrane separation tank 690 are firstly removed, and the concentrated precipitate from the multistage type submerged membrane separation tank 601 is directly introduced into the evaporator 679 in the forty-eighth embodiment of FIG. 52. Secondly, in this fiftieth embodiment, the concentrated precipitate from the third multistage type submerged membrane separation tank 669 is directly introduced into the evaporator 679. This fiftieth embodiment differs from the aforementioned forty-eighth embodiment only in the above-mentioned points. Therefore, in this fiftieth embodiment, the same components as those of the aforementioned forty-eighth embodiment are denoted by same reference numerals, and no detailed description is provided therefor.

In this fiftieth embodiment, the concentrated precipitate obtained from the multistage type submerged membrane separation tank 601 and the third multistage type submerged membrane separation tank 669 of the forty-eighth embodiment, i.e., gallium hydroxide and slurry that contains arsenic and phosphorus can be condensed to the desired concentration in a short time by the evaporators 679 and 679.

(Fifty-First Embodiment)

Figure 55:
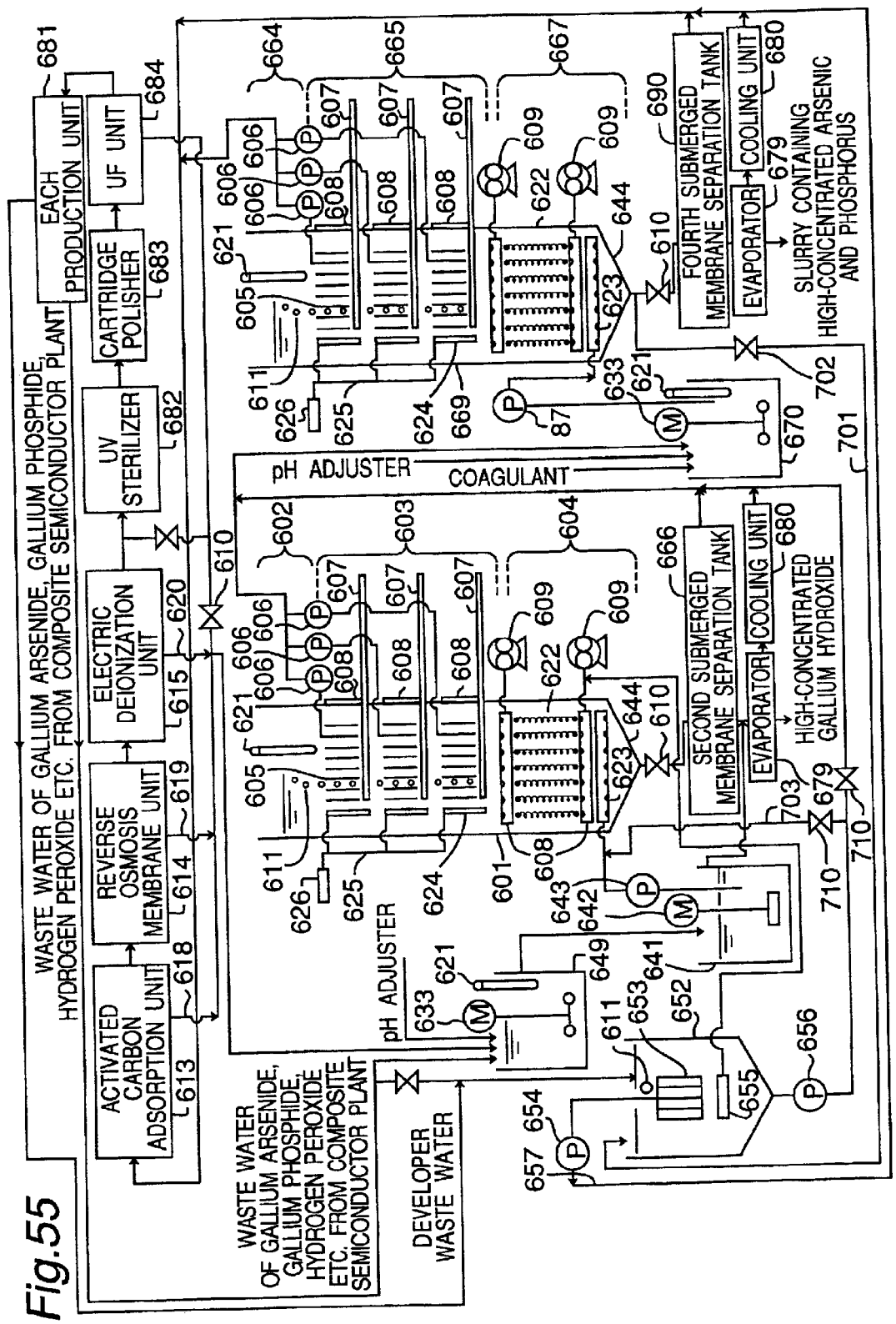
FIG. 55 is a schematic view showing the fifty-first embodiment of this invention.

Next, FIG. 55 shows the construction of a waste water treatment system for carrying out the fifty-first embodiment of the metal containing waste water treatment method of this invention.

This fifty-first embodiment differs from the aforementioned forty-seventh embodiment only in that the influent water is the waste water from compound semiconductor plant that contains hydrogen peroxide (hydro-peroxide) containing gallium arsenide, gallium phosphide and so on in contrast to the forty-seventh embodiment of FIG. 51 in which the influent water is the waste water from compound semiconductor plant that contains gallium arsenide, gallium phosphide and so on. Therefore, in this fifty-first embodiment, the same components as those of the aforementioned forty-seventh embodiment are denoted by same reference numerals, and no detailed description is provided therefor.

In this fifty-first embodiment, the influent water is the waste water from compound semiconductor plant that contains hydrogen peroxide (hydro-peroxide) containing gallium arsenide, gallium phosphide and so on, and therefore, hydrogen peroxide (hydro-peroxide) is included in the waste water.

Then, the arsenic oxidizing bacterium is introduced into the first multistage type submerged membrane separation tank 601 and the second submerged membrane separation tank 666. Therefore, the microorganism concentration increases with a lapse of time, and an anaerobic microorganism also propagates in part. Then, due to the reducibility possessed by the anaerobic microorganism, the hydrogen peroxide (hydro-peroxide) as an oxidizer contained in the waste water is resolved.

If the hydrogen peroxide in the waste water is thus resolved, the waste water is easily recycled as a raw water for the ultrapure water generating system. The water quality, which allows the waste water to be easily recycled as a raw water for the ultrapure water generating system, means that all the water quality items of organic matter, minute particles and ions other than hydrogen peroxide ions and so on are treated.

As described above, according to this fifty-first embodiment, the influent water to the pH adjustment tank 649 is the waste water from compound semiconductor plant that contains hydrogen peroxide, gallium arsenide, gallium phosphide and so on. Therefore, hydrogen peroxide can be resolved by the microorganism, and the running cost can be reduced since no oxidizer is used as a chemical.

(Seventh Experimental Example)

Next, as a concrete experimental example, an experimental example with an experimental apparatus of the same structure as that of the forty-third embodiment shown in FIG. 47 will be described.

In this seventh experimental example, the capacity of the multistage type submerged membrane separation tank 601 was set to 160 liters. Then, the experiment was carried out by using ten A4-size submerged membranes of Kubota Corp.

At this time, the concentration of gallium in the influent waste water from compound semiconductor plant considerably changed within a range of about 100 ppm to 2000 ppm. However, by concentrating treatment in the multistage type submerged membrane separation tank 601 and the evaporator 679, gallium was able to be obtained at a concentration of 200,000 ppm in the form of a slurry.

Then, the separated water obtained from the submerged membranes 605 was treated by being introduced into the arsenic- and phosphorus-removing unit 678 and a series of pretreatment systems of the activated carbon absorption unit 613 and so on and recycled by being introduced into the ultrapure water generating system constructed of the ultraviolet sterilizer 682, the cartridge polisher 683, the ultrafilter unit 684 and so on to produce ultrapure water supplied to each production unit 681.

(Eighth Experimental Example)

Next, as a concrete experimental example, an experimental example with an experimental apparatus of the same structure as that of the forty-fourth embodiment shown in FIG. 48 will be described.

In this eighth experimental example, the capacities of the multistage type submerged membrane separation tank 601 and the second submerged membrane separation tank 634 were each set to 160 liters. Then, experiments were carried out by using a total of twenty A4-size submerged membranes of Kubota Corp., or ten submerged membranes for each of the submerged membrane separation tanks.

At this time, the concentration of the influent gallium considerably changed within a range of about 100 ppm to about 2000 ppm. However, by concentration in the second submerged membrane separation tank 634 and the evaporator 679, a slurry containing gallium at a concentration of about 200,000 ppm was able to be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Metal containing waste water treatment equipment comprising:

a submerged membrane separation tank in which a reaction section, a submerged membrane section that has a submerged membrane and a precipitation section are arranged in order from top to bottom and into which a metal containing waste water is introduced from above, whereby a pH adjuster is added to the reaction section so as to cause a reaction with the metal containing waste water, the metal containing waste water is separated into water and metal in the submerged membrane section, and the separated metal is precipitated and concentrated in the precipitation section.

2. The metal containing waste water treatment equipment as claimed in claim 1, wherein the submerged membrane is an ultrafiltration membrane, a pH meter and a filler are placed in the reaction section, pH in the reaction section is adjusted to 4 to 5 and an air diffusion pipe is placed below the submerged membrane owned by the submerged membrane section.

3. The metal containing waste water treatment equipment as claimed in claim 2, wherein the filler is a reaction promoting member of a line mixer or the like that has a stirring structure.

4. The metal containing waste water treatment equipment as claimed in claim 2, wherein the ultrafiltration membrane has a pore diameter of 0.1 $\mu$m to 1.0 $\mu$m.

5. Metal containing waste water treatment equipment comprising:

a first submerged membrane separation tank in which a first reaction section, a first submerged membrane section that has a first submerged membrane and a first precipitation section are arranged in order from top to bottom and into which a metal containing waste water is introduced from above; and a second submerged membrane separation tank in which a second reaction section, a second submerged membrane section that has a second submerged membrane and a second precipitation section are arranged in order from top to bottom and into which a treated water from the first submerged membrane section of the first submerged membrane separation tank is introduced from above, whereby the first submerged membrane separation tank serves to add a pH adjuster to the first reaction section so as to cause a reaction with the metal containing waste water, subsequently separate water and metal from the metal containing waste water by the first submerged membrane of the first submerged membrane section and subsequently precipitate and concentrate the metal in the first precipitation section located in a lowermost portion, and the second submerged membrane separation tank serves to add a coagulant and a pH adjuster to the second reaction section so as to cause a reaction, subsequently separate water and metal by the second submerged membrane of the second submerged membrane section and subsequently precipitate and concentrate the metal in the second precipitation section located in a lowermost portion.

6. The metal containing waste water treatment equipment as claimed in claim 5, wherein the water separated in the second submerged membrane section is pretreated by being introduced into the pretreatment system and recycled as a raw water for an ultrapure water generating system.

7. The metal containing waste water treatment equipment as claimed in claim 5, wherein the metal containing waste water is a waste water that contains gallium arsenide, the precipitated concentrated metal in the first submerged membrane separation tank is gallium hydroxide, and the precipitated concentrated metal in the second submerged membrane separation tank is iron arsenate.

8. The metal containing waste water treatment equipment as claimed in claim 5, wherein the coagulant is ferric chloride, and the pH adjuster is sodium hydroxide.

9. Metal containing waste water treatment equipment comprising:

a first submerged membrane separation tank in which a first reaction section, a first submerged membrane section that has a first submerged membrane and a first precipitation section are arranged in order from top to bottom and into which a metal containing waste water is introduced from above, the first submerged membrane separation tank serving to add a pH adjuster to the first reaction section so as to cause a reaction with the metal containing waste water, subsequently separate water and metal from the metal containing waste water by the first submerged membrane of the first submerged membrane section and subsequently precipitate and concentrate the metal in the first precipitation section located in a lowermost portion;

a second submerged membrane separation tank in which a second reaction section, a second submerged membrane section that has a second submerged membrane and a second precipitation section are arranged in order from top to bottom and into which a treated water from the first submerged membrane of the first submerged membrane separation tank is introduced from above, the second submerged membrane separation tank serving to add a coagulant and a pH adjuster to the second reaction section so as to cause a reaction, subsequently separate water and metal by the second submerged membrane of the second submerged membrane section and subsequently precipitate and concentrate the metal in the second precipitation section located in a lowermost portion; and a third submerged membrane separation tank that has a third submerged membrane.

10. The metal containing waste water treatment equipment as claimed in claim 9, wherein a slurry precipitated and concentrated in the second precipitation section located in the lowermost portion of the second submerged membrane separation tank is sent back to the third submerged membrane separation tank.

11. The metal containing waste water treatment equipment as claimed in claim 9, wherein a developer waste water and an arsenic containing waste water are introduced into the third submerged membrane separation tank so as to culture an arsenic oxidizing bacterium, and the cultured arsenic oxidizing bacterium is introduced into the second submerged membrane separation tank.

12. The metal containing waste water treatment equipment as claimed in claim 9, wherein a developer waste water discharged through a gallium arsenide process and a waste water that contains arsenic are introduced into the third submerged membrane separation tank.

13. The metal containing waste water treatment equipment as claimed in claim 12, wherein a slurry precipitated and concentrated in the second precipitation section located in the lowermost portion of the second submerged membrane separation tank contains an arsenic oxidizing bacterium.

* * * * *